United States Patent
Girard

(10) Patent No.: US 7,283,519 B2
(45) Date of Patent: Oct. 16, 2007

(54) DISTRIBUTED EDGE SWITCHING SYSTEM FOR VOICE-OVER-PACKET MULTISERVICE NETWORK

(75) Inventor: Gregory D. Girard, Beverly, MA (US)

(73) Assignee: ESN, LLC, Bloomfield, CT (US)

( * ) Notice: Subject to any disclaimer, the term of this patent is extended or adjusted under 35 U.S.C. 154(b) by 1052 days.

(21) Appl. No.: 10/122,589

(22) Filed: Apr. 15, 2002

(65) Prior Publication Data

US 2002/0176404 A1 Nov. 28, 2002

Related U.S. Application Data

(60) Provisional application No. 60/283,888, filed on Apr. 13, 2001.

(51) Int. Cl.
*H04L 12/66* (2006.01)
*H04L 12/28* (2006.01)
*H04L 12/56* (2006.01)
*H04J 1/02* (2006.01)

(52) U.S. Cl. ............... 370/353; 370/356; 370/401; 370/493

(58) Field of Classification Search ............ 370/352, 370/353, 355, 356, 384, 395.2, 401, 410, 370/466, 467; 709/226, 229, 240; 725/117, 725/119, 131
See application file for complete search history.

(56) References Cited

U.S. PATENT DOCUMENTS

| | | | |
|---|---|---|---|
| 6,005,865 A | 12/1999 | Lewis et al. ............... 370/398 |
| 6,061,363 A | 5/2000 | Evans et al. ............... 370/467 |
| 6,195,364 B1 | 2/2001 | Brodigan .................... 370/463 |
| 6,408,061 B1 | 6/2002 | Donak et al. ............... 379/188 |
| 6,567,399 B1 * | 5/2003 | Schuster et al. ........... 370/352 |
| 6,667,968 B1 | 12/2003 | Tran |
| 6,938,080 B1 * | 8/2005 | Kahveci et al. ............. 709/223 |
| 7,012,888 B2 | 3/2006 | Schoeneberger et al. |
| 7,072,303 B2 | 7/2006 | MeLampy et al. |
| 7,089,285 B1 * | 8/2006 | Drell ........................... 709/204 |
| 7,120,139 B1 * | 10/2006 | Kung et al. ................. 370/352 |
| 7,123,700 B1 * | 10/2006 | Weaver et al. ........... 379/88.19 |
| 7,139,838 B1 | 11/2006 | Squire et al. |

(Continued)

OTHER PUBLICATIONS

"Zero Configuration Networking (Zeroconf),"http://www.zeroconf.org, 3 pages, Oct. 2004, downloaded and printed from Internet Archive Way Back Machine (http://web.archive.org/web/20041027081600/http://www.zeroconf.org) on Jun. 7, 2007.

(Continued)

*Primary Examiner*—Ronald Abelson
(74) *Attorney, Agent, or Firm*—McAndrews, Held & Malloy Ltd.

(57) ABSTRACT

A network device including a plurality of communication interfaces, including a telephone line interface, a computer data interface, and a broadband network interface; a processor; a machine-readable storage medium which during use stores a call processing application and service profiles, and which stores executable instructions to mediate communications between the plurality of communication interfaces, the instructions causing the network device to detect network signaling events or trigger points in a telephone call and invoke the call processing application in response to the detected network signaling events or trigger points, the call processing application operating according to parameters defined in the service profiles.

19 Claims, 13 Drawing Sheets

U.S. PATENT DOCUMENTS

| | | |
|---|---|---|
| 2002/0042832 A1 | 4/2002 | Fallentine et al. |
| 2002/0044567 A1* | 4/2002 | Voit et al. .................. 370/467 |
| 2002/0085549 A1 | 7/2002 | Reza et al. |
| 2002/0087693 A1* | 7/2002 | Marshall et al. ............ 709/226 |
| 2002/0114274 A1* | 8/2002 | Sturges et al. .............. 370/229 |
| 2002/0131427 A1* | 9/2002 | Niermann .................... 370/401 |
| 2002/0169887 A1 | 11/2002 | MeLampy et al. |
| 2003/0133558 A1* | 7/2003 | Kung et al. ............ 379/215.01 |
| 2004/0028035 A1 | 2/2004 | Read |
| 2004/0131060 A1 | 7/2004 | Newberg et al. |
| 2005/0033985 A1 | 2/2005 | Xu et al. |
| 2005/0193124 A1 | 9/2005 | Chou et al. |
| 2006/0047742 A1 | 3/2006 | O'Neill et al. |
| 2006/0067323 A1 | 3/2006 | Beck et al. |
| 2006/0089991 A1 | 4/2006 | Sanders et al. |

OTHER PUBLICATIONS

"Rendezvous," http://developer.apple.com/macosx/rendezvous, 4 pages, Oct. 2004, downloaded and printed from Internet Archive Way Back Machine (http://web.archive.org/web/20041010093704/developer.apple.com/macosx/rendexvous) on Jun. 7, 2007.

U.S. Appl. No. 10/973,146, Image File Wrapper, downloaded and printed from Patent Application Information Retrieval (PAIR) on Jun. 7, 2007.

U.S. Appl. No. 60/254,840, Image File Wrapper, downloaded and printed from Patent Application Information Retrieval (PAIR) on Jun. 7, 2007.

* cited by examiner

DISTRIBUTED EDGE SWITCHING SYSTEM FOR VOICE-OVER-PACKET MULTISERVICE NETWORK

RELATED APPLICATION

This application claims priority to U.S. provisional application 60/283,888 filed on Apr. 13, 2001, the contents of which are incorporated herein by reference.

TECHNICAL FIELD

This invention relates to packet networks, and more particularly to network devices.

BACKGROUND

This section contains a discussion of background. It summarizes telecommunications carrier network architectures that currently exist as legacy or that are currently under development. It also includes discussion of insights and observations made by the inventor about the prior art systems that are helpful to understanding the subsequently described invention but that were not necessarily appreciated by persons skilled in the art or disclosed in the prior art. Thus, the inclusion of these insights and observations in this background section should not be interpreted as an indication that such insights and observations were part of the prior art. After the background discussion, a new Edge Switched Network (ESN) architecture is introduced and it is described and compared to leading "Next Generation Network" alternatives. A Distributed Edge Switch (DES) makes possible the implementation of an ESN. In the OVERVIEW section that is found in the Detailed Description section, the design, operation and management of the DES are described within the architectural context provided by the ESN.

Next Generation Networking Approaches

In recent years, attempts to transform the legacy Public Switched Telephone Network (PSTN) to exploit the potential of the Internet has led to approaches that are loosely referred to as the Next Generation Network (NGN). It was believed that such approaches would lead to converged networks. Converged networks promise substantial cost savings and new service opportunities for telecommunications carriers (a.k.a. "carriers," or "network service providers"). As a means to realize new data services, carriers have deployed overlay networks, which require overlay of new infrastructure onto existing legacy voice networks. In contrast, the converged approach of the NGN seeks to eliminate the need to have separate networks for different media. It exploits the principles of "openness" and leverages the standard protocols of IP networks to carry not only data but also other media such as voice and video.

The PSTN and AIN Principles

The NGN grew out of the PSTN, thus to understand its origins one must understand present day Advanced Intelligent Network (AIN) employed by PSTN carriers to provide advanced telephony services. The AIN was proposed as the solution to the carriers' needs to produce applications rapidly and independently of switch development efforts. Prior approaches had bundled services within switches, giving rise to long development times and inflexible service deployment. Service development and deployment was intimately tied to switch evolution and switch development cycles.

AIN proposed de-coupling service development and service logic from switches by building appropriate trigger points within the switch. Upon encountering a trigger detection point while processing a call, the switch, called the Service Switching Point (SSP), would trigger and send a query to a Service Control Point (SCP). FIG. 1 illustrates the elements of AIN. The SSP performs a query directed to an SCP. The SCP executes service logic that yields a result and that result is returned to the SSP that initiated the query. The SSP then continues with call processing.

As an example, when a subscriber dials an 800 number, an SSP detects that the call requires AIN service logic processing. The SSP directs a query to an SCP which in turn executes service logic that returns a valid dialing number to the SSP. The SSP then asks the Signaling System #7 (SS#7) network to set-up a call to that telephone number. SS#7 sets up signaling and bearer paths necessary to support a call to that dialing number. The CENTRAL OFFICE SWITCH serving the called party applies a ringing tone to the called party's telephone. Once the called party answers, the call is established and both the parties can now have a telephone conversation.

FIG. 1 depicts the structure of the PSTN, including its support for AIN. The CENTRAL OFFICE SWITCH is decomposed into four distinct modules:

CALL PROCESSING
LINE
SIGNALING
TRUNK

The LINE module functions include detecting on-hook/off-hook, applying dial tone and ringing tone, collecting dialed digits, and communicating internally with the call-processing module. The CALL PROCESSING module analyzes the digits collected by the LINE module, and asks the SIGNALING module to perform appropriate actions. The SIGNALING module interfaces with the SS#7 TRANSPORT NETWORK for the purpose of setting up a bearer channel between the calling and the called CENTRAL OFFICE SWITCHES. The TRUNK module transforms analog voice to a Time Division Multiplexed (TDM) format for transmission over PSTN trunks. The TRUNK module of the CENTRAL OFFICE SWITCH serving the called party converts the TDM trunk format back to analog for transmission over the local loop.

The Next Generation Networking Model

FIG. 2 illustrates the NGN approach. The NGN exhibits several similarities to the legacy PSTN. If one were to split apart the four modules that comprise the CENTRAL OFFICE SWITCH (see FIG. 1) into separate and distinct computing elements, the following components of a NGN network result:

MEDIA GATEWAY CONTROLLER
RESIDENTIAL GATEWAY
TRUNK GATEWAY
SIGNALING GATEWAY

To compare the functions of these elements to analogous functions in the CENTRAL OFFICE SWITCH, the MEDIA GATEWAY CONTROLLER (A.K.A. "softswitch," or "call agent) performs the functions of the CALL PROCESSING module, the RESIDENTIAL GATEWAY (A.K.A. "customer gateway") performs the functions of the LINE module and the TRUNK GATEWAY replaces the TRUNK module. Insofar as the RESIDENTIAL GATEWAY and TRUNK GATEWAY are both responsible for converting media provided in one type of network to the format required in another type of network, they are referred to generically as MEDIA GATEWAYS. With respect to support for network signaling functions, the SIGNALING GATEWAY in the NGN replaces the SIGNALING module in the CENTRAL OFFICE SWITCH. The similarities between the PSTN and NGN end here.

FIG. 2 shows a PACKET TRANSPORT NETWORK based on IP in OSI Layer 3 (the network layer) transported over ATM in OSI Layer 2 (the datalink layer). It interconnects all four NGN network elements. What were once major modules within a CENTRAL OFFICE SWITCH are now distributed network elements interconnected through a PACKET TRANSPORT NETWORK. The distributed nature of network elements in an NGN brings out one of the most striking differences between the PSTN and the NGN approaches. The theoretical advantages to be gained from this distribution include the following:

The MEDIA GATEWAY CONTROLLER may be implemented on a reliable, high-performance, fault-tolerant server that is IP-based and uses standard protocols to communicate with the gateways. Services can be implemented on separate platforms using open application programming interfaces (API), which should in theory lead to rapid development and deployment of services.

The MEDIA GATEWAYS can send media to each other over an IP-based PACKET TRANSPORT NETWORK using a protocol called Real Time Transport Protocol (RTP). The RTP protocol can be used to transmit not only voice but also data and video. The same IP transport and protocol can be used to carry multiple media types concurrently, a task that is difficult to accomplish with the circuit-switched PSTN network.

Unlike with the PSTN, where the signaling network is separate from the voice network, NGN utilizes the same PACKET TRANSPORT NETWORK to carry both signaling and media traffic.

Whereas communication between the four major modules is internal to the CENTRAL OFFICE SWITCH in the PSTN, the NGN uses a gateway control protocol for communication between the MEDIA GATEWAY CONTROLLER and the MEDIA GATEWAYS.

The most widely studied gateway control protocol is Media Gateway Control Protocol (MGCP) described by IETF RFC 3015 on Megaco Protocol Version 1.0. RFC 3015 is a common text with ITU-T Recommendation H.248, the most recent draft of which was developed as a close cooperation between the IETF Media Gateway Control Working Group (A.K.A. "MEGACO Working Group") and ITU-T Study Group 16.

The precursor to MGCP was the Simple Gateway Control Protocol (SGCP) developed by Telcordia. At about the same time Telcordia was implementing SGCP, a company called Level 3 had developed a similar protocol called IP Device Control (IPDC). Rather than have two similar protocols develop and compete over time, Telcordia and Level 3 merged them into MGCP. MGCP was tailored to address a PSTN telephone and was not designed to handle data or multimedia. ITU-T Study Group 16 extended MGCP to support ISDN and multimedia, which led to Recommendation H.248. This body of work is today referred using the moniker MEGACO/H.248; it details a NGN reference architecture that provides an operational context for the description of the MGCP itself.

FIG. 2 depicts an NGN that is architecturally compatible with MEGACO/H.248. The following workflow sequence illustrates a typical call set-up procedure for the NGN depicted in FIG. 2:

(1) A telephone goes off-hook. The RESIDENTIAL GATEWAY serving the telephone detects the off-hook event, applies dial tone, collects the dialed digits, and notifies the MEDIA GATEWAY CONTROLLER using MEGACO; The RESIDENTIAL GATEWAY also informs the MEDIA GATEWAY CONTROLLER that it is prepared to receive an RTP media stream at a certain port address, and further indicates the audio coding format it is able to support.

(2) The MEDIA GATEWAY CONTROLLER processes the digits and then must determine whether the called party telephone is connected to another RESIDENTIAL GATEWAY within the NGN or connected to a CENTRAL OFFICE SWITCH in the PSTN.

(3) Assuming the called party is connected to another RESIDENTIAL GATEWAY within the NGN, the MEDIA GATEWAY CONTROLLER queries the RESIDENTIAL GATEWAY serving the called party for an RTP port (and the audio coding format) at which it would prefer to receive an RTP stream from the calling party RESIDENTIAL GATEWAY.

(4) The called party RESIDENTIAL GATEWAY responds with the port at which it can receive an RTP audio stream from the calling party and the audio coding format it is able to support.

(5) The called party RESIDENTIAL GATEWAY applies a ringing tone to the called party's telephone.

(6) The MEDIA GATEWAY CONTROLLER informs the calling RESIDENTIAL GATEWAY of the audio coding format supported by the called RESIDENTIAL GATEWAY and the port at which it is expecting to receive an RTP stream.

(7) Following more exchanges of information, both the calling and called party RESIDENTIAL GATEWAYS know the port addresses and supported audio coding formats necessary for them to send and receive RTP streams (containing encoded audio) to/from each other.

(8) Once the called party answers the telephone, two-way communication using RTP streams is established.

Implications of NGN Deployment

There are several significant implications that result from delivering network services to subscribers through an NGN rather than the PSTN. Several of them are summarized in the points below:

Unlike the PSTN, which has a signaling network that is separate from the TDM network for establishing bearer paths, the NGN network carries both signaling and media streams over the same IP network, thereby achieving a certain measure of convergence.

Whereas the PSTN requires separate overlay networks and protocols for other media beyond voice, the NGN utilizes the same IP network and protocols for all media communications (i.e. voice, data, video).

While the PSTN carries voice media over dedicated circuit switched connections, NGN carries media streams in RTP packets that are treated in the same manner as any other IP packets, using the "best effort" paradigm the Internet employs for routing packets. This means that packets can encounter delays; they can be dropped due to congestion control mechanisms that throttle packets at the source or at the ingress to the network. Hence, the bare public Internet does not offer quality of service. Consequently, an NGN implementation requires the creation of a special-purpose IP network to support network quality of service (QoS). In contrast, the PSTN is capable of guaranteeing QoS service for point-to-point connections transporting voice or data.

The NGN interworks with the PSTN via TRUNK GATEWAYS and SIGNALING GATEWAYS. Thus, while the end-to-end connection between two NGN subscribers would occur entirely within the PACKET TRANSPORT NETWORK, the end-to-end connection between and NGN subscriber and a PSTN subscriber would occur in both the NGN and the PSTN, using a TRUNK GATEWAY and a SIGNALING GATEWAY to carry bearer channel content and network signaling information, respectively, between the two subscribers participating in the call.

Third-party applications can be offered via an open applications programming interface (API) offered by the MEDIA GATEWAY CONTROLLER. Some standards for Open APIs include PARLAY, JAIN, XML, or SOAP. It is beyond the scope of this discussion to provide definitions for these APIs or to elaborate on them beyond presenting their monikers. Let it simply be said that the thrust of these APIs was originally an effort to make AIN infrastructure in the PSTN accessible to third-party application providers so that they could offer new and innovative network services. With the advent of the NGN, it was envisioned that the same set of APIs would be suitable to provide third-party NGN applications with the ability to access similar features by interfacing with the MEDIA GATEWAY CONTROLLER.

The NGN makes it possible for a carrier to provide plain old telephone service (POTS) over a PACKET TRANSPORT NETWORK by using a MEDIA GATEWAY CONTROLLER and a RESIDENTIAL GATEWAY rather than a CENTRAL OFFICE SWITCH. As already explained, the RESIDENTIAL GATEWAY takes on the role of the LINE module of the CENTRAL OFFICE SWITCH; therefore, there are no NGN requirements to change the telephone itself.

A Victim of Failed Economics

Though the NGN is today restricted in its applicability to voice communications, it was originally the hope of both carriers and vendors that voice-over-IP (VoIP) would serve to bootstrap the NGN and spawn off a new era of converged networks that would cater to voice, video and data communications. Convergence promised to transform the PSTN into a general purpose "multi-service network" capable of simultaneously delivering voice, video and data services through a common PACKET TRANSPORT NETWORK that supports QoS. Thus far this expectation has not materialized due to the carriers' reluctance to widely deploy a network based on the NGN architecture. At the current time, many carriers perceive the NGN architecture unsuitable to meet their forward-looking objectives to decrease network operating costs while at the same time increase network service revenues. Ultimately the NGN became a victim of failed economics that resulted from its inordinate complexity and insufficient support for new services.

Complexity Confounds NGN Deployment

The inordinate complexity of the NGN is to a large extent due to overreliance on centralized control elements for network service delivery. While its many network elements may be physically distributed, the NGN architecture's logical centralization mimics the functionally of the "mainframe-oriented" PSTN. The NGN architecture has more recently been altered from its original design to model the Internet, relying upon a "horizontal integration" of specialized, cooperating network elements. Many of these network elements are not shown in FIG. 2, but are necessary for NGN implementation (e.g. feature servers, media servers, integrated access device controllers, policy servers, domain naming servers, SIP proxy servers, TRIP servers, subscriber directory servers). Very much unlike the internet, virtually all NGN network elements require some degree of centralized control by, or interaction with, the MEDIA GATEWAY CONTROLLER according to specialized protocols. All of these protocols communicate through (i.e. generate traffic on) the carrier's PACKET TRANSPORT NETWORK.

To support its centralized service delivery model, the "vertically integrated" PSTN was based on a hardware scaling model in which the majority of software processes communicated directly with each other inside purpose-built hardware computing modules. These computing modules physically plugged into each other to create large, distributed mainframe computers such as the CENTRAL OFFICE SWITCH. The more horizontally integrated NGN is based on a software scaling model that for all intents and purposes remains as operationally centralized as the PSTN, if not more so in some instances where control over a very large number of subscribers (potentially millions) may be aggregated into a regional office. Adherents of the NGN architecture maintain that such a high degree of centralization offers cost benefits; however the cost benefits of centralization are to a large measure offset by fault vulnerability and the costs associated with ensuring system redundancy. Generally speaking, if something in a network does anything for thousands of subscribers at the same time, not only does the carrier need two of them, but also the ability to automatically fail over from one to the other without dramatically interrupting service delivery. Implementing this level of functionality for centralized components is challenging and often prohibitively expensive.

As depicted in FIG. 2, the physically distributed, highly-decomposed NGN architecture relies upon a an "orchestra"0 of interdependent software services running on distributed network elements; these software services, each according to its unique role, communicate in one-to-one, many-to-one, or one-to-many relationships with other interdependent software services through the PACKET TRANSPORT NETWORK, each using specialized protocols.

Due to physical limitations on how many MEDIA GATEWAYS can be controlled by a single MEDIA GATEWAY CONTROLLER, the NGN must be partitioned into control zones. Local device-level signaling performed by the MEDIA GATEWAY CONTROLLER within its control zone must be somehow synchronized with end-to-end network signaling that would be necessary for a call to span more than a single zone. The result is a two-tiered signaling architecture—a concession to the inelegant NGN scaling model and its inherent requirement for network partitioning. Network signaling protocols such as Session Initiation Protocol (SIP) are used between control zones for end-to-end network signaling, whereas MEGACO is used closer to the endpoint for local MEDIA GATEWAY control.

Among other things, the two-tiered signaling model complicates the integration of APPLICATION SERVERS (and potentially PBXs) that typically require more signaling information than can be conveyed by MEGACO (e.g. calling and called party dialing numbers). As a result, network signaling using SIP must be extended directly to the APPLICATION SERVER as if it were another MEDIA GATEWAY CONTROLLER i.e. another "control zone." Thus, for the NGN to enable network-based enhanced services such as voice mail or group conferencing, it must interface APPLICATION SERVERS using a different method than the way it interfaces telephones. From an operational perspective, the two-tiered signaling model means that the MEDIA GATEWAY CONTROLLER becomes a lynch pin, and must now actively mediate all telephone access to the APPLICATION SERVERS.

In the NGN, subscriber telephones are connected through RESIDENTIAL GATEWAYS and controlled by the MEDIA GATEWAY CONTROLLER using MEGACO. This complexity has further implications in terms of complicating overall network design, particularly with respect to the scaling of participating network elements. Thus, as a consequence of its inordinate complexity, the NGN architecture brings with it a number of very significant implementation considerations that may be summarized as follows:

Potential poor performance resulting from the high processing overhead: network functionality is highly decomposed into distributed network elements that must communicate through the network itself using various protocols;

Numerous indeterminate scaling relationships that introduce a proportionally larger number of potential bottlenecks;

Troubleshooting procedures that must isolate and resolve problems that appear to reside in more than one place do to protocol incompatibilities;

Software integration requirements that are difficult for most carriers to support.

It is the conclusion of this analysis that the NGN architecture as represented in FIG. 2 has too many moving parts to operate efficiently. Attempts to remedy these limitations ultimately translate into implementation cost for the carrier attempting to deploy an NGN.

Insufficient Support For New Services Confounds NGN Deployment

The NGN architecture suffers from insufficient support for new services. It largely replicates the telephone-oriented feature set of today's PSTN. Due to the centralized control model of the NGN, support for new network services is dependent upon the ability of the MEDIA GATEWAY CONTROLLER and APPLICATION SERVERS to provide the features that comprise a network service. Much like with the PSTN, feature delivery by a centralized controlling entity is limited by the carrier's ability (and willingness) to modify the controlling entity to provide new services. Notwithstanding the NGN vision of third-party applications and new services supported through MEDIA GATEWAY CONTROLLER APIs, as a practical matter it is a tenuous proposition to modify access to it, or add to its service load once it has been optimized to deliver a particular portfolio of services.

Beyond risks related to destabilizing the core of the network by providing API access to the MEDIA GATEWAY CONTROLLER, the generic concept of using APIs to integrate application services came into question some time after the inception of the NGN and its API-based strategy. In actual practice—"actual practice" being a function of industry consensus derived from years of internet experience—third-party applications offered through the NGN are probably better integrated using standard IP-based IETF protocols such as SIP and Hypertext Transfer Protocol. APPLICATION SERVER integration into the PACKET TRANSPORT NETWORK using internet-style protocols (based on message passing) has proven far more flexible and cost-effective than integrations based on APIs. APIs tend to be highly vendor-specific, programming language-specific, and, since they are based fundamentally on function calls rather than message sets, tend to be less tolerant of partial implementation.

Notwithstanding the foregoing, it should be kept in mind that network signaling protocols like SIP are not compatible with the device-oriented MEGACO protocol used to control telephones connected to RESIDENTIAL GATEWAYS. Thus, as pointed out earlier in the discussion, the two-tiered signaling model of the NGN puts the MEDIA GATEWAY CONTROLLER into a mediation role, performing an imperfect translation between its use of MEGACO to control service delivery to telephones and its use of SIP as the means to access application services.

Interactive calling services were originally envisioned that would provide the NGN subscriber with the ability to select or customize call processing logic, perhaps even to enable interoperability between network features and application programs running on the subscriber's personal computer (e.g. active browser sessions, instant messaging clients) or to access subscriber-specific data objects (e.g. contact lists, call logs, content subscriptions). Implementation of these types of interactive calling services using only AIN-style APIs was eventually perceived as largely impractical in the NGN because the MEDIA GATEWAY CONTROLLER (supporting the APIs) would be required to access, manage, and execute unique, complex service logic for very large number of subscribers at the same time. The following points illustrate other significant limitations of the NGN with respect to supporting new services:

In the NGN, the MEDIA GATEWAY CONTROLLER delivers telephone features by remotely controlling the RESIDENTIAL GATEWAY. It can only deliver features through a RESIDENTIAL GATEWAY whose feature set it fully understands according to the MEGAGO standard. This factor imposes substantial constraints on the variety of network services the NGN can deliver because it is impractical or unfeasible to control an endpoint feature set that extends beyond that anticipated by MEGACO.

Calling services that perform call control operations require a full knowledge of subscriber Class of Service parameters and service delivery preferences. This information governs not only the subscriber's ability to invoke the calling service in the first place, but the unique behavior of the service when invoked by that particular subscriber. Most of the information that interactive calling services (e.g. call log functions, programmable call-blocking and call-forwarding) require is buried somewhere deep inside the NGN infrastructure in much the same way that it was buried inside the CENTRAL OFFICE SWITCH in the PSTN. This factor imposes substantial constraints on the variety of network services the NGN can deliver because call log entries and related subscriber-specific network usage data are largely unavailable for real-time access by third-party applications.

RESIDENTIAL GATEWAYS are unintelligent in the sense that they require the MEDIA GATEWAY CONTROLLER to mediate all network signaling functions on their behalf. They cannot determine the broader network signaling context of the calling operations in which they participate. They are incapable of independently executing service logic that involves network signaling operations (e.g call redirection, multipoint call control, call supervision, multiple line appearances, etc.) without centralized participation by the MEDIA GATEWAY CONTROLLER. These factors impose substantial constraints on the variety of network services the NGN can deliver because each new service must be tightly integrated with the MEDIA GATEWAY CONTROLLER in order to perform call control operations.

To work around these constraints, recent approaches to offering new services in the NGN have put an application between the RESIDENTIAL GATEWAY and the MEDIA GATEWAY CONTROLLER. The application is responsible for controlling the subscriber's telephones, giving them access to various new features. These approaches support: (a) a variety of telephone types not supported by standard MEGACO; (b) better access to call log records and related subscriber-specific network usage data; and (c) the ability to execute user-configurable service logic not supported by the MEDIA GATEWAY CONTROLLER.

As an example of this approach, companies such as Cisco, Broadsoft, LongBoard, and Sylantro have built application systems that provide optimized combinations of business telephone services that include PBX and Centrex features. While some of these solutions are designed for enterprise deployment, those intended for carrier deployment are often referred to using the moniker "IP Centrex." IP Centrex solutions provide calling services and telephone features using various brands of office telephones and web browser-based graphical user interfaces. Generically, IP Centrex solutions equate to a network-based software PBX application that replaces much of the functionality of the MEDIATE GATEWAY CONTROLLER.

IP Centrex solutions are often referred to in the industry as "point solutions." Point solutions enable the carrier to provide a very particular set of new services for isolated populations of subscribers. They are a work-around bourne out of necessity and introduce additional "non-standard" intermediary network elements into the NGN. Adding new network elements of this type brings with it significant scaling implications associated with carrier deployment of a service that cannot scale as the network itself scales. Point solutions are operationally unfeasible for carriers serving tens of millions of subscribers because the feature set of the point solution cannot be managed as a standard network feature set that may be enabled or disabled for any subscriber at will. If such a service became popular, the carrier would have to replicate many instances of the system—potentially thousands of them—each to serve a certain critical mass of subscribers, and then to manage these systems as independent islands of service delivery capability.

As summarized below, point solutions bring with them their own unique set of carrier deployment challenges and at the same time do not resolve the general limitations of the NGN with respect to supporting new services:

Point solutions do not in a general sense enable the NGN to control a telephone feature set (or other endpoint device feature set) that extends beyond that anticipated by MEGACO, but instead supports selected vendor telephones in a way that suits their own specific purposes.

Point solutions do not in a general sense make call log records and related subscriber-specific network usage data available for real-time access by a third-party applications, but instead simply store it internally for their own use.

Point solutions do not in a general sense make it possible for third-party applications to perform call control operations, but instead implement call control operations for their own specific purposes.

NGN Support For Multi-Service Delivery

The NGN architecture leaves to future consideration features sets that extend beyond traditional PSTN voice services. It assumes central office (or equivalent) deployment for most network elements and that the RESIDENTIAL GATEWAY is providing telephone service over a general-purpose PACKET TRANSPORT NETWORK that supports QoS. Video and data services are not addressed directly by the NGN, and it is assumed that other network elements and related infrastructure components will provide these services independently.

The above assumptions do not anticipate that the subscriber purchasing voice services is also likely to purchase data and video services from the same carrier. When the carrier's primary connection to the subscriber premise is through a broadband access network, it quickly become impractical to install a separate physical connection or independent solution for each type of media service offered to that subscriber. Much of the motivation behind the transition to a converged network is based on the notion that multiple services—voice, video, and data services—can be offered to a network subscriber through a single IP data path to the premise. The converged vision extends to enabling carriers to combine several media types into a comprehensive network services offering.

This type of multi-service delivery requires QoS arbitration at the subscriber premise so as to ensure QoS for all voice, video, and data terminal devices (i.e. telephones, televisions, PCs) installed there; all of these terminal devices may be operating at the same time sharing the same IP data path. Many potential new services anticipate providing value to subscribers because of their ability to support multiple media types at the same time, potentially integrating two services that support different media types in a way that makes each more useful. In addition, voice, video and data terminal devices installed at the subscriber premise often support different control interfaces that must be normalized to network signaling and device control conventions that would enable them to interact with network-based APPLICATION SERVERS in a consistent fashion.

Equipment vendors have responded to requirements to enable NGN multi-service delivery through a single IP data path to the subscriber premise by creating an integrated access device (IAD). The IAD began life as specialized version of a RESIDENTIAL GATEWAY, designed as a means to enable subscribers to connect voice and data terminals at the premise in such fashion as they may share a common IP data path to the carrier's PACKET TRANSPORT NETWORK. The IAD marketplace today offers the carriers a bewildering assortment of devices, targeting optimal combinations of cost effectiveness and/or feature richness.

Some IADs support voice-over-IP and QoS arbitration features whereas others attempt to obviate total reliance on remote IAD control by a MEDIA GATEWAY CONTROLLER (using MEGAGO) by implementing selected POTS telephone features and SIP network signaling within the IAD. Some IADs used by the cable industry do not support VoIP in the NGN sense of it, but instead provide for "voice-over-broadband." The term voice-over-broadband refers to a family of proprietary access network designs, the most common of which is that used by cable companies that transport voice, as well as data and video, on distinct broadband channels created through frequency division multiplexing (FDM). In this type of voice-over-broadband network, voice and data flows are split at the central office (or central office equivalent), with the voice path connecting to a CENTRAL OFFICE SWITCH (usually through a GR 303 packet interface). IADs of this type are excepted from this discussion because they do not support the converged "end-to-end IP" vision of the NGN and are fundamentally incompatible with it.

NGN voice services offered through an IAD using VoIP are virtually identical to voice services offered directly through a POTS line connected to a CENTRAL OFFICE SWITCH. Typically, the IAD is used to connect telephones and computers to a broadband data service provided to the premise. Through the gateway facilities of the IAD, voice and data are transported as distinct packet flows over a common IP data path that is contiguous (from an IP connectivity standpoint) with the PACKET TRANSPORT NETWORK. In the NGN, the feature set of the CENTRAL OFFICE SWITCH is emulated by the MEDIA GATEWAY CONTROLLER in concert with a number of other network elements such as a "feature server." Conceptually, in the NGN the IAD functions exactly as any other RESIDENTIAL GATEWAY.

Unable to deliver traditional PSTN network services independently, and devoid of the ability to enable compelling new service capabilities, the value proposition of the IAD lies in its ability to enable the subscriber to use one physical line (e.g. DSL line, cable, T1) for both voice and data at the same time. In summary, the cost of the IAD must be compared to the cost of simply installing separate voice and data lines to the premise.

After substantial field experience, technical staff at two major United States Local Exchange Carriers recently concluded that the cost for them to deploy network services using an IAD is greater than or equal to the cost to deploy separate voice and data lines to the premise, except in rare cases where it would be exceptionally expensive to bring in an additional line. Despite wide availability several for years, the limited deployment of IADs further suggests that the NGN has been a victim of failed economics. From a pure technical perspective, an IAD may be an appropriate "edge device" form-factor to address MEGACO requirements for multi-service delivery to the subscriber premise. This observation does not remedy the underlying problem that its cost to deploy is perceived as more than can be justified by the modest functionality it enables.

SUMMARY

An Edge Switched Network Architecture

An Edge Switched Network (ESN) architecture is introduced as an innovation whose implementation is dependent upon the Distributed Edge Switch (the "invention" that is the subject of this disclosure). The general operating principles of the ESN are described below as a pretext to a detailed description of the Distributed Edge Switch (DES) found in the OVERVIEW section. It will be shown that the ESN resolves many of limitations inherent to the NGN.

FIG. 3 depicts an ESN architecture principally comprised of "connectivity elements." A connectivity element is a particular type of network element that is capable of participating in call sessions using SIP network signaling and RTP bearer transmission. Communities of connectivity elements communicate in a peer-to-peer fashion without necessarily requiring assistance from the network beyond IP connectivity. The three connectivity element types defined for the ESN are as follows:
EDGE SWITCH
APPLICATION SERVER
PSTN GATEWAY All three connectivity elements share a similar network interface design that combines support for SIP network signaling, RTP bearer transport, media encoding/decoding, and event-driven call processing into a single intelligent endpoint device. From a conceptual standpoint, each connectivity element collapses functionality from each major NGN network element into a self-contained whole capable of "intelligent participation" in call sessions. Intelligent participation refers to the ability of a connectivity element to operate both as SIP network signaling endpoint and as a call control agent capable complex call control operations. Complex call control operations might involve supervising call sessions that contain multiple call legs extending to other connectivity elements. Connectivity elements may leverage network-based SIP proxy servers to support these and other complex operations.

Role of the Edge Switch in the ESN

The EDGE SWITCH is an ESN connectivity element whose principal function is to support the delivery of voice, video (multimedia) and data services—multi-service delivery—to the subscriber premise through a shared IP data path. It aggregates several functions together into a single, cost-effective device that is deployed by the carrier as a premise-based network element.

FIG. 3 shows that the EDGE SWITCH functions as a broadband access network termination device (e.g. DSL modem, cable modem, T1 terminator, passive optical terminator) at the subscriber premise, providing an IP data path from the premise to the PACKET TRANSPORT NETWORK. It also provides a means by which voice, video and data terminals at the subscriber premise may connect to other network endpoints in the PACKET TRANSPORT NETWORK, each creating connections through a shared, routed IP data interface.

Ultimately, all subscriber terminals plugged into the EDGE SWITCH communicate with the PACKET TRANSPORT NETWORK through QoS routing capabilities built into the EDGE SWITCH. EDGE SWITCH routing capabilities enable QoS arbitration at the exact point where subscriber terminals interface the broadband access network. Video streaming services deployed within the network are made accessible to SIP media streaming devices connected to the EDGE SWITCH (such as SIP-enabled set-top boxes). Data transmission capacity not used for voice telephone communications or media streaming is made accessible to data terminals for data communications.

The EDGE SWITCH operates as a MEDIA GATEWAY to the extent that it is able to present POTS or other types of non-SIP telephones (connected through its LINE interface) to the network as SIP network signaling endpoints. The EDGE SWITCH provides necessary terminal adaptation as necessary for the conversion of device signaling and bearer channel content at the LINE interface to/from SIP network signaling and RTP voice transmission conventions required by the ESN.

The EDGE SWITCH executes locally stored call processing applications in response to detecting network trigger events. In this way, voice telephone features and related calling services are provided by the EDGE SWITCH to the subscriber through legacy POTS and/or IP telephones, without the participation of centralized network control elements.

In order to perform in the capacities described above, the EDGE SWITCH must operate as a general computing device able to execute complex software programs and store relatively large amounts of information. More specifically, the EDGE SWITCH contains the following:

Sufficient computing capacity, memory, and operating system functionality necessary to support application-level program development and application program execution; particularly the execution of call processing applications;

Sufficient storage capacity to hold an operating event history of a year or more; operating events include configuration changes and all potentially billable subscriber access to calling services (e.g. call log records);

Sufficient storage capacity to hold all call processing application executable code needed to support network service delivery according to the subscriber's Class of Service;

Sufficient storage capacity to hold local call routes and network addressing information needed to support network service delivery (via call processing applications) for all subscribers served by the EDGE SWITCH;

Sufficient storage capacity to hold subscriber Class of Service parameters and service delivery preferences needed to govern the subscriber's ability to invoke a particular calling service and the unique behavior of the service when actually invoked.

System software to support a SIP network signaling protocol stack that can be programmed to selectively expose trigger points in a call that automatically invoke service logic (i.e. call processing applications).

System software to support centralized service provisioning, device management, and software upgrades by a remote system management platform System software to support the full complement of QoS arbitration, including traffic classification, packet labeling, packet scheduling, and admission control based on subscriber Class of Service.

System software to support real-time remote monitoring of network service delivery, with active reporting of status to a remote system management platform.

System software required to meter network service delivery by generating call log records and to store them in a database internal to the EDGE SWITCH.

System software required to normalize vendor-specific terminal device interfaces to comply with network signaling and device control conventions that would enable them to interact with network-based APPLICATION SERVERS in a consistent fashion.

Secure data exchange interfaces that make EDGE SWITCH features and all information stored within its internal databases accessible to remote database clients, network management systems, and third-party applications.

Role of the Application Server in the ESN

The APPLICATION SERVER is an ESN connectivity element whose principal function is to support the delivery of network services to other ESN connectivity elements. As is common to all ESN connectivity elements, the APPLICATION SERVER is capable of intelligent participation in call sessions. It can execute internally stored call processing applications (service logic) in response to network signaling events and related trigger points in a call. An example of signaling events that would trigger service logic execution include an attempt by a SIP signaling endpoint to connect to the APPLICATION SERVER or disconnect from it once connected. Trigger points in a call might include events detected while the SIP call session is in progress, such as mid-session control messages or certain call control operations.

In most scenarios, network services or features supported by an APPLICATION SERVER are rendered directly to SIP network signaling endpoints that connect to it. For reasons of security and protocol compatibility, the APPLICATION SERVER may implement secure connection policies that prohibit access to SIP network signaling endpoints that are not directly managed or mediated by another ESN connectivity element. For example, a PC-based SIP client attempting to connect to the APPLICATION SERVER through the public internet may be prohibited from doing so; however, a PC-based SIP client attempting to connect to the APPLICATION SERVER through an EDGE SWITCH will have its SIP signaling mediated by that EDGE SWITCH—perhaps encrypted according to an internal carrier network standard—and as a result may be allowed to connect to the APPLICATION SERVER in this way.

Upon detecting a SIP call session initiation, the APPLICATION SERVER examines SIP signaling information and compares it with what it knows internally about the calling party so that it may automatically determine the feature, function, or service that it should render to the calling party. For example, if the calling party is a SIP network signaling endpoint (SIP User Agent) used by an EDGE SWITCH to represent a POTS telephone at the subscriber premise, the APPLICATION SERVER will receive the dialing number of the calling party (i.e. the dialing number assigned to the POTS telephone originating the call). It may then use this dialing number to access an internal database for the purpose of retrieving the Class of Service parameters associated with this dialing number. Class of Service parameters will inform the APPLICATION SERVER as to whether or not it should render its service to the calling party.

Aside from the number of simultaneous SIP call sessions it can potentially support—a function of its hardware form-factor—there is a fundamental difference between the APPLICATION SERVER and the EDGE SWITCH: whereas the APPLICATION SERVER renders network services and features to a calling party, the EDGE SWITCH renders network services and features to terminal devices plugged into it at the subscriber premise.

In rendering network services and features to a calling party, the APPLICATION SERVER exploits the capabilities of various system resources. Call processing applications executing on the APPLICATION SERVER may perform database queries, media store-and-forward operations, support group conferencing, convert text to speech, recognize voice commands, or any one of a number of operations that might be beyond the scope of what an EDGE SWITCH could perform without assistance from the network. By simply connecting to an APPLICATION SERVER, an EDGE SWITCH or PSTN GATEWAY may request and receive the intelligent participation of the APPLICATION SERVER when they require such assistance.

Role of the PSTN Gateway in the ESN

The PSTN GATEWAY is an ESN connectivity element whose principal function is to (a) make it possible for the EDGE SWITCH to connect to PSTN endpoints using SIP network signaling and (b) to make it possible for PSTN endpoints to connect to the EDGE SWITCH using PSTN network signaling. The PSTN GATEWAY combines the functions of the NGN architecture's SIGNALING GATEWAY, TRUNK GATEWAY, and MEDIA GATEWAY CONTROLLER so as to enable SIP call sessions connecting to it to be bridged to PSTN endpoints. It provides necessary signaling gateway functions as required to interface the PSTN using SS#7 protocols. It also provides necessary media gateway functions to convert bearer channel encoding formats at the TRUNK interface to/from SIP and RTP voice transmission conventions required by the ESN.

A connection attempt that originates in the ESN and that is intended to ultimately connect to a PSTN endpoint, will be directed to a SIP network signaling endpoint on a PSTN GATEWAY. The PSTN GATEWAY will initiate essentially the same workflow sequence used by the APPLICATION SERVER to execute internally stored call processing applications. Consistent with its specialized role in the ESN, the PSTN GATEWAY will execute a call processing application that will connect the incoming SIP call session through to the specified PSTN endpoint. Thus, an incoming SIP call from the ESN to the PSTN GATEWAY will initiate a corresponding PSTN call set-up to a PSTN endpoint through the TRUNK interface. In the reverse direction, an incoming PSTN call through the TRUNK interface will result in a SIP call set-up to a SIP network signaling endpoint in the PACKET TRANSPORT NETWORK.

Architectural Comparison of ESN to NGN

The ESN is substantively different from the NGN in a number of significant ways, and as a result of these differences, the ESN remedies certain architectural limitations inherent to the NGN as set forth in the foregoing sections. By showing how specific limitations of the NGN are resolved by the ESN, the summary below affords an opportunity to highlight important capabilities inherent to the ESN architecture within a relevant context:

(1) The potential poor performance of the NGN resulting from high processing overhead for distributed elements communicating through the network (and attendant scaling problems related thereto) is resolved by the following:

Eliminating the MEDIATE GATEWAY CONTROLLER function entirely, and instead distributing call processing capability throughout the network by embedding it in intelligent endpoint devices;

Feature-oriented network service delivery to subscribers through terminals at the premise is performed by dedicated computing resources physically located on the subscriber premise (i.e. by the EDGE SWITCH);

To the extent that the above method of feature delivery does not require assistance from the network for most call processing functions, feature responsiveness is perceived by ESN subscribers to be essentially instantaneous, regardless of the number of simultaneous ESN network users;

As a consequence of eliminating the MEDIA GATEWAY CONTROLLER function entirely, so too is the gateway control layer eliminated, effectively flattening the two-tiered NGN network signaling model into a normalized SIP network signaling model. According to the normalized SIP network signaling model, voice and multimedia connections are established peer-to-peer using the same method;

As a result of flattening the two-tiered NGN network signaling model into a normalized SIP network signaling model, overall ESN system performance with respect to APPLICATION SERVER access by EDGE SWITCHES and PSTN GATEWAYS is dramatically enhanced. The delivery of network-based features provided by APPLICATION SERVERS in the ESN is perceive by subscribers to be essentially instantaneous and relatively unaffected by the number of simultaneous ESN network users.

(2) The NGN's large number of potential bottlenecks that are introduced as a result of its numerous indeterminate scaling relationships are resolved by the following:

Reducing the number of network elements that are needed to participate in network service delivery;

Embedding feature delivery and service metering functions into the network access device (EDGE SWITCH or PSTN GATEWAY) so as to eliminate requirements for the centralized network elements to retain information about the state of any given call.

(3) Troubleshooting procedures for the NGN must isolate and resolve problems that appear to reside in more than one place because of protocol incompatiblities. This issue is resolved in the ESN by the following:

Reducing the total number of protocols;

Reducing the total number of network elements.

Managing all connectivity elements as populations of like elements, each of which supports more or less identical provisioning, device management, diagnostic, and event reporting mechanisms, and each using the same interface protocols to support similar tasks.

(4) Software integration requirements for the NGN are difficult for most carriers to implement and support. This issue is resolved in the ESN by the following:

Supporting a hardware scaling model in which ESN service delivery capability is built up in a predictable, linear fashion by replicating connectivity elements;

Embedding most subscriber-oriented features into a very low-cost device (EDGE SWITCH) that is physically replaced if an error condition is detected rather than repaired; the replacement unit is then automatically detected and re-synchronized with a system management platform so that identical network service capabilities are restored to the subscriber;

Requiring relatively few centralized software processes to support feature-oriented network service delivery, as compared to the NGN;

Utilizing SIP-based access to service logic running within APPLICATION SERVERS for advanced feature support—a method that sharply contrasts with NGN support for API access to call processing capabilities within the MEDIA GATEWAY CONTROLLER.

(5) The economic model for the NGN that has not proved compelling to carriers largely due to high implementation costs resulting from its inordinate complexity. The relative simplicity of the ESN translates into a lower relative cost for greater network service delivery capability, thereby increasing the likelihood that its economic model would be compelling enough to motivate carrier implementation. Some of the principal reasons for its simplicity relative to the NGN include the following:

The ESN is capable of delivering traditional PSTN network services and new multi-service capabilities through a common means with little or no reliance on feature-controlling infrastructure in the central office;

The ESN employs a hardware scaling model that uses primarily mass produced, low-cost EDGE SWITCHES for most of its subscriber-oriented service delivery;

The ESN requires dramatically less effort to test compared to the NGN, since validating the feature set of a single EDGE SWITCH for a certain number of concurrent sessions confers validation of the ability to support any multiple of that certain number of concurrent sessions by deploying a proportionate multiple of additional EDGE SWITCHES;

The ESN enjoys very low implementation costs due to the fact that its network integration is based on relatively few protocols other than SIP. The MEGACO protocol stack is eliminated from the model, along with all attendant requirements for licensing and interoperability testing between MEGACO-compliant network elements.

As a consequence of these factors, overall system cost for the ESN on a per-user basis has been calculated to be less expensive than PSTN technology to provide an equivalent feature. Overall system cost for the ESN has been estimated to be less expensive than the NGN to provide an equivalent feature.

In consideration of the above cost estimates, it should be noted that indeterminate scaling relationships in the NGN, and the lack of deployed NGN networks that could be used for direct comparison, are factors that together confound attempts to quantify the true implementation cost of an actual NGN deployment. A theoretical calculation of cost-per-subscriber (i.e. an estimate) in the NGN might not necessarily reflect actual feature delivery capacity because of unanticipated effects that are likely to result from its highly decomposed architecture.

Support for New Services in the ESN

Support for new services by the ESN is made possible because of several capabilities that are inherent to its architecture. Some of these capabilities are described as follows:

The ESN supports voice, video and data-oriented network services through a common (i.e. shared) IP data path, providing QoS arbitration at the premise as is required to support multi-service delivery; thus, new services can be offered for each type of media, or new services can combine features that involve more than one type of media into a single multimedia service. As an example, a feature could be created to lower the volume of the television if someone answered the telephone;

Feature delivery by the EDGE SWITCH is remotely programmable by the carrier; software loads can be uploaded into the EDGE SWITCH to introduce new features over time without network infrastructure changes;

The ESN subscriber may interact with the EDGE SWITCH to select features and program them to behave according to subscriber-specific parameters, potentially to interoperate with a variety of third-party applications, application programs running on the subscriber's PC, or to securely access data objects stored in network servers or on the subscriber's PC. As an example, an application could use instant messaging to inform the end user as to the identity of a calling party.

Most ESN network intelligence is located within the EDGE SWITCH itself. A large part of this "network intelligence" includes the EDGE SWITCH'S ability to internally store call log records and other subscriber-specific information related to network service delivery. This stored information in effect comprises a distributed database of virtually unlimited scalability. New service opportunities are made possible by virtue of the fact that this information may be securely accessed by an application and subsequently presented to an end user within the context of interactive calling services. As an example, network-based web applications may be created to provide end users access to multi-year call histories managed through a web browser-based graphical user interface.

Because of its SIP-based network signaling model, the EDGE SWITCH can perform complex call control operations that involve SIP network signaling endpoints located virtually anywhere in the network. This support for complex call control operations by the EDGE SWITCH in effect enables it to function as a distributed call control resource of virtually unlimited scalability. New service opportunities are made possible by virtue of the fact that this capability can be securely accessed by an application and subsequently presented to an end user within the context of interactive calling services. As an example, network-based web applications may be created to provide end users the ability to access EDGE SWITCH calling features through a web browser-based graphical user interface.

EDGE SWITCH call control operations can be used to transparently access network-based features provided by APPLICATION SERVERS. As a result, combinations of call control features internal to the EDGE SWITCH and network-based features that are external to the EDGE SWITCH can be dynamically configured and presented together to end users as a unified service or capability—that is, presented in such a way that the source of the feature (internal to the EDGE SWITCH or network-based) is entirely transparent to the end users. Thus, beyond its ability to support programmable internal feature sets via software upgrades and configurable call processing applications, the EDGE SWITCH feature set may be further extended through transparent integration with network-based features. As an example, an EDGE SWITCH feature may be created to override basic dial-tone service: when an EDGE SWITCH detects that a telephone plugged into it went off-hook, the override feature would forgo the basic dial-tone service and instead transparently connect to a network-based voice-activated dialing application.

In general, in one aspect, the invention features a network device including a plurality of communication interfaces, among which there is a telephone line interface, a computer data interface, and a broadband network interface. The network device also includes a processor; a machine-readable storage medium which during use stores a call processing application and service profiles, and which stores executable instructions to mediate communications between the plurality of communication interfaces, the instructions causing the network device to detect network signaling events or trigger points in a telephone call and invoke the call processing application in response to the detected network signaling events or trigger points, the call processing application operating according to parameters defined in the service profiles.

Preferred embodiments include one or more of the following features. The plurality of communication interfaces further includes a video streaming device interface. The broadband network interface terminates a broadband network link that joins a customer premises to a packet carrier network. The instructions further cause the network device to route IP data between the computer data interface and the broadband network interface. The network device is contained in a single physical enclosure. The instructions further cause the network device to provide a first SIP proxy agent to represent a telephone that uses the telephone line interface, and provide a second SIP proxy agent to represent a computer that uses the computer data interface. The storage medium stores call routing tables, and the instructions further cause the network device to perform call routing for telephone calls that use the telephone line interface. The storage medium also stores call routing tables, and the instructions cause the network device to perform call routing for telephone calls according to the call routing tables, the telephone calls using the telephone line interface.

In general, in another aspect, the invention features a network device including a plurality of communication interfaces among which there is a telephone line interface, a computer data interface, and a broadband network interface. The network device also includes a processor; a machine-readable storage medium which during use stores call routing tables, and which stores executable instructions to mediate communications between the plurality of interfaces, the instructions causing the network device to perform call routing according to the call routing tables, the telephone calls using the telephone line interface.

Preferred embodiments include one or more of the following features. The call routing includes peer-to-peer call signaling between customer premises over a shared IP network. The call signaling is performed without requiring stateful elements of the shared IP network above the IP infrastructure. The broadband network interface terminates a link that joins the network device to the shared IP network. The call routing includes call signaling to a PSTN endpoint via a PSTN gateway that is reachable over the broadband network interface. The instructions further cause the network device to route IP data between the computer data interface and the broadband network interface. And the plurality of communication interfaces further includes a video streaming device interface.

In general, in still another aspect, the invention features a network device including a plurality of communication interfaces, among which there is a telephone line interface, a computer data interface, and a broadband network interface. The network device also includes a processor; and a machine-readable storage medium which stores executable instructions to mediate communications between the plurality of interfaces, the instructions causing the network device to log a telephone event record to a telephone event repository, the event record describing a telephone call communication mediated by the network device.

Preferred embodiments include one or more of the following features. The telephone event repository can be included in the network device or be remote relative to the network device. The network device is housed in a single physical enclosure.

In general, in still yet another aspect, the invention features a network device includes a broadband network interface; a plurality of interfaces, among which there is a telephone line interface and a computer data interface; a processor; and a machine-readable storage medium that stores processor-executable instructions to provide proxy agents. The instructions cause the network device to provide a telephone SIP proxy agent to represent a non-SIP telephone that uses the telephone line interface; provide a distinct SIP proxy agent for each additional device that uses an interface in the plurality of interfaces; and cause the network device to implement a proxy server that mediates all SIP communications over the broadband network interface involving the non-SIP telephone and the each additional devices.

In general, in another aspect, the invention features a method for establishing a voice-over-packet network architecture. The method includes locating a system management platform in a shared packet network, the system management platform collecting call log data from a plurality of network devices; and distributing the plurality of network devices that each include a telephone line interface, a computer data interface, a broadband network interface terminating a link from the shared packet network, a processor, and a machine-readable storage medium storing processor-executable instructions to control telephone calls, the instructions causing each network device to route telephone calls in a peer-to-peer fashion over the shared packet network and to send call log data to the system management platform.

The details of one or more embodiments of the invention are set forth in the accompanying drawings and the description below. Other features, objects, and advantages of the invention will be apparent from the description and drawings, and from the claims.

DESCRIPTION OF DRAWINGS

Conventions

Figures utilize a dotted-decimal number scheme to identify system elements using a bracket notation shown as "[number]." The decimal is used to denote a sub-element dependency. Programmatic relationships and call signaling pathways are numbered using a curly brace notation shown as "{number}" where the number is a tag used to identify these relationships and pathways in the discussions and do not imply order of operations. With respect to the relationship between network elements and network connectivity clouds shown in the figures, solid connector lines denote physical network interfaces whereas dotted lines denote message-passing protocol relationships in which protocol data units are exchanged through an IP data path. Many discussions will apply terminology based on the seven layer Open System Interconnection (OSI) Reference Model.

A DEFINITIONS section provides detailed descriptions of selected terms and system elements as they pertain to the invention. The DEFINITIONS section follows the OVERVIEW section. System elements that are depicted in figures will show a number identifier in brackets so that they may cross-referenced.

Table of Figures

Figure 1:
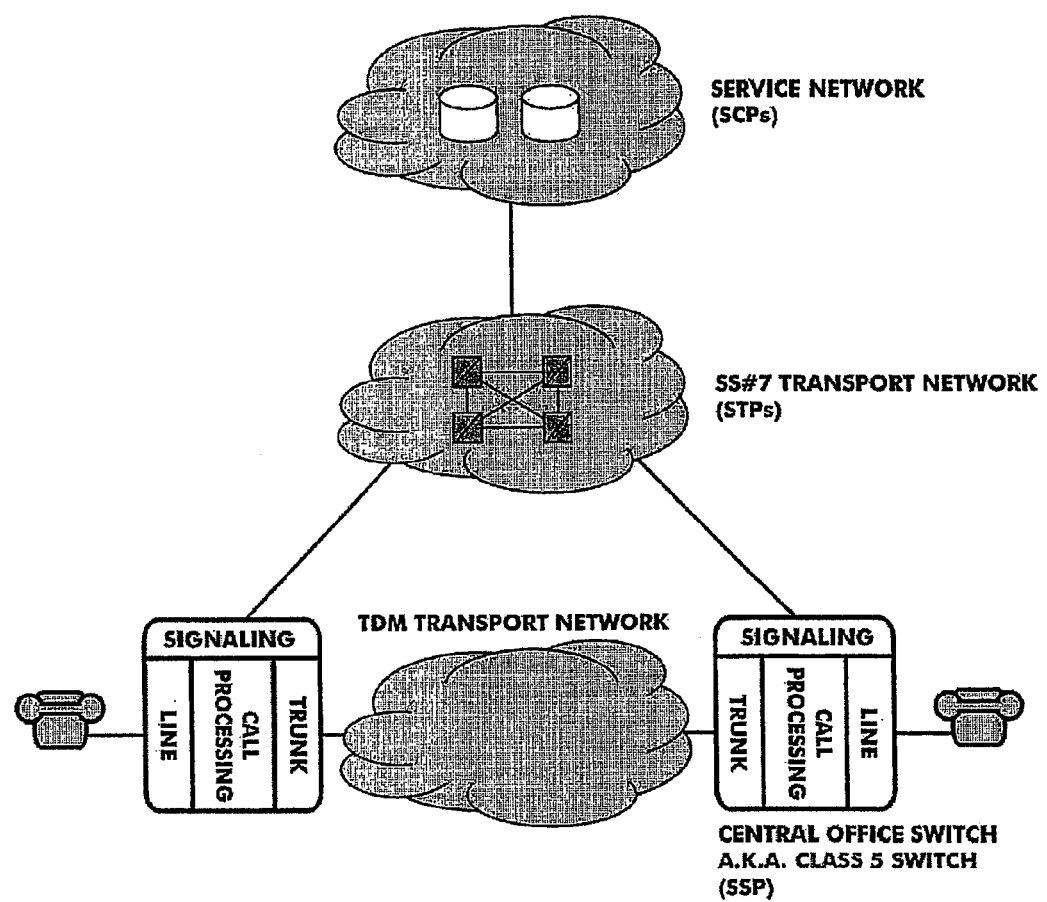

FIG. 1 shows the structure of PSTN and AIN with Signaling, Transport, and Service Control.

Figure 2:
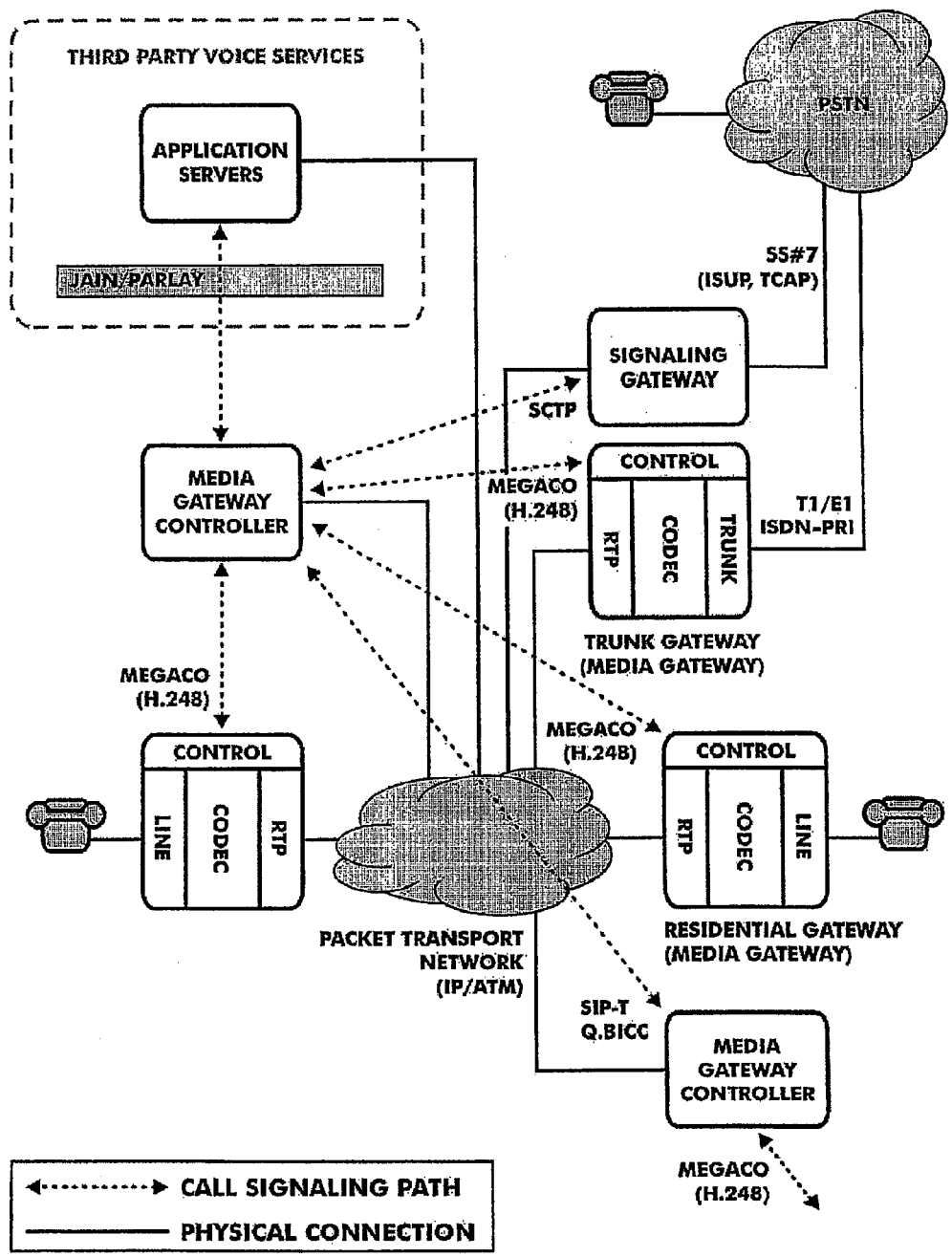

FIG. 2 shows a Next Generation Network Architecture.

Figure 3:
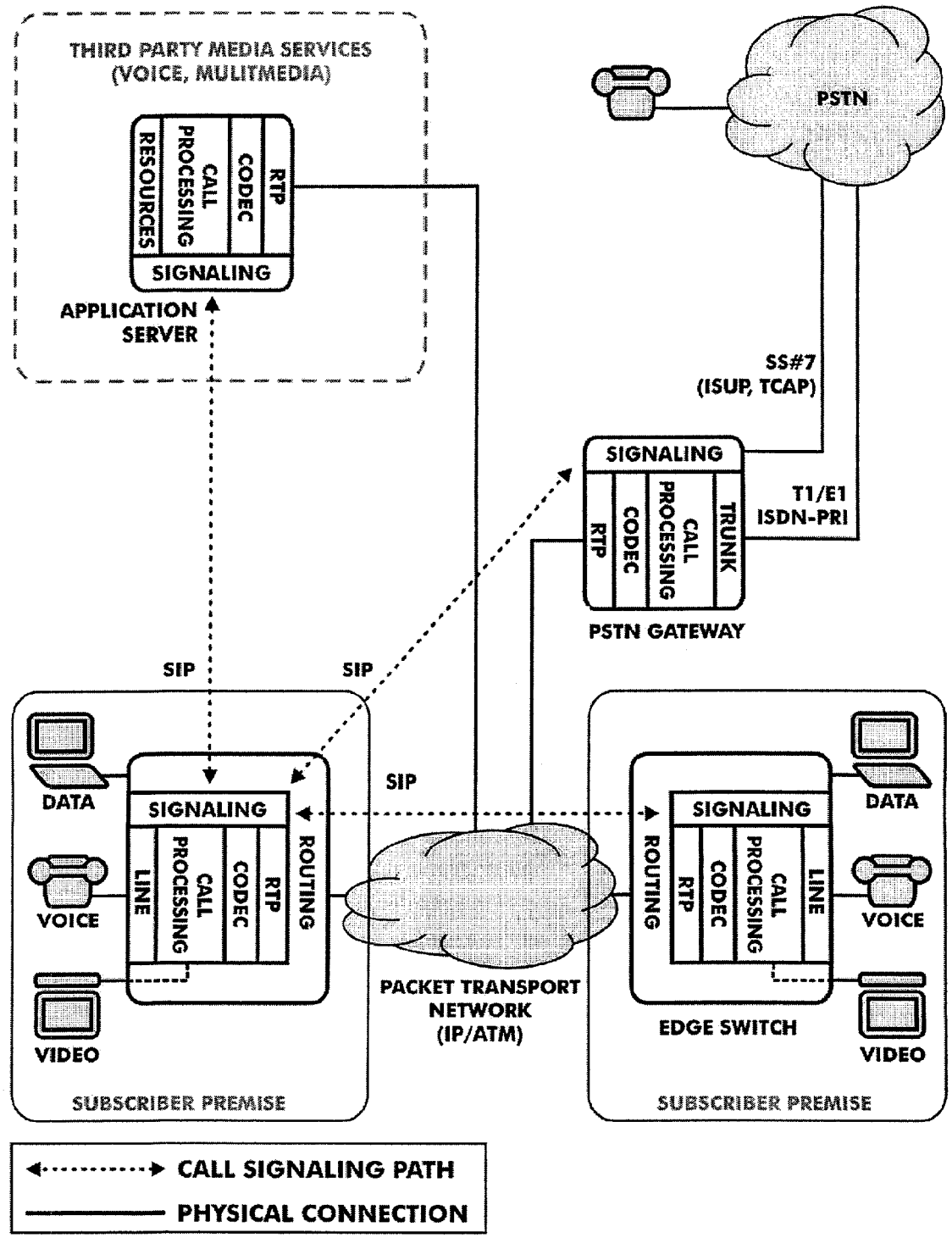

FIG. 3 shows An Edge Switched Network Architecture.

Figure 4:
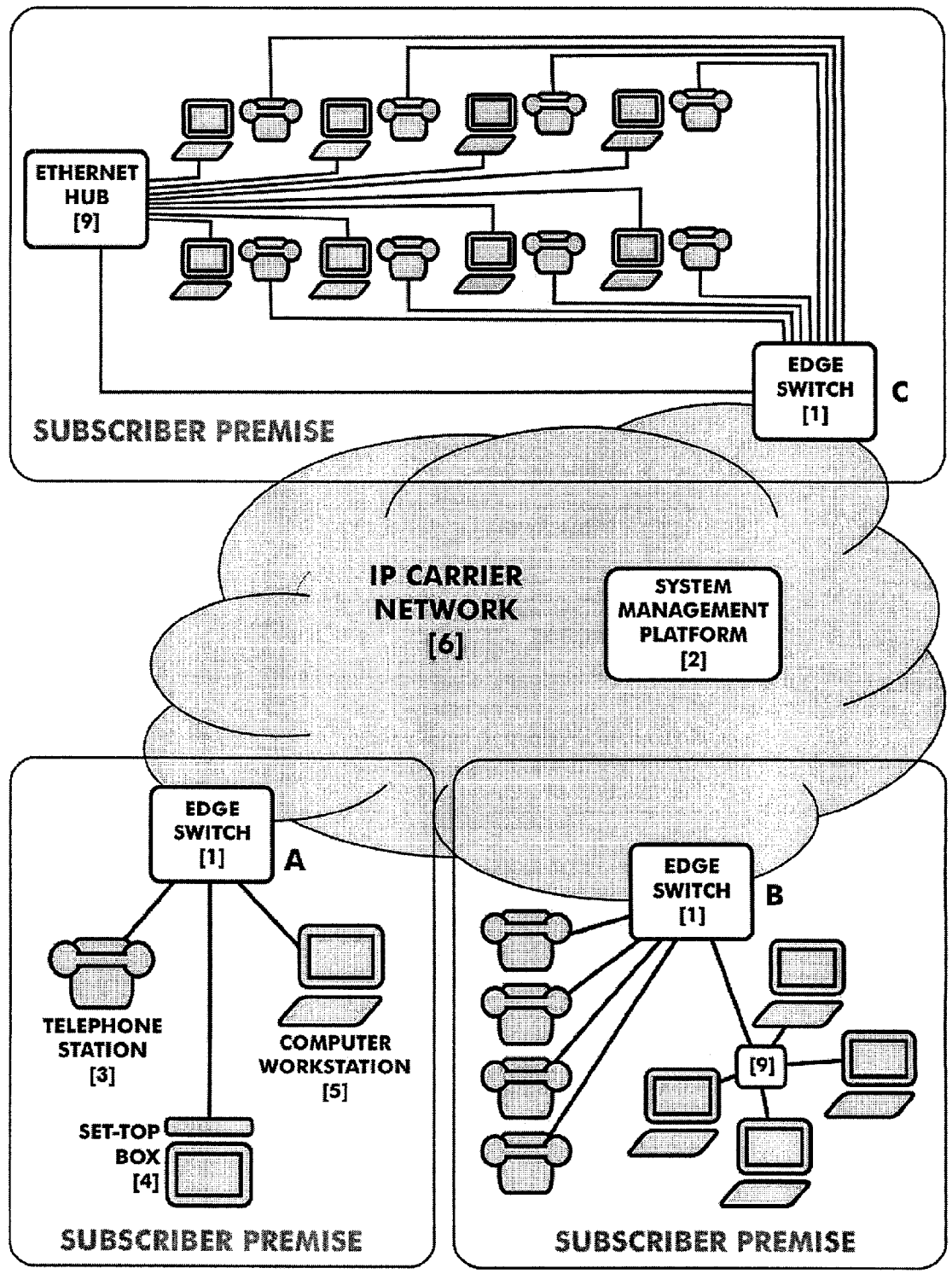

FIG. 4 shows A Distributed Edge Switch.

Figure 5:
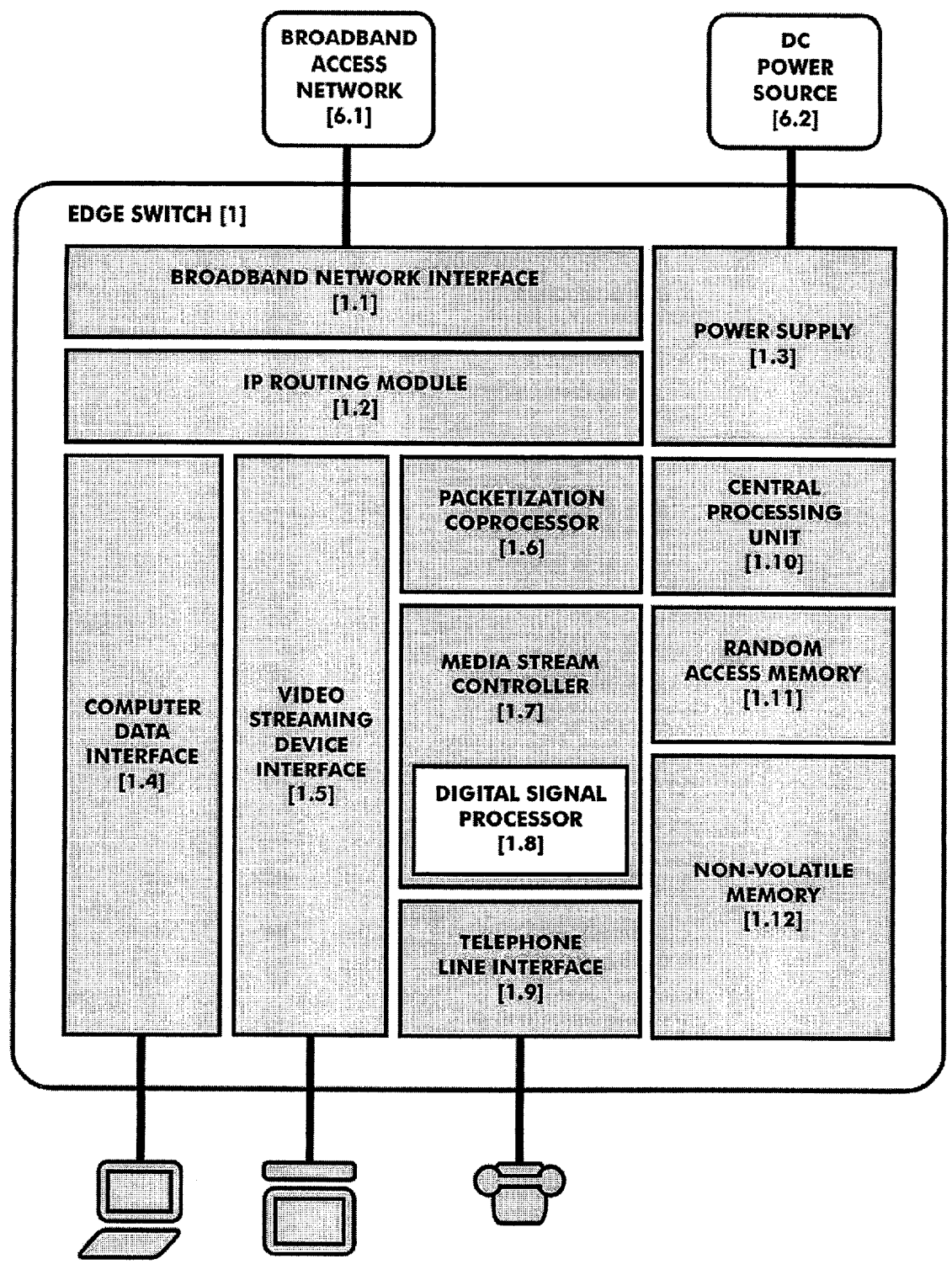

FIG. 5 shows the Edge Switch Hardware Architecture.

Figure 6:
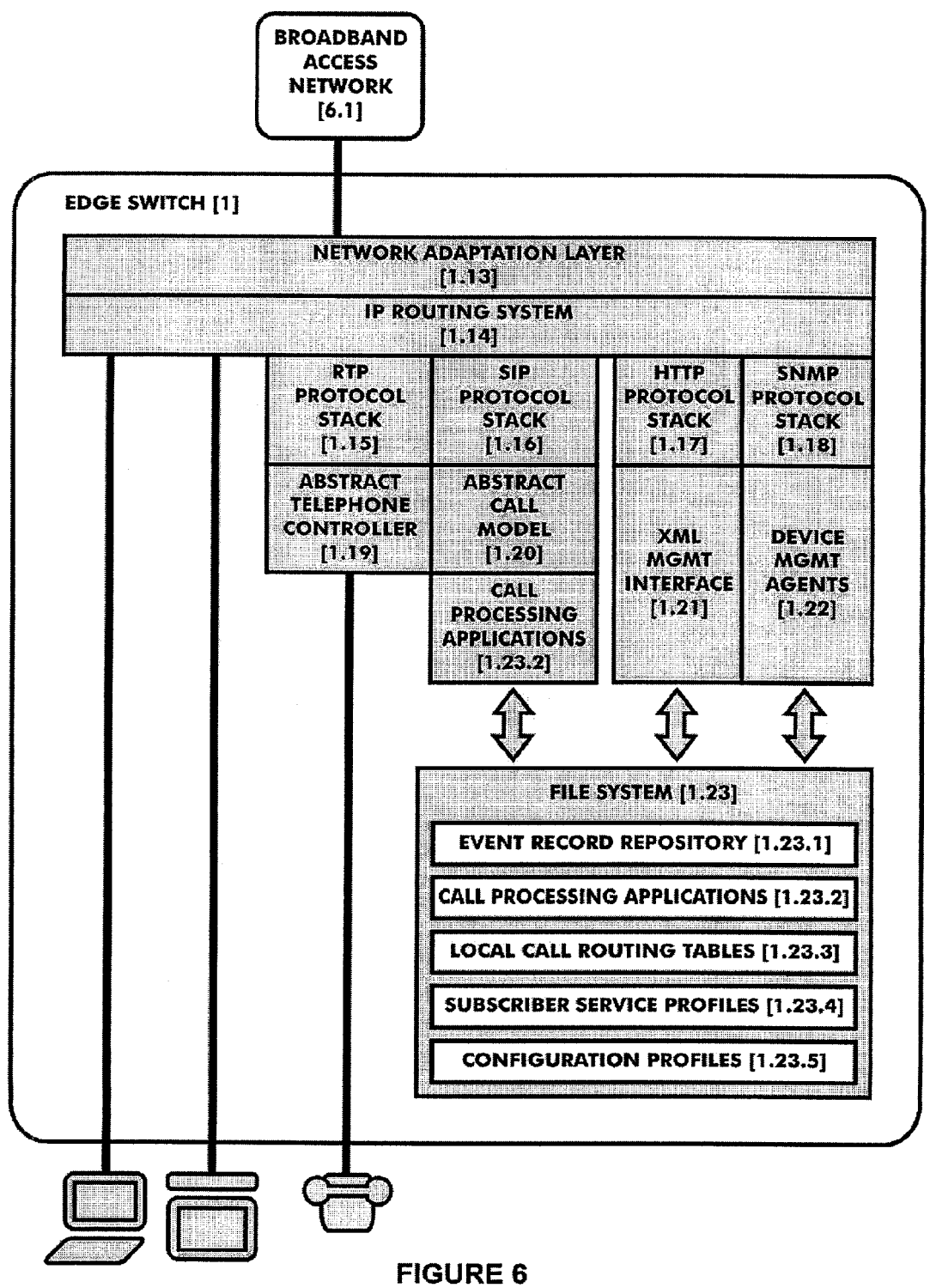

FIG. 6 shows the Edge Switch Software Architecture.

Figure 7:
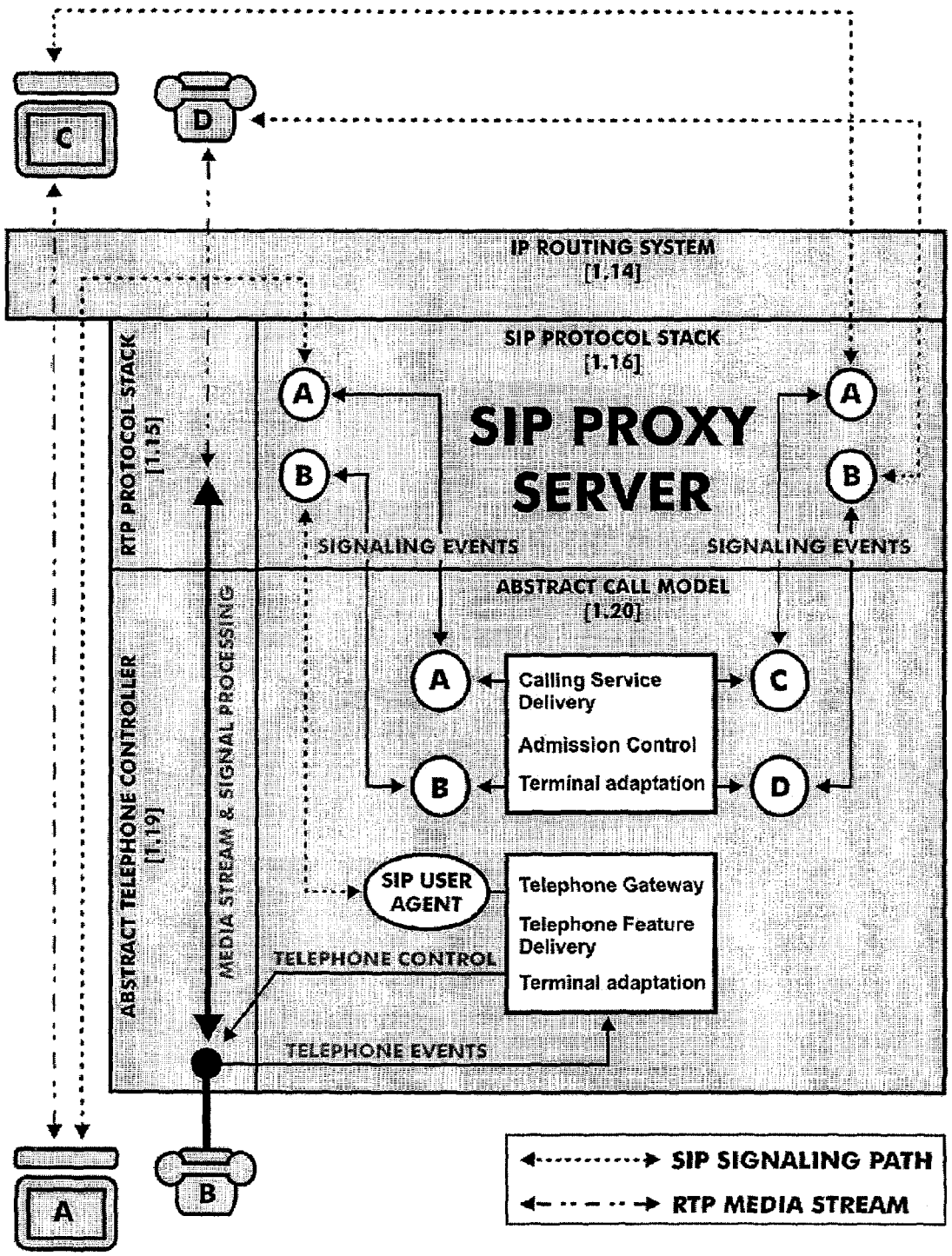

FIG. 7 shows the Edge Switch Call Model.

Figure 8:
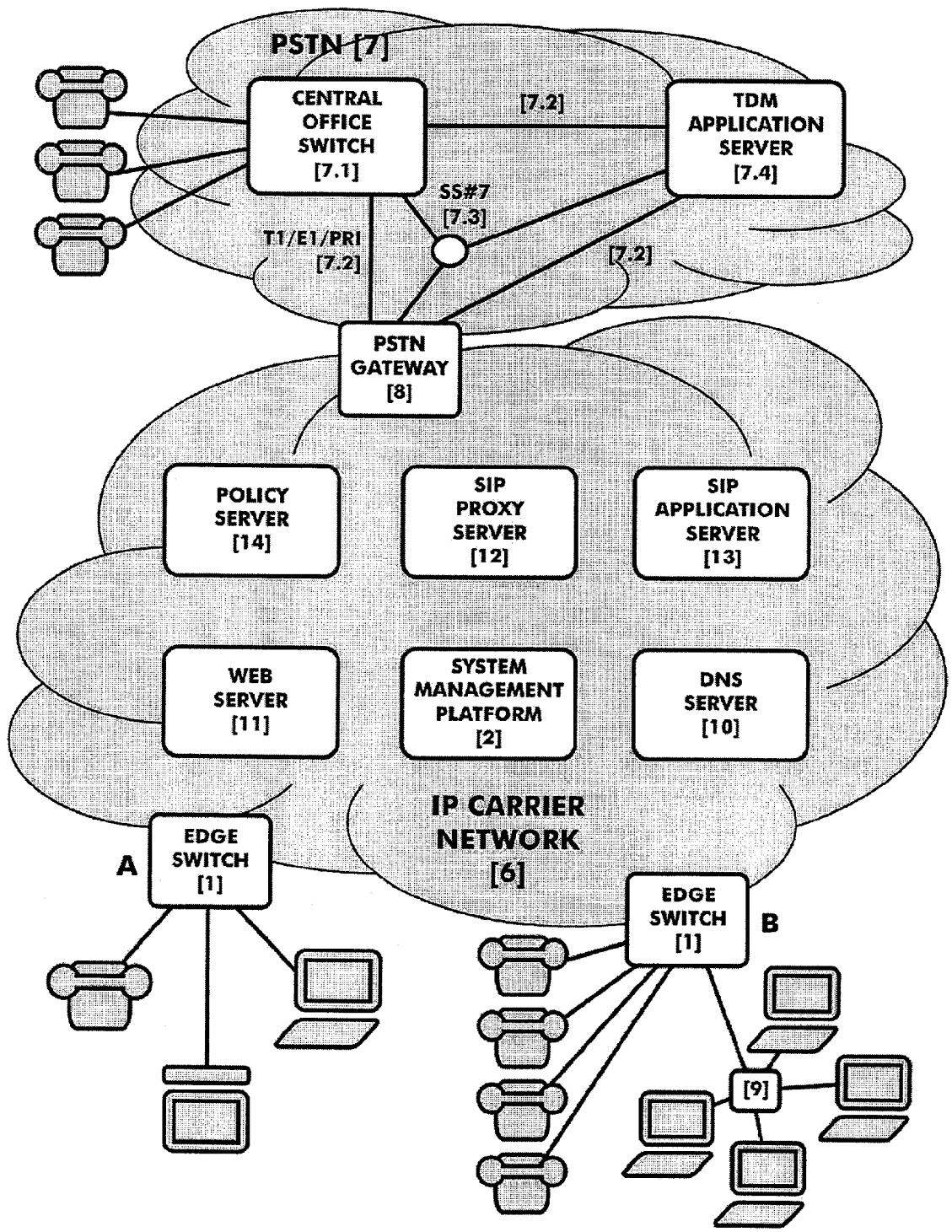

FIG. 8 shows the Distributed Edge Switch Carrier Network Reference Architecture.

Figure 9:
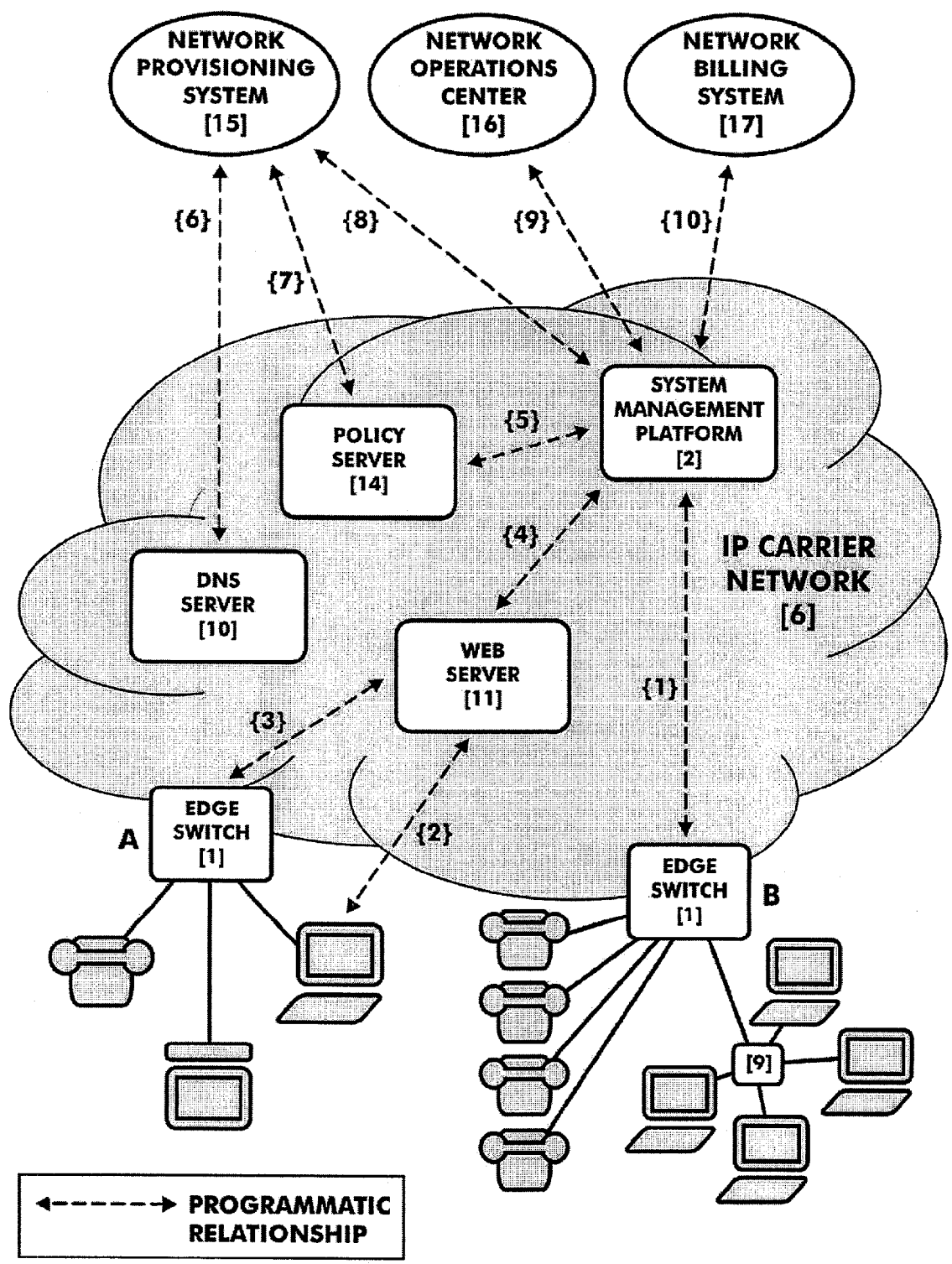

FIG. 9 shows the Distributed Edge Switch System Management Workflow.

Figure 10:
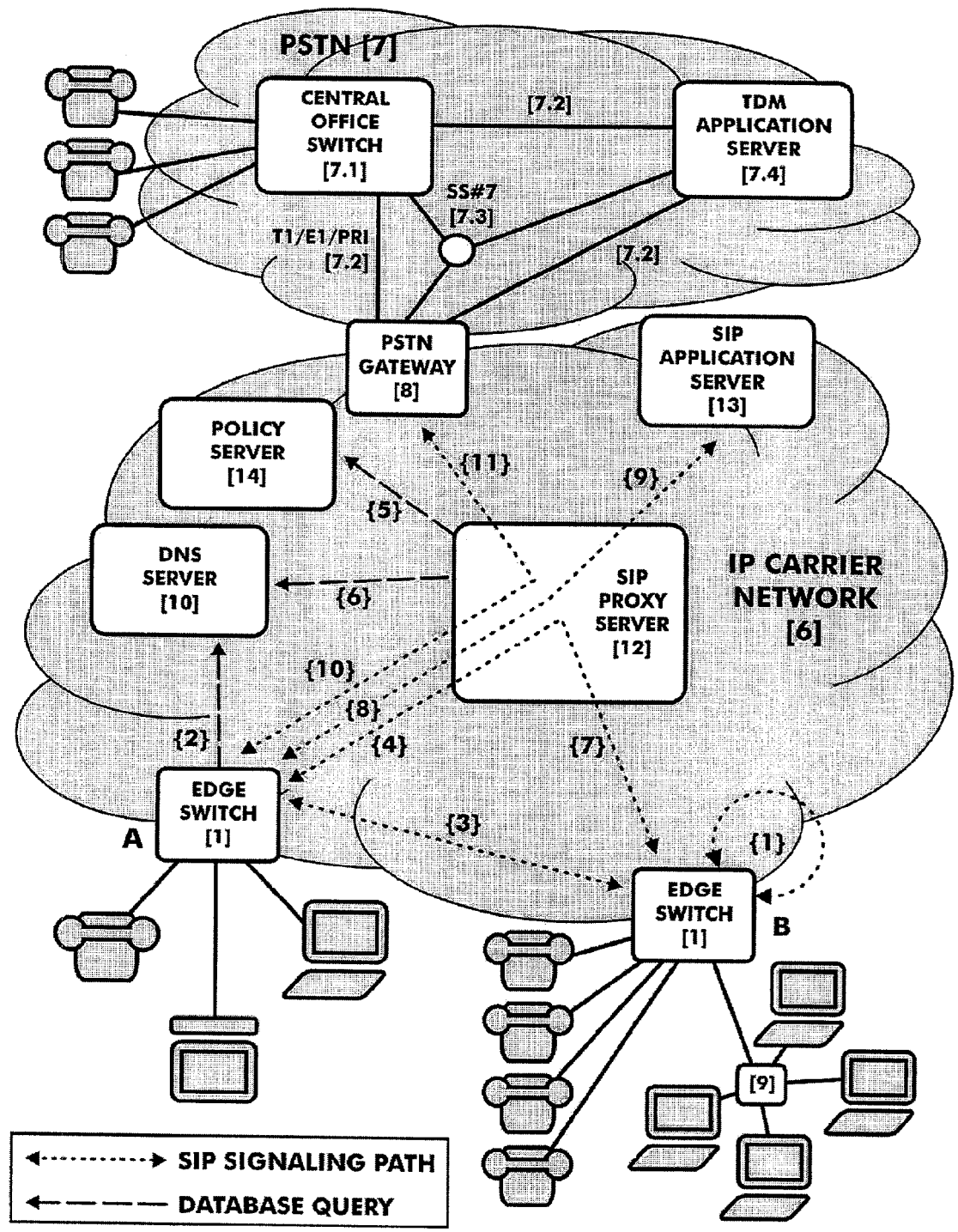

FIG. 10 shows the Distributed Edge Switch Call Signaling Workflow.

Figure 11:
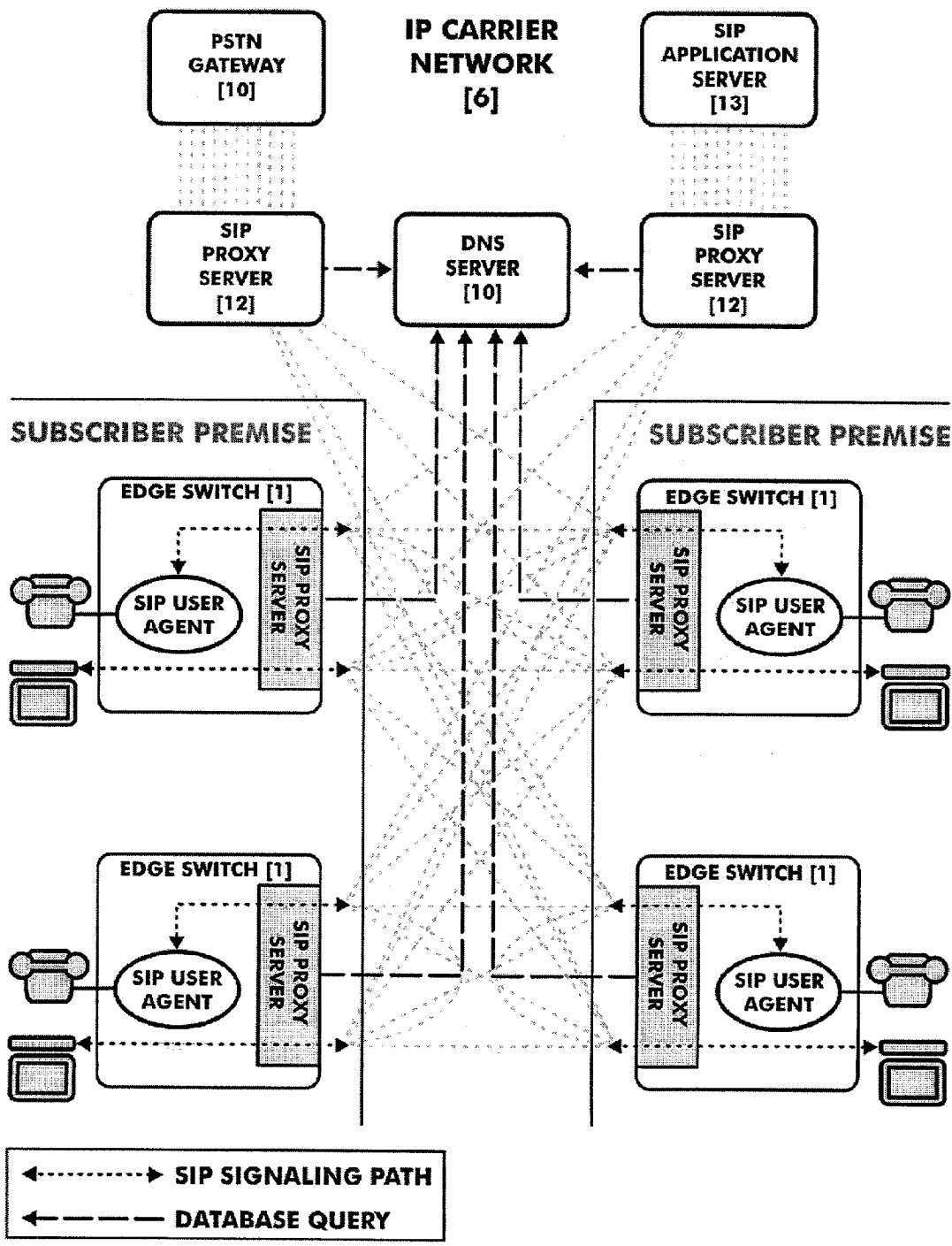

FIG. 11 shows the Distributed Edge Switch as Distributed SIP Proxy Server.

Figure 12:
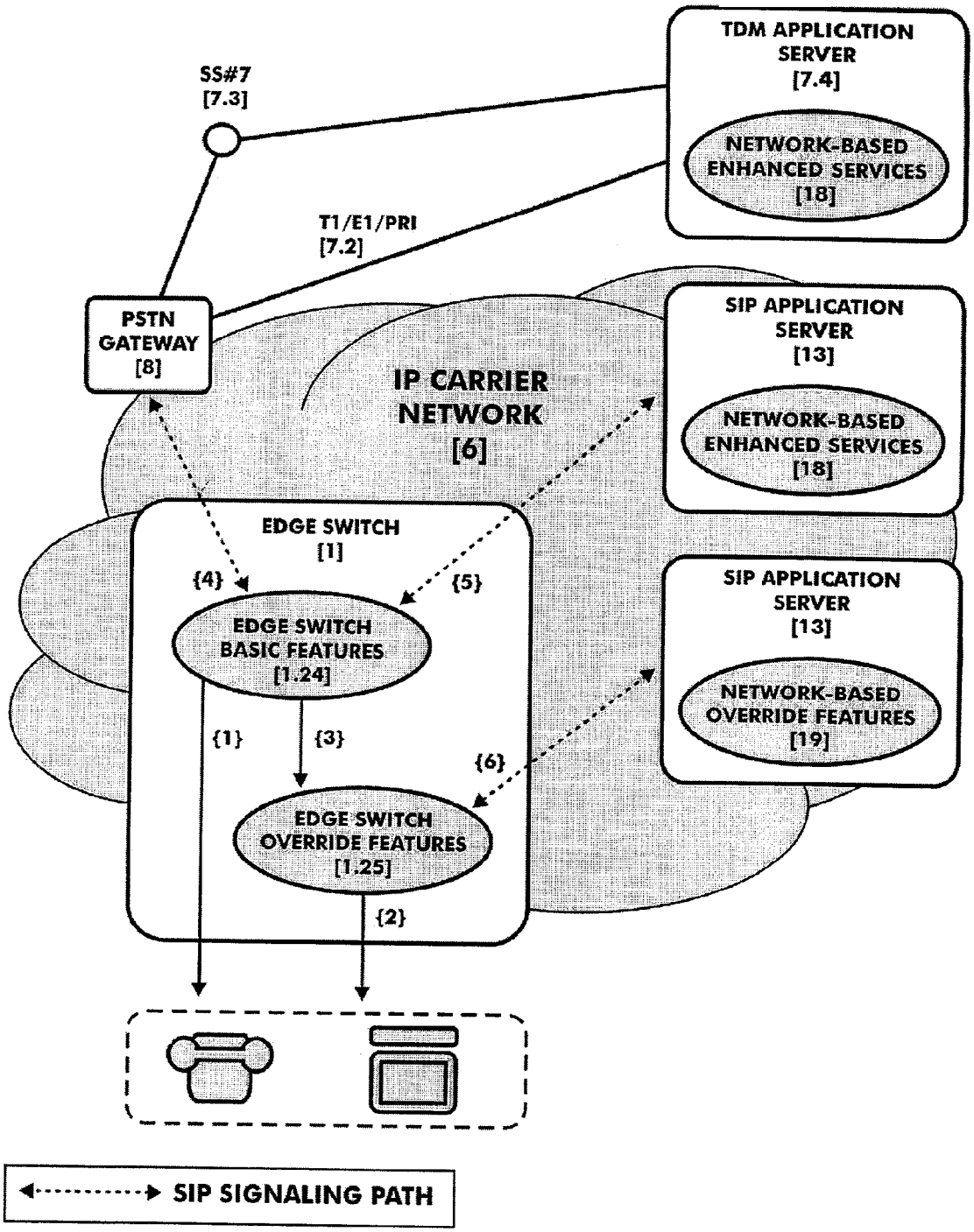

FIG. 12 shows the Distributed Edge Switch Network Service Delivery Workflow.

Figure 13:
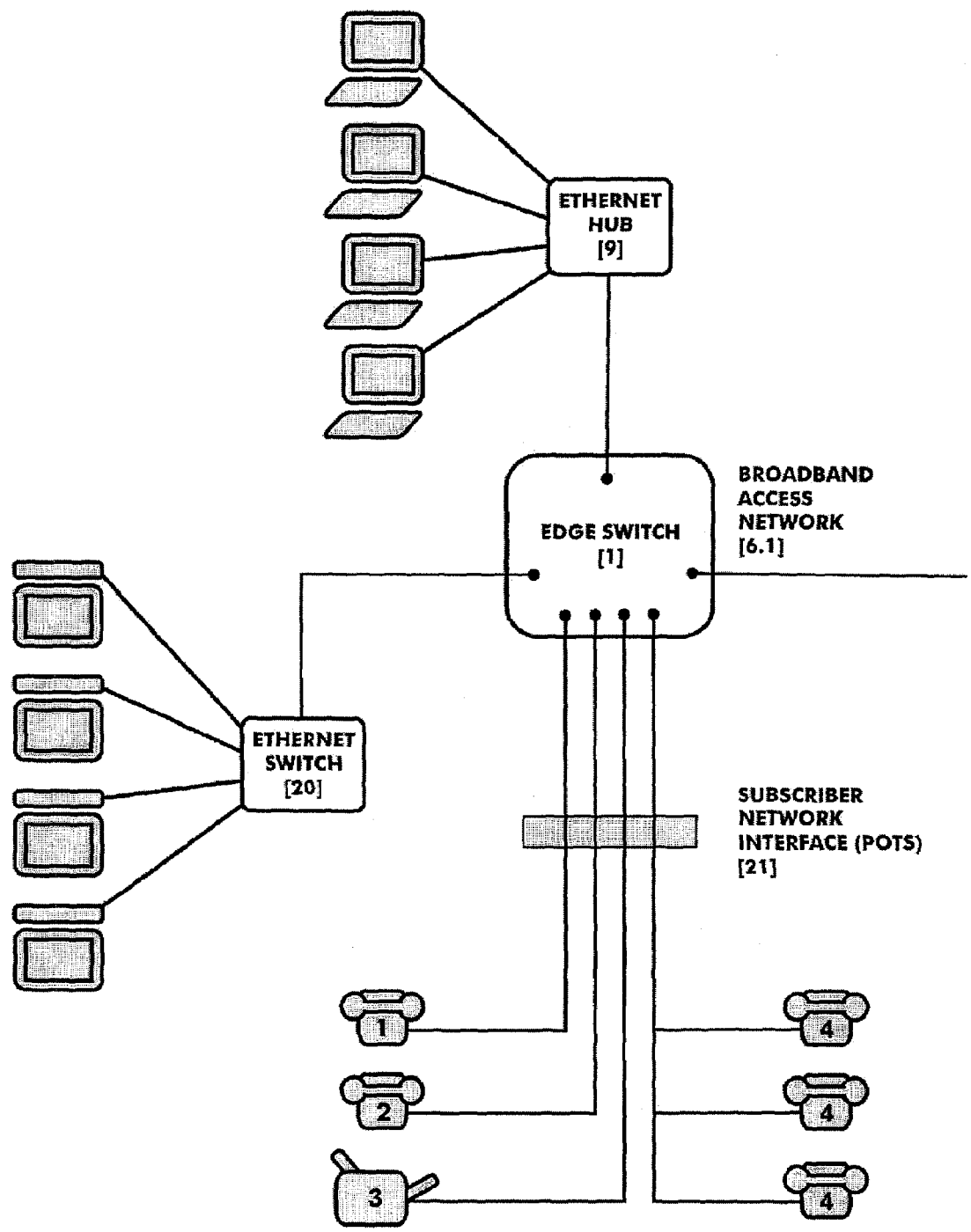

FIG. 13 shows an Edge Switch For Residential Subscriber Deployment Using VDSL Broadband Access Network Like reference symbols in the various drawings indicate like elements.

DETAILED DESCRIPTION

Overview

The DES described below is new whereas the PSTN GATEWAY and APPLICATION SERVER elements of the ESN are assumed to represent existing specific categories of network elements originally designed for integration into the NGN. Since they present themselves to the network as SIP network signaling endpoints, they are also suitable for deployment within the ESN.

In the ESN architecture, the EDGE SWITCH serves as the means to deliver network services to subscribers. The DES is an implementation of the EDGE SWITCH described for the ESN, and thus should be viewed as its functional equivalent. While the BACKGROUND section focused on the role of a generic EDGE SWITCH in the ESN, this OVERVIEW section, in conjunction with the DEFINITIONS section and FIGS. 4–11, provides sufficient technical information necessary to implement an actual EDGE SWITCH in the form of a DES. Most detailed technical descriptions of hardware and software subcomponents, and their detailed functional contributions, are contained with the DEFINITIONS section. This OVERVIEW section will focus on articulating their respective roles as DES system elements with the architectural context of the ESN.

FIG. 13 depicts an embodiment of an actual EDGE SWITCH design that is suitable for residential subscriber deployment using a Digital Subscriber Line (DSL) connection to a broadband broadband access network.

FIG. 4 depicts the two basic elements that comprise the DES: the EDGE SWITCH [1] and the SYSTEM MANAGEMENT PLATFORM [2]. As shown, the SYSTEM MANAGEMENT PLATFORM [2] resides within the IP CARRIER NETWORK [6] whereas the EDGE SWITCHES

[1] are deployed at the subscriber (customer) premise. A description of these individual elements may be found in the DEFINITIONS section.

FIG. 4 shows network elements of the DES apart from the full complement of those shown for the ESN architecture; as a result, FIG. 4 serves to aid in understanding the DES itself.

Form-Factor Considerations

The EDGE SWITCH [1] can be constructed to support any number of form-factors, depending upon the transmission capacity of the BROADBAND ACCESS NETWORK [6.1] and the number of TELEPHONE STATIONS [3] and SET-TOP BOXES [4] the designer believes is appropriate for a single instance of an EDGE SWITCH [1]. FIG. 4 depicts three distinct form-factors, with EDGE SWITCHES [1] labeled A, B, and C supporting 1, 4, and 8 TELEPHONE STATIONS [3] respectively.

The choice of form-factor will effect the ratio of TELEPHONE STATIONS [3] to COMPUTER WORKSTATIONS [5]. Regardless of the number of TELEPHONE STATIONS [3] supported by a given EDGE SWITCH [1] form-factor, one instance of an EDGE SWITCH [1] will support only one COMPUTER DATA INTERFACE [4]. This circumstance results because the basic design of the EDGE SWITCH [1] is to manage all of the transmission capacity for a single physical connection to the BROADBAND ACCESS NETWORK [6.1], and to manage it as a shared IP data path for use by all terminal devices connected to it. Any transmission capacity that is not used for voice and video call sessions is made available for common data transport through the COMPUTER DATA INTERFACE [4]. As shown for the EDGE SWITCHES [1] labeled B and C, an ETHERNET HUB [9] may be plugged in place of a COMPUTER WORKSTATION [5] for the purpose of distributing data service to several COMPUTER WORKSTATIONS [5].

Data Service Aggregation

Any number of EDGE SWITCHES [1] may be deployed at a single subscriber premise. If the subscriber has more TELEPHONE STATIONS [3] or SET-TOP BOXES [4] than can be supported by a single EDGE SWITCH [1], another EDGE SWITCH [1] is connected to the BROADBAND ACCESS NETWORK [6.1] to enable more TELEPHONE STATIONS [3] and/or SET-TOP BOXES [4] to be plugged in. Deploying more than one EDGE SWITCH [1] at the same premise may require that the COMPUTER DATA INTERFACES [1.4] are aggregated together into a single data service—the subscriber is likely to want all COMPUTER WORKSTATIONS [5] at the premise to be interconnected through a common local area network (LAN) with a single uplink to the public network (i.e. Internet).

For purposes of data service redundancy and increased bandwidth, many businesses aggregate a number of BROADBAND ACCESS NETWORK [6.1] connections into a single data service to which they connect their LAN, usually through a router. In the example above (in which more than one EDGE SWITCH [1] is used to support more TELEPHONE STATIONS [3] than can be supported by one EDGE SWITCH [1] alone), a low-cost aggregation router may be installed to load-balance LAN access to the public network evenly across the COMPUTER DATA INTERFACES [1.4]. To achieve this configuration would be a cable plug-in operation: the LAN side port of the aggregation router would be connected to the LAN hub; uplink ports on the aggregation router would connect it to the COMPUTER DATA INTERFACES [1.4].

Modes of Communication

Because all of the EDGE SWITCHES [1] are connected to an IP CARRIER NETWORK [6], and because each EDGE SWITCH [1] supports call sessions using SIP network signaling, the communications between EDGE SWITCHES [1] is for the most part peer-to-peer. Excepting the circumstance in which a call session has one of its endpoints in a network other than the IP CARRIER NETWORK [6] (i.e. PSTN), a SIP network signaling endpoint at one EDGE SWITCH [1] simply "invites" a SIP network signaling endpoint at another EDGE SWITCH [1] to joint it in a call session. Usually, the participating endpoints negotiate to create voice or video (multimedia) streams between them.

Communications between TELEPHONE STATIONS [3] are usually based on E.164 dialing number addressing. The EDGE SWITCHES [1] perform the necessary conversion (using network-based resources) to dynamically associate a dialing number with an IP address, as required to set-up the SIP call session. Communications between SET-TOP BOXES [4] may be based on E.164 dialing number addressing or some other carrier-specific naming or addressing convention. SET-TOP BOXES [4] typically connect to a SIP APPLICATION SERVER and thus may use a different scheme.

Communications between COMPUTER WORKSTATIONS [5] are based on IP-based data communication protocols. The EDGE SWITCH [1] takes an active role in non-SIP data communications initiated by COMPUTER WORKSTATIONS [5] plugged into the COMPUTER DATA INTERFACE [1.4]. Data communications through the EDGE SWITCH [1] are filtered through a programmable firewall feature set internal to the EDGE SWITCH [1] and Network Address Translation (NAT) services may also be applied. In addition, the EDGE SWITCH [1] performs QoS arbitration between all terminals competing for broadband access network transmission capacity, and as a result may attenuate the flow of IP packets available for data communications as transmission capacity is dynamically reserved for voice and video transmission.

Edge Switch Hardware Architecture

FIG. 5 depicts a generalized hardware architecture for the EDGE SWITCH [1]. The BROADBAND NETWORK INTERFACE [1.1] physically connects (OSI Layer 1) the EDGE SWITCH [1] to the BROADBAND ACCESS NETWORK [6.1]. Its ultimate role is to provide a datalink communication path through the BROADBAND ACCESS NETWORK [6.1] (OSI Layer 2) to the routed IP CARRIER NETWORK [6] (OSI Layer 3). Inside the EDGE SWITCH [1] itself, the BROADBAND NETWORK INTERFACE [1.1] ultimately presents an IP data path in the network layer to the IP ROUTING MODULE [1.2] (OSI Layer 3). The physical connection provided by the BROADBAND NETWORK INTERFACE [1.1] may serve as the DC POWER SOURCE [6.2] in some networks. Otherwise, the POWER SUPPLY [1.3] will require a DC POWER SOURCE [6.2] from the subscriber premise.

The COMPUTER DATA INTERFACE [1.4] and the VIDEO STREAMING DEVICE INTERFACE [1.5] provide physical interfaces for COMPUTER WORKSTATIONS [5] and SET-TOP BOXES [4] respectively. The TELEPHONE LINE INTERFACE [1.9] provides a physical interface for TELEPHONE STATIONS [3]. The IP ROUTING MODULE [1.2] provides for QoS routing of IP packets through the COMPUTER DATA INTERFACE [1.4] and the VIDEO STREAMING DEVICE INTERFACE [1.5]. It also provides for remote access to EDGE SWITCH [1] data exchange interfaces, management interfaces and feature activation interfaces through the IP data path to the IP CARRIER NETWORK [6].

The TELEPHONE LINE INTERFACE [1.9] converts device-level telephone signals (e.g. POTS telephone signals) to/from digitally encoded audio streams and digitally encoded device states (e.g. off-hook, on-hook, DTMF digits). The MEDIA STREAM CONTROLLER [1.7] interfaces the TELEPHONE LINE INTERFACE [1.9] and is responsible for routing these media streams to/from the PACKETIZATION COPROCESSOR [1.6], performing media format transcoding (as required) by applying digital signal processing algorithms to them. Digital signal processing algorithms run on the DIGITAL SIGNAL PROCESSOR [1.8]. The PACKETIZATION COPROCESSOR [1.6] takes responsibility for media stream transmission through the IP ROUTING MODULE [1.2] using RTP.

The CENTRAL PROCESSING UNIT [1.10] is responsible for supervising all network communications through the EDGE SWITCH [1], using the RANDOM ACCESS MEMORY [1.11] to execute an operating system, network communications protocol stacks, and CALL PROCESSING APPLICATIONS [1.23.2]. All of these software components are stored in a FILE SYSTEM [1.23] that uses the NON-VOLATILE MEMORY [1.12] as its storage medium. NON-VOLATILE MEMORY [1.12] is used to store a variety of databases, configuration files, and event histories.

Edge Switch Software Architecture

FIG. 6 depicts a software architecture for the EDGE SWITCH [1]. The software components and subsystems shown should be viewed as control logic to be layered over the EDGE SWITCH [1] hardware architecture depicted in FIG. 5. Certain software elements serve as hardware abstractions that maintain a direct control relationship over a particular hardware subcomponent. Other software elements support operations that do not directly relate to any particular hardware subcomponent, but in fact impart higher functionality to the EDGE SWITCH [1] as a whole.

QoS IP Routing Functions

The NETWORK ADAPATION LAYER [1.13] represents programmable logic, firmware, or software subcomponents required to enable the BROADBAND NETWORK INTERFACE [1.1] to present IP connectivity to the IP ROUTING MODULE [1.2] in OSI Layer 3. The NETWORK ADAPATION LAYER [1.13] is designed to be maintained as a discreet subsystem apart from the IP ROUTING SYSTEM [1.14] so that it may be changed to support different OSI Layer 2 technologies without requiring commensurate changes to the IP ROUTING SYTEM [1.14].

The IP ROUTING SYSTEM [1.14] is the control software required to enable the IP ROUTING MODULE [1.2] to operate. This software incorporates the IP protocol stack and is responsible for supporting all IP routing functions for the EDGE SWITCH [1], including QoS arbitration necessary to support sharing transmission capacity between real-time voice/video communications and common data transmission. Certain software or firmware subcomponents of the IP ROUTING SYTEM [1.14] may be responsible for packet labeling (or re-labeling), traffic shaping, flow control, and other QoS arbitration functions related to managing IP packet exchange between the IP ROUTING MODULE [1.2] and the routed terminal interfaces (i.e. COMPUTER DATA INTERFACE [1.4] and VIDEO STREAMING DEVICE INTERFACE [1.5]).

Certain software or firmware subcomponents in of the IP ROUTING SYSTEM [1.14] system may run on the IP ROUTING MODULE [1.2] (i.e. downloaded firmware or programmable logic) while others may run on the CENTRAL PROCESSING UNIT [1.10], communicating with the IP ROUTING MODULE [1.2] in a device control capacity.

The IP ROUTING SYSTEM [1.14] incorporates a software abstraction of the IP ROUTING MODULE [1.2], supporting internal APIs necessary to enable IP communications by the RTP PROTOCOL STACK [1.15], the SIP PROTOCOL STACK [1.16], the HTTP PROTOCOL STACK [1.17], and the SNMP PROTOCOL STACK [1.18]. Routing services such as Network Address Translation and programmable firewall features are also supported through this abstraction.

Protocol Stacks for Network Communications

The RTP PROTOCOL STACK [1.15] runs primarily on the PACKETIZATION COPROCESSOR [1.6] so as to ensure consistently uninterrupted RTP media transmission through the network irrespective of the processing load on the CENTRAL PROCESSING UNIT [1.10]. The RTP PROTOCOL STACK [1.15] is used by the ABSTRACT TELEPHONE CONTROLLER [1.19] to support real-time voice communications by TELEPHONE STATIONS [3] plugged into the TELEPHONE LINE INTERFACE [1.19].

The SIP PROTOCOL STACK [1.16] runs on the CENTRAL PROCESSING UNIT [1.10] and is used by the ABSTRACT CALL MODEL [1.20] to support all SIP network signaling operations. Among other roles, it functions as the default SIP Proxy Server for all voice and video terminals plugged into the EDGE SWITCH [1], acting an intermediary for all SIP network signaling operations between those terminal devices and those in the network with whom they are communicating. FIG. 11 depicts this role of the SIP PROTOCOL STACK [1.16] to the extent that the DES as a system functions as a distributed SIP Proxy Server, using the DNS SERVER [10] as a centralized database to translate E.164 dialing numbers into IP addresses (as required to establish SIP call sessions in the ESN.

The HTTP PROTOCOL STACK [1.17] runs on the CENTRAL PROCESSING UNIT [1.10] and is used to provide secure, session-based access to the XML MGMT INTERFACE [1.21] by remote management applications and network-based applications. In a similar fashion, the SNMP PROTOCOL STACK [1.18] also runs on the CENTRAL PROCESSING UNIT [1.10] and provides a standards-based management interface to various DEVICE MGMT AGENT [1.22] and related data objects (i.e. SNMP Agents and SNMP Management Information Blocks).

Terminal Interfaces

The COMPUTER DATA INTERFACE [1.4] and the VIDEO STREAMING DEVICE INTERFACE [1.5] are physical, routed interfaces to the IP ROUTING MODULE [1.2], thus control logic in the IP ROUTING SYSTEM [1.14] will modulate IP packet flows to/from COMPUTER WORKSTATIONS [5] and SET-TOP BOXES [4] plugged into these interfaces. TELEPHONE STATIONS [3] plugged into the TELEPHONE LINE INTERFACE [1.9] ultimately present themselves to the EDGE SWITCH [1] software architecture through the ABSTRACT TELEPHONE CONTROLLER [1.19], which provides an abstract software control model for the MEDIA STREAM CONTROLLER [1.7] and the TELEPHONE LINE INTERFACE [1.9]. Logical media stream control operations, adjunct digital signal processing functions, and device-level control of TELEPHONE STATIONS [3] are made accessible to other internal EDGE SWITCH [1] software subcomponents through an API presented by the ABSTRACT TELEPHONE CON- TROLLER [1.19]. This API contains functions that enable the detection of device-level telephone signaling events (i.e. on-hook, off-hook, flash, DTMF digits, flash) originating from the TELEPHONE STATIONS [3] plugged into the TELEPHONE LINE INTERFACE [1.9]. These logical operations and functions supported by the API are realized by mapping them to physical operations supported by the MEDIA STREAM CONTROLLER [1.7] and the TELEPHONE LINE INTERFACE [1.9];

SET-TOP BOXES [4] are native SIP network signaling endpoints (i.e. contain a SIP User Agent) and perform SIP network signaling through the SIP PROTOCOL STACK [1.16], employing it as their default SIP Proxy Server. TELEPHONE STATIONS [3] are represented as SIP network signaling endpoints by a SIP User Agent function provided by the ABSTRACT CALL MODEL [1.20]. Thus, both terminal types present themselves as SIP network signaling endpoints registered with the SIP PROTOCOL STACK [1.16] (functioning as a SIP Proxy Server). As a result, SIP network signaling events from either type of terminal can be intercepted and used to trigger CALL PROCESSING APPLICATIONS [1.23.2].

Terminal Control and Call Processing

The ABSRACT CALL MODEL [1.20] provides an abstract endpoint representation for all TELEPHONE STATIONS [3] and SET-TOP BOXES [4] plugged into the EDGE SWITCH [1]. The SIP PROTOCOL STACK [1.16] and the ABSTRACT TELEPHONE CONTROLLER [1.19] present network signaling events and TELEPHONE STATION [3] device-level signaling events, respectively, to the ABSTRACT CALL MODEL [1.20]. Either type of signaling event may trigger execution of CALL PROCESSING APPLICATIONS [1.23.2] stored in the FILE SYSTEM [1.23]. CALL PROCESSING APPLICATIONS [1.23.2] can perform network signaling operations (such as call control) through the SIP PROTOCOL STACK [1.16] or perform media control and device-level TELEPHONE STATION [3] control operations through the ABSTRACT TELEPHONE CONTROLLER [1.19].

FIG. 7 depicts architectural details related to the design and operation of the EDGE SWITCH [1] call model. The DEFINITIONS section entry for the ABTRACT CALL MODEL [1.120] provides an expanded discussion of terminal control and call processing as it relates to the architectural context set forth in FIG. 7.

Management Interfaces

The XML MGMT INTERFACE [1.21] provides a means by which a client application may: (a) remotely access information stored within FILE SYSTEM [1.23] databases; (b) remotely invoke EDGE SWITCH [1] telephone control and call processing features; and/or (c) remotely invoke DEVICE MGMT AGENTS [1.22] resident on the EDGE SWITCH [1]. A remote client will establish an HTTP session through the HTTP PROTOCOL STACK [1.17]. Remote client access for the purpose of data exchange or remote invocation of features is based on using XML-encoding for all information. Data structures and parameter lists passed between the client and the EDGE SWITCH [1] during remote access are all XML-encoded.

The SNMP PROTOCOL STACK [1.18] provides a standards-based device management interface similar to that provided by the combination of the HTTP PROTOCOL STACK [1.17] and the XML MGMT INTERFACE [1.21]. However, the transactions occurring through this interface are initiated by a remote network management station compliant with SNMP. The DEVICE MGMT AGENTS [1.22] in the EDGE SWITCH [1] include specialized "SNMP Agents" that communicate with the network management station using Management Information Blocks (MIBS). Thus, the SNMP PROTOCOL STACK [1.18] implements a more formal presentation of network element management functions to the IP CARRIER NETWORK [6], as would be required for implementation of the ESN by a carrier.

Distributed Edge Switch Carrier Network Reference Architecture

FIG. 8 depicts a DES carrier network reference architecture. It provides a formal presentation of network elements that define the ESN and is used by subsequent discussions within this disclosure to provide an operational context for system management, call signaling, and network service delivery work-flow sequences. All network elements are described in significantly more detail in the DEFINITIONS section.

The ESN recognizes the PSTN as an important "companion network" with which the ESN must fully interoperate. The ESN must support call sessions that have one endpoint in the ESN and another in the PSTN, whether for the purpose of point-to-point communication between TELEPHONE STATIONS [3] or for access to NETWORK-BASED ENHANCED SERVICES [18] deployed in the PSTN.

FIG. 8 depicts important ESN network elements that are considered necessary to support the full breadth of system management, call signaling, and network service delivery capabilities of the DES. Whereas FIG. 8 provides the architectural context for all operations supported by the DES, FIGS. 9, 10 & 11 will selectively expose only those network elements from FIG. 8 that are required to illustrate particular workflow sequences.

Distributed Edge Switch System Management Workflow

FIG. 9 depicts selected elements of the DES carrier network reference architecture for the purpose of illustrating DES system management workflow sequences. FIG. 9 introduces selected carrier operations support system (OSS) elements for the purpose of demonstrating how the DES, from an operational perspective, integrates with existing carrier back-office infrastructure.

The DES system management model does not use IP addresses as a means to identify endusers of network services. It assumes that IP address assignments are dynamic, transient, and easily manipulated by users. Instead, all subscriber transactions that must be accounted for in event histories (i.e. billing records) are tracked on the basis of the unique physical device address of the EDGE SWITCH [1] that generated the event. The physical device address of the EDGE SWITCH [1] is not accessible to the user, cannot be modified, and is passed through the network in encrypted format, thus it cannot be altered, falsified, or otherwise easily misrepresented.

The DES system management workflow sequences below reference the ten programmatic relationships shown in FIG. 9. These workflow sequences do not capture the full extent of DES system management, but instead highlight important examples.

Edge Switch Synchronization with SMP

In the event of EDGE SWITCH [1] replacement, the SYSTEM MANAGEMENT PLATFORM [2] is required to be able to reconstruct the software load and operating configuration (including all subscriber-specific information) used by a particular EDGE SWITCH [1]. Also, any changes made by end user (the subscriber) to Class of Service settings or service delivery preferences must be reflected back into the SYSTEM MANAGEMENT PLATFORM [2] (and vice-versa) through a synchronization process. The synchronization process is initiated automatically through {1} by either the EDGE SWITCH [1] or the SYSTEM MANAGEMENT PLATFORM [2], whenever one or the other detects that it has experienced a change in operating configuration and/or subscriber-specific information that is understood to be maintained by both entities.

Not every data object on the EDGE SWITCH [1] is necessarily maintained on the SYSTEM MANAGEMENT PLATFORM [2]. For example, long after being reported to the SYSTEM MANAGEMENT PLATFORM [2] for service billing purposes, potentially years of call log data could be retained within the EVENT RECORD REPOSITORY [1.23.1], remaining accessible to interactive calling services. In the unexpected event of EDGE SWITCH [1] replacement, this call log information would no longer be accessible to the subscriber (without the carrier extracting it using special diagnostic tools in a service depot). Presumably, they would have saved call log reports by other means if the information was considered important to them.

The EDGE SWITCH [1] synchronization process is presented for a circumstance of replacement—a situation in which the entire contents of the EDGE SWITCH [1] must be updated. However, the synchronization process is optimized to ensure that only new or changed information is synchronized. Thus, synchronization is a general process of information management that will be invoked following many types of operations, such as whenever a subscriber changes their Class of Service settings or personal preferences. The synchronization process may be executed in batch mode, whereby a certain number of changes trigger execution, or perhaps it occurs only at certain times of the day, depending on how critical the information. Truly critical changes in information, such as changes in Class of Service, are originated on the SYSTEM MANAGEMENT PLATFORM [2] first to ensure it is retained in the event of synchronization failure.

Edge Switch Reporting of Billable Events to OSS

In the ESN, the EDGE SWITCH [1] originates billable events and stores them locally until a pre-programmed threshold is met, at which time it reports them to the NETWORK BILLING SYSTEM [17]. When an EDGE SWITCH [1] detects the threshold is met, it initiates a transmission of new billable events to the SYSTEM MANAGEMENT PLATFORM [2] via {1}. The SYSTEM MANAGEMENT PLATFORM [2] confirms receipt of these events.

Each event is bound to a particular network subscriber based upon the physical device address of the EDGE SWITCH [1] that originated it. The SYSTEM MANAGEMENT PLATFORM [2] sorts and reformats the billable events into standard-format billing records prior to transmitting them to the NETWORK BILLING SYSTEM [17] via {10}.

Edge Switch Service Delivery Monitoring by OSS

The SYSTEM MANAGEMENT PLATFORM [2] actively monitors service delivery by the EDGE SWITCHES [1] and reports their status to the NETWORK OPERATIONS CENTER [16]. Each EDGE SWITCH [1] is programmed to report its status to the SYSTEM MANAGEMENT PLATFORM [2] at a specific, pre-determined time interval. When an EDGE SWITCH [1] detects that the time interval has expired, or at any time when it detects an error condition, it initiates a transmission of a status report to the SYSTEM MANAGEMENT PLATFORM [2] via {1}. The SYSTEM MANAGEMENT PLATFORM [2] confirms receipt of this report and the EDGE SWITCH [1] resets its timer. The SYSTEM MANAGEMENT PLATFORM [2] then prioritizes, sorts and reformats these reports into a standard format prior to transmitting them to the NETWORK OPERATIONS CENTER [17] via {9}.

If an EDGE SWITCH [1] report shows an alarm condition, or if the EDGE SWITCH [1] fails to report within a specific time frame, the SYSTEM MANAGEMENT PLATFORM [2] will expedite reporting of this information to the NETWORK OPERATIONS CENTER [16] as an alarm condition that requires expedited remediation.

Edge Switch Troubleshooting by OSS

At any time, the NETWORK OPERATIONS CENTER [16] may query a particular EDGE SWITCH [1] (or defined group of EDGE SWITCHES [1]) to generate an updated status report and/or to initiate one or more internal diagnostic programs (e.g. DEVICE MGMT AGENTS [1.22]) resident on the EDGE SWITCH [1] for the purpose of remote troubleshooting. The NETWORK OPERATIONS CENTER [16] may also retrieve, view, and/or modify a particular EDGE SWITCH [1] base configuration and all subscriber-specific information stored on it.

All of these interactions between the NETWORK OPERATIONS CENTER [16] and one or more EDGE SWITCHES [1] occur through the same general mechanism: the NETWORK OPERATIONS CENTER [16] first defines a select population of subscribers based on appropriate criteria such as: (a) the names or dialing numbers of one or more individual subscribers; (b) the name of a group of subscribers (e.g. an organization such as a business); or (c) a group of subscribers within a geographical region. The definition of a select population occurs though interactions between the NETWORK OPERATIONS CENTER [16] and the SYSTEM MANAGEMENT PLATFORM [2] via {9}. Through a similar mechanism, the NETWORK OPERATIONS CENTER [16] then selects the desired logical troubleshooting operations to be applied to this select population.

The SYSTEM MANAGEMENT PLATFORM [2] translates the select population of subscribers into a population of physical EDGE SWITCHES [1] that are providing network services to those subscribers. It next translates the logical troubleshooting operations to be applied to this select subscriber population into sequences of EDGE SWITCH [1] management operations. These EDGE SWITCH [1] management operations are then executed as interactions between the SYSTEM MANAGEMENT PLATFORM [2] and the EDGE SWITCHES [1] via {1}.

The EDGE SWITCHES [1], for their part, execute the device management operations and transmit reports to the SYSTEM MANAGEMENT PLATFORM [2] via {1}. The SYSTEM MANAGEMENT PLATFORM [2] confirms receipt of these reports, sorts and reformats them into a standard format prior to transmitting them to the NETWORK OPERATIONS CENTER [17] via {9}.

Edge Switch Provisioning and Configuration by OSS

The NETWORK PROVISIONING SYTEM [15] must initiate at least three major operations to prepare the ESN for network service delivery to a select population of one or more subscribers:

(a) Update carrier policies to enable network service delivery to this select population of subscribers;

(b) Configure the network dialing plan to include terminals used by the select population of subscribers.

(c) Configure DES to provide network services to this select population of subscribers in a manner that is consistent with carrier policies.

Carrier policies are updated by existing means via {7}. The logical provisioning operations typically include initially adding the select population of subscribers to the POLICY SERVER [14] and assigning a default Class of Service. In addition, each subscriber is assigned one or more dialing numbers (or other logical endpoint addresses according to naming conventions used to identify subscriber voice and multimedia terminals). In the ESN, the dialing plan for the most part is maintained by the DNS SERVER [10]; thus the NETWORK PROVISIONING SYSTEM [15] must ensure that dialing numbers and/or endpoint addresses assigned to the select subscriber population in the POLICY SERVER [14] are also represented within the carrier's DNS infrastructure. The NETWORK PROVISIONING SYSTEM [15] updates the DNS SERVER [10] via {6}.

The NETWORK PROVISIONING SYSTEM [15] configures the DES to provide network services to a select population of subscribers through its interactions with the SYSTEM MANAGMENT PLATFORM [2] via {8}: the NETWORK PROVISIONING SYSTEM [15] first defines a select population of subscribers based on appropriate criteria such as: (a) the names or dialing numbers of one or more individual subscribers; (b) the name of a group of subscribers (e.g. an organization such as a business); or (c) a group of subscribers within a geographical region. The definition of a select population occurs though interactions between the NETWORK PROVISIONING SYSTEM [15] and the SYSTEM MANAGEMENT PLATFORM [2] via {8}. Through a similar mechanism, the NETWORK PROVISIONING SYSTEM [15] then initiates automatic provisioning for that select population.

The SYSTEM MANAGEMENT PLATFORM [2] initiates automatic provisioning by synchronizing all of its internal administrative information for the select population with the same select population on the POLICY SERVER [10] via {5}. If there are determined to be members of the select population that exist on the POLICY SERVER [10] but that do not exist within the SYSTEM MANAGEMENT PLATFORM'S [2] internal administrative information, then these members are identified as "new subscribers;" new accounts are then created on the SYSTEM MANAGEMENT PLATFORM [2]. The Class of Service capabilities in the POLICY SERVER [10] for all members of the select population are translated into appropriate DES Class of Service representations (to the extent possible) for the corresponding select population on the SYSTEM MANAGEMENT PLATFORM [2]. New subscribers are assigned default Class of Service settings and default service preferences.

Each subscriber account maintained on the SYSTEM MANAGEMENT PLATFORM [2] contains a registry used to associate that subscriber with one or more physical EDGE SWITCHES [1], each identified by a unique physical device address. Each registered EDGE SWITCH [1] has its physical location (street address) listed along with the dialing numbers it serves. Conceptually, each EDGE SWITCH [1] is serving a portion of the overall network dialing plan.

Having synchronized its internal administrative information with the POLICY SERVER [10], the SYSTEM MANAGMENT PLATFORM [2] then translates the select population of subscribers into a population of registered EDGE SWITCHES [1] that are providing network services to those subscribers. It next attempts to communicate with each EDGE SWITCH [1] via {1} to upload the necessary system software and subscriber-specific information necessary to support network service delivery by the EDGE SWITCH [1]. Subscriber-specific information includes a specific set of Class of Service capabilities purchased by the subscriber. Class of Service capabilities are accompanied by default Class of Service settings. Some settings are assigned default network service delivery preferences as appropriate to the particular network service effected.

The EDGE SWITCHES [1], for their part, confirm the success or failure of the provisioning operations, each transmitting a report to the SYSTEM MANAGEMENT PLATFORM [2] via {1}. When the SYSTEM MANAGEMENT PLATFORM [2] has completed provisioning and configuring all EDGE SWITCHES [1] for the select population, it sorts the reports returned by the EDGE SWITCHES [1] and reformats them into a standard format prior to transmitting them to the NETWORK PROVISIONING SYSTEM [15] via {8}. As part of the provisioning process, the EDGE SWITCHES [1] in the select population automatically perform a reset and come online to begin network service delivery; they then begin to transmit periodic status reports as described by the workflow sequence "Edge Switch Service Delivery Monitoring by OSS."

End-user Configuration of Edge Switch

An end-user (i.e. the subscriber) may perform application-mediated configuration operations that enable them to view and modify EDGE SWITCH [1] Class of Service settings and network service delivery preferences using a web browser. An EDGE SWITCH [1] configuration and network services management web application running on a WEB SERVER [11] presents a graphical user interface via {2}, exposing information relevant to that particular subscriber's Class of Service. The web application performs a secure log-in via {3} to the XML MGMT INTERFACE [1.21], within the context of an HTTP session supported through the HTTP PROTOCOL STACK [1.17].

Communications between the web application and the EDGE SWITCH [1] may be encrypted to ensure secure access. End-user modifications to the EDGE SWITCH [1] configuration or subscriber-specific information are reflected back to the SYSTEM MANAGEMENT PLATFORM [2] as soon as it is practical to do so, according to the workflow sequence "Edge Switch Synchronization with SMP."

End-User Interaction with Edge Switch

An end-user (i.e. the subscriber) may perform application-mediated interactions with the EDGE SWITCH [1] as an adjunct to network service delivery. Certain network services (or elements of network services), such as interactive calling services are implemented as web applications running on a WEB SERVER [11]. The web application presents a graphical user interface via {2}, exposing information relevant to that particular network service, such as display of call log data, for example.

The web application performs a secure log-in via {3} to the XML MGMT INTERFACE [1.21], within the context of an HTTP session supported through the HTTP PROTOCOL STACK [1.17]. Communications between the web application and the EDGE SWITCH [1] may be encrypted to ensure secure access. Through the XML MGMT INTERFACE [1.21], the web application may (a) access information stored in various EDGE SWITCH [1] databases, and/or (b) access features and functions supported by the EDGE SWITCH [1], such as call control operations.

Distributed Edge Switch Call Signaling Workflow

FIG. 10 depicts selected elements of the DES carrier network reference architecture for the purpose of illustrating DES network call signaling workflow sequences. SIP network signaling paths and database queries are shown as they relate to various call set-up examples. RTP bearer paths are not shown and should be assumed from a logical perspective to occur point-to-point between SIP network signaling endpoints participating in a SIP call session.

Role of Distributed Edge Switch as a Distributed SIP Proxy Server

FIG. 11 is a companion to FIG. 10, providing details as to how the DES functions as a distributed SIP Proxy Server. In the DES, each EDGE SWITCH [1] embeds its own SIP Proxy Server within the SIP PROTOCOL STACK [1.16]. This SIP Proxy Server replaces most of the SIP Proxy Server functionality that is in the NGN provided by a centralized, network-based SIP Proxy Server, such as the SIP PROXY SERVER [12] depicted in FIG. 8 for the Distributed Edge Switch Carrier Reference Network Architecture. The SIP Proxy Server within the SIP PROTOCOL STACK [1.16] has access to subscriber policy information (e.g. subscriber Class of Service and preferences) stored internally within the EDGE SWITCH [1]; thus in most cases it does not need to defer to a network-based SIP PROXY SERVER [12] to make policy-related decisions on its behalf. In addition, the The SIP Proxy Server within the SIP PROTOCOL STACK [1.16] may access the DNS SERVER [10] through the BROADBAND ACCESS NETWORK [6.1] in order to translate dialing numbers to IP addresses. Summarily, the centralized SIP PROXY SERVER [12] is for the most part not used by the DES (or in any ESN) to support SIP call sessions between EDGE SWITCHES [1].

It is likely the case that a carrier will not allow unrestricted SIP connectivity within the IP CARRIER NETWORK [6]. To control access to carrier-owned SIP network signaling endpoints (e.g. EDGE SWITCHES [1], PSTN GATEWAYS [8], SIP APPLICATION SERVERS [13]), certain SIP call sessions may be encrypted or contain specialized parameters. To this end, the SIP PROTOCOL STACK [1.16] provides a "protocol grooming" function to, if necessary, re-write, encode, and/or decode SIP messages for the purpose of ensuring secure, syntactically correct SIP network signaling within the IP CARRIER NETWORK [6].

Internally within the EDGE SWITCH [1], TELEPHONE STATIONS [3] plugged into it are represented as SIP User Agent instances by the ABSTRACT CALL MODEL'S [1.20] Telephone Gateway function. These SIP User Agents are created to operate on behalf of TELEPHONE STATIONS [3] that are by themselves incapable of performing SIP network signaling operations. These SIP User Agents must utilize the SIP PROTOCOL STACK [1.16] as their default SIP Proxy Server in order to participate in SIP network signaling operations that involve carrier-owned SIP network signaling endpoints. SET-TOP BOXES [4] are native SIP network signaling endpoints, and when plugged into the EDGE SWITCH [1], they too must specify the SIP PROTOCOL STACK [1.16] as their default SIP Proxy Server in order to participate in SIP network signaling operations that involve carrier-owned SIP network signaling endpoints.

Because each EDGE SWITCH [1] contains its own SIP Proxy Server, the network's capacity to provide secure SIP Proxy services scales with the network itself. Each EDGE SWITCH [1] contains the computing resources necessary to provide SIP proxy services to all terminals plugged into it. The DEFINITIONS section of this disclosure contains a full discussion of the EDGE SWITCH [1] call model, and here it is explained how the SIP Proxy Server capability of the SIP PROTOCOL STACK [1.16] makes possible the implementation of the ABSTRACT CALL MODEL'S [1.20] Calling Service Delivery Function and Admission Control Function. Both of these functions operate in the network signaling plane and are made possible as a result of the fact that the SIP PROTOCOL STACK [1.16] is playing the role of intermediary in all calls originated from and answered by the EDGE SWITCH [1].

Unique to the DES is its peer-to-peer call routing and "multi-tiered" configurable call set-up model that together: (a) enable the largest number of simultaneous calls to occur with the lowest possible utilization of network resources, and (b) guarantee virtually instantaneous call set-up times for on-network calls. These design elements benefit the carrier implementing the DES because it enables them to deliver an end-user experience that significantly improves upon what is possible through the legacy PSTN or the proposed NGN:

DES on-network call set-up times are virtually instantaneous, generating ring signaling and two-way voice communications without any perceivable delay.

For all practical intents and purposes, DES on-network call set-up will virtually never block due to trunk congestion (i.e. will not return "network busy");

DES feature delivery (e.g. office telephone features, access to network-based applications) to the end-user through voice and multimedia terminals is virtually instantaneous.

The multi-phase call set-up model supported by the EDGE SWITCH [1] may be configured to optimally support call routing requirements unique to a specific carrier's implementation of the ESN. The service logic needed to supervise the EDGE SWITCH [1] call set-up procedure is implemented in a CALL PROCESSING APPLICATION [1.23.2]. In the case of call origination by the EDGE SWITCH [1], a CALL PROCESSING APPLICATION [1.23.2], for example, would be triggered to execute when an off-hook event was detected for a TELEPHONE STATION [3] plugged into it.

Since all network service delivery and call processing logic is managed internally by the EDGE SWITCH [1] and since billing events (i.e. call accounting records) are stored internally by the EDGE SWITCH [1], the greater or lesser involvement of centralized network resources has no impact on the ability of the EDGE SWITCH [1] to (a) deliver basic calling services according to the subscriber's Class or Service, and/or (b) to account for their use through the EDGE SWITCH'S [1] internal origination, storage, and forwarding of billable event records to the SYSTEM MANAGEMENT PLATFORM [2]. Consequently, call routing algorithms are not required to route calls through centralized SIP PROXY SERVERS [12] that are responsible for originating billable events and thus can be optimized with greater flexibility. FIG. 10 depicts the ESN architectural context necessary to describe selected call signaling workflow examples that illustrate this flexibility:

On-switch Call

An on-switch call occurs when a TELEPHONE STATION [3] or SET-TOP BOX [4] plugged into the EDGE SWITCH [1] attempts to call another TELEPHONE STATION [3] or SET-TOP BOX [4] plugged into the same EDGE SWITCH [1]. As depicted in FIG. 10 for the EDGE SWITCH [1] labeled B, SIP call signaling occurs internally through the SIP PROTOCOL STACK [1.71], essentially point-to-point between internal SIP User Agents as indicated by {1}. RTP bearer transmission occurs point-to-point through the IP ROUTING MODULE [1.2] in much the same way. As an alternative to RTP transmission, an on-switch call may simply interconnect media streams associated with the participating TELEPHONE STATIONS [3] directly through the MEDIA STREAM CONTROLLER [1.7].

If the dialing number for the far-end cannot be identified as a TELEPHONE STATION [3] or SET-TOP BOX [4] plugged into the same EDGE SWITCH [1], call set-up service logic may choose to initiate a direct call or and indirect call, depending the circumstance. Most calls in the DES are initiated as direct calls.

Direct Call

A direct call occurs when a TELEPHONE STATION [3] or SET-TOP BOX [4] calls another TELEPHONE STATION [3] or SET-TOP BOX [4] that is not plugged into the same EDGE SWITCH [1] and without using an intermediate, centrally-located SIP PROXY SERVER [10] in the IP CARRIER NETWORK [6]. As depicted in FIG. 10 for the EDGE SWITCH [1] labeled A (originating the call in this case), SIP call signaling occurs directly to the EDGE SWITCH [1] labeled B (as indicated by {3}). In this case, the SIP Proxy Server capability of the SIP PROTOCOL STACK [1.16], as depicted in FIG. 11, is able to perform a DNS SERVER [2] look-up to convert the far-end dialing number to an IP endpoint address as indicated by {2}. Thus, the SIP PROTOCOL STACK [1.16] within the EDGE SWITCH [1] is fully capable of performing all operations necessary to establish a SIP call session based on E.164 dialing number addressing without assistance from a centrally-located SIP PROXY SERVER [10]. Class of Service information that would determine whether or not a subscriber should be allowed to place the call in the first place is all stored internally by the EDGE SWITCH [1] and updated as required by the SYSTEM MANGEMENT PLATFORM [2]. As a result, there is no need for the SIP PROTOCOL STACK [1] to query the POLICY SERVER [10] for additional information necessary to set-up the call. RTP bearer transmission occurs point-to-point through the IP CARRIER NETWORK [6] in the usual way for SIP call sessions.

Indirect Call

An indirect call occurs when a TELEPHONE STATION [3] or SET-TOP BOX [4] uses an intermediate SIP PROXY SERVER [10] to call another TELEPHONE STATION [3] or SET-TOP BOX [4]. This type of call occurs when the service logic used to set-up the call explicitly uses the IP address (or name) of the network-based SIP PROXY SERVER [10] as the SIP Proxy Server that should set-up the call.

As depicted in FIG. 10 for the EDGE SWITCH [1] labeled A (originating the call in this case), SIP call signaling occurs through the SIP PROXY SERVER [12], as indicated by {4}. The SIP PROXY SERVER 12 will access the POLICY SERVER 14 for network call routing information, as indicated by {5}, and a DNS SERVER [10] to convert the far-end dialing number to an IP endpoint address, as indicated by {6}. The SIP PROXY SERVER [12] then functions as a SIP message router to shuttle SIP network signaling to and from the far-end EDGE SWITCH [1] labeled B, as indicated by {7}. RTP bearer transmission occurs point-to-point through the IP CARRIER NETWORK [6].

In the DES, this type of indirect call usually occurs when the dialed number is an endpoint that can only be reached through a PSTN GATEWAY [8], or when the dialed number is a SIP APPLICATION SERVER [13], as indicated by {8}and {9}. In these cases, the carrier will often deploy a SIP PROXY SERVER [12] as a means to implement a load-balancing function; that is, the carrier will configure the SIP PROXY SERVER [12] to route large numbers of incoming calls to an available PSTN GATEWAY [8] or SIP APPLICATION SERVER [13]. In the reverse direction, incoming calls from the PSTN GATEWAY [8] to EDGE SWITCHES [1], for example, must be routed through the SIP PROXY SERVER [12] so that it can be directed to the correct EDGE SWITCH [1] in the IP CARRIER NETWORK [6].

On-network and Off-network Calls

All direct or indirect SIP call sessions that occur between endpoints that lie within the ESN (i.e. entirely within the IP CARRIER NETWORK [6]), end-to-end, are termed "on-network" calls. An "off-network" call occurs whenever one end of a call session is an endpoint that lies outside of the IP CARRIER NETWORK [6] (such as the PSTN [7]), regardless of which endpoint originated the call.

Off-network calls to the PSTN [7] utilize a PTSN GATEWAY [8] to complete the call path for both signaling and bearer connections. Because the PSTN GATEWAY [8] is a shared resource, potentially located only in selected network segments and accessed by many network users at the same time, it requires some degree of expanded access control. The carrier may wish to partition the IP CARRIER NETWORK [6] with respect to PSTN GATEWAY [8] access, perhaps for the purposes of load balancing and ensuring redundancy. The PSTN GATEWAY [8] will require assistance in routing calls inbound from the PSTN [7] to specific IP CARRIER NETWORK [6] endpoints. For all these purposes, a SIP PROXY SERVER [12] is most often used as an intermediary; thus as a practical matter, an off-network call is virtually always an indirect call. An example of an off-network call is depicted in FIG. 10 where the EDGE SWITCH [1] labeled A connects to a PSTN [7] endpoint through the PSTN GATEWAY [8], as indicated by {10} and {11}.

Distributed Edge Switch Network Service Delivery Workflow

FIG. 12 depicts selected elements of the DES carrier network reference architecture for the purpose of illustrating DES network service delivery workflow sequences. According to the DES network service delivery model, services internal to the EDGE SWITCH [1] and those residing in the network are combined into more comprehensive network services based on the subscriber's Class of Service. Almost every network service provided by the EDGE SWITCH [1] is derived from, initiated by, or built on top of EDGE SWITCH BASIC FEATURES [1.24]. EDGE SWITCH BASIC FEATURES [1.24] render TELEPHONE STATION FEATURES and SET-TOP BOX FEATURES to subscribers through TELEPHONE STATIONS [3] and SET-TOP BOXES [4] respectively, as indicated by {1}.

Any call originated or received by a terminal plugged into the EDGE SWITCH [1] will the trigger the execution of particular service logic (i.e. CALL PROCESSING APPLICATIONS [1.23.2]). The execution of which particular service logic depends upon the subscriber's Class of Service capabilities, settings, and preferences; some settings will change the logic to a completely different type of service logic altogether whereas other settings may simply alter some aspect of the service logic. In some cases, the service logic of EDGE SWITCH BASIC FEATURES [1.24], such as "call-forwarding" for example, may as a matter of course redirect calls to NETWORK-BASED ENHANCED SERVICES [18]. NETWORK-BASED ENHANCED SERVICES [18] may be accessible to the EDGE SWITCH [1] as network signaling endpoints residing in either the PSTN [7], as indicated by {4}, or the IP CARRIER NETWORK [6], as indicated by {5}.

An ready example of {5} exists in a popular network service called "voice call-answering." To implement voice call-answering, A conditional call-forwarding feature (EDGE SWITCH BASIC FEATURE [1.24]) is programmed to forward a call to a voice call-answering application (NETWORK-BASED ENHANCED SERVICE [18]) if the TELEPHONE STATION [3] rings three times without being answered or is busy.

An EDGE SWITCH BASIC FEATURE [1.24] may be substituted with EDGE SWITCH OVERRIDE FEATURE [1.25] that either (a) adds functionality to on top of it, as indicated by {3} or (b) provides an alternative implementation of it, as indicted by {2}.

To provide an example of {3} (i.e. adds functionality to EDGE SWITCH BASIC FEATURE [1.24]) the previous example of voice call-answering can be expanded to offer a Class of Service setting that would send an instant message to inform the subscriber that they were receiving a voice message. In this case, a simple instant messaging client in the EDGE SWITCH [1] would perform the messaging operation after the caller was forwarded to the voice call-answering application. The original functionality of basic call-answering remains unchanged.

To provide an example of {2} (i.e. provides an alternative implementation of an EDGE SWITCH BASIC FEATURE [1.24]) the basic call-forwarding function could be replaced completely with a more advanced version that maintained a "do-not-disturb" function based on time of day. At certain times of the day (as programmed by the subscriber) all callers would be automatically transferred to the voice call-answering application and the telephone would not ring. The original functionality of basic call-answering is changed to alter its behavior based on the time of day.

In some cases, the desired EDGE SWITCH OVERRIDE FEATURE [1.25] is too complex for the EDGE SWITCH [1] to implement internally. As indicated by {6}, the EDGE SWITCH BASIC FEATURE [1.24] is replaced with a NETWORK-BASED OVERRIDE FEATURE [19]. An example of {6} would be a "contact dialing" feature in which the standard dial-tone provided as an EDGE SWITCH BASIC FEATURES [1.24] is completely replaced with replaced with a NETWORK-BASED OVERRIDE FEATURE [19] that supports multiple dialing modalities depending on subscriber whim. The new dial-tone feature would interoperate with the subscribers contact list, enabling them to "click to dial" from the COMPUTER WORKSTATION [5] desktop, or simply speak the name of the contact they wish to dial, or allow them to dial the telephone in the usual manner.

Preferred Embodiment of Edge Switch

FIG. 13 depicts a preferred embodiment for the DES. A version of the EDGE SWITCH [1] has been constructed for residential subscriber deployment using a Very-high-data-rate Digital Subscriber Line (VDSL) interface to the BROADBAND ACCESS NETWORK [6.1]. VDSL bit transfer rates vary according to cable length and by manufacturer. VDSL chip-sets currently available support downstream bit transfer rates over 25 megabits/second for cable lengths in excess of 3,500 feet. Upstream bit transfer rates are typically lower than downstream rates.

Edge Switch Physical Form Factor

The EDGE SWITCH [1] supports four individual POTS lines and four SET-TOP BOXES [4] using an ETHERNET SWITCH [20] plugged into the VIDEO STREAMING DEVICE INTERFACE [1.5]. 10Base-T ethernet technology is used for the cable connections. An ETHERNET HUB [9] plugged into the COMPUTER DATA INTERFACE [1.4] also uses 10Base-T ethernet technology. The ETHERNET HUB [9] enables four COMPUTER WORKSTATIONS [5] to share a single data service.

The EDGE SWITCH [1] is deployed on the network-side of the SUBSCRIBER NETWORK INTERFACE [21] at the Telco Entrance Facility where the inside wiring is accessible through a POTS channel bank mounted on the outside of the subscriber premise. It is powered by current from the copper wire plant supporting the VDSL broadband network service.

EDGE SWITCH [1] electronics and connectors are contained within an environmentally protected plastic housing that incorporates a hinged cover panel used to provide service access. The physical dimensions of the plastic housing mirror the form factor of the Telco Entrance Facility (10" height×9" width×3" depth). Using the existing Telco Entrance Facility (originally used for POTS service), the EDGE SWITCH [1] gains the electrical and environment protection provided for the existing entrance device; additional protection capabilities within the housing are incorporated in the design to further protect the electronic components.

Bandwidth Utilization

Each of the four POTS interfaces support three-way calling features accessible to the TELEPHONE STATIONS [3]. Internally, they support four-way calling so as to enable an additional call leg in a three-way call as would occur if the call was to be intercepted for law enforcement assistance. Voice communications nominally utilize the G.729a codec (vocoder type), which consumes 8 kilobytes/second per voice bearer channel (media stream) connection. With four simultaneous POTS sessions, each involved in three-way intercepted call, the total bandwidth consumed for voice transmission is approximately 100 kilobits/second (not including signaling and packetization overhead). In the event that the EDGE SWITCH [1] detects modem tones on a line, such as from a fax machine, it will automatically change the codec from G.729 a to G.711 so as to enable modem-based data communications over the voice bearer channel.

A high-quality video stream consumes approximately 3.5 megabits/second; thus total bandwidth for four simultaneous video (multimedia) is approximately 14 megabits/second. Taking these estimates into consideration, the maximum bandwidth that could be consumed by EDGE SWITCH [1] voice and multimedia sessions is approximately 15 megabits/second. Assuming a VDSL broadband capable of supporting 20 megabits/second, at least 5 megabits/second would be available for data communications by the COMPUTER WORKSTATIONS [5].

Operational Capacity

The EDGE SWITCH [1] supports EDGE SWITCH BASIC FEATURES [1.24] for TELEPHONE STATIONS [1], SET-TOP BOXES [4] and COMPUTER WORKSTATIONS [5]. Two default CONFIGURATION PROFILES [5] are pre-programmed into the EDGE SWITCH [1] so as to enable TELEPHONE STATION FEATURES and SET-TOP BOX FEATURES to operate as follows:

A default terminal function key profile is configured so as to enable subscribers to access TELEPHONE STATION FEATURES by entering DTMF digit sequences through the TELEPHONE STATIONS [3]. TELEPHONE STATION [3] speed-dial keys may be programmed to support these DTMF digit sequences so that they can be used as dedicated feature keys.

A default SET-TOP BOX [4] interface profile is programmed into the EDGE SWITCH for the particular type of SET-TOP BOX [4] at the subscriber premise. This interface profile is used internally by the EDGE SWITCH [1] to convert the vendor-specific command sequences supported by the SET-TOP BOX [4] to be compatible with the channel selection protocol supported by the NETWORK-BASED ENHANCED SERVICES [18] providing selectable video content;

DEFINITIONS

This section contains definitions for major system elements, terms, and protocols referenced in this disclosure. The telecommunications industry contains a variety of views regarding exactly what comprises these elements; thus the definitions should not in all cases be considered absolute. Definitions annotated with numerical identifiers in brackets refer to system elements that are explicitly shown in figures.

IETF

Internet Engineering Task Force (IETF). The IETF is a standards body whose conventions mandate that a body of work is presented initially as an "Internet Draft" which either expires or is formally promulgated to a "Request for Comment" (RFC). Both the Internet Draft and RFC documents must comply with a content format convention.

ITU-T

International Telecommunications Union—Telephony (ITU-T).

POTS

Plain Old Telephone Service. Standard analog telephone service provided by the PSTN. POTS relies upon a CENTRAL OFFICE SWITCH line card containing a Subscriber Line Interface Circuit (SLIC). For more information, see the definition for the TELEPHONE LINE INTERFACE [1.9] below.

EDGE SWITCH [1]

DES system element that is a hardware device used to terminate IP-based voice, video, and data broadband network service at the network subscriber (customer) premise. It is deployed as a premise-based network element at the carrier point of demarcation where outside wiring connects to inside wiring, and functions as an integral service delivery component of the IP CARRIER NETWORK [6]. EDGE SWITCHES are constructed according to a variety of form-factors as required to accommodate voice, video, and data termination requirements at the subscriber premise.

Regardless of form-factor, all EDGE SWITCHES are centrally managed by a SYSTEM MANAGEMENT PLATFORM [2], which is installed in the central office or central office equivalent. When the EDGE SWITCH is connected to the BROADBAND ACCESS NETWORK [6.1], it registers with a default SYSTEM MANAGEMENT PLATFORM [2]. At that time, the SYSTEM MANAGEMENT PLATFORM [2] remotely loads the EDGE SWITCH with all the software necessary for it to deliver the network services (service capabilities) purchased by the subscriber at whose premise the EDGE SWITCH has been installed. Once the EDGE SWITCH completes its system startup procedure with the new software load, the subscriber may then configure the EDGE SWITCH according to their personal preferences through a web user interface. A web application running on a WEB SERVER [11] initiates an authenticated (secure) login to the EDGE SWITCH and thereby mediates subscriber access to its features.

Architecturally, the EDGE SWITCH has two distinct "sides:" the network side and the subscriber side. The network side of the EDGE SWITCH incorporates a BROADBAND NETWORK INTERFACE [1.1] that physically connects it to the BROADBAND ACCESS NETWORK [6.1]; it provides all necessary electrical (and potentially optical) signal modulation and network adaptation necessary to terminate broadband network access. The network side ultimately presents the IP ROUTING MODULE [1.2] in the EDGE SWITCH with an IP access path through the BROADBAND ACCESS NETWORK [6.1], dynamically aggregating voice-over-IP, video-over-IP, and common data-over-IP packet flows into a composite IP packet flow. The total bitrate transmission requirements for this composite IP packet flow must be less than or equal to the total available through the BROADBAND NETWORK INTERFACE [1.1]. Central to its ability to support multi-service delivery through the BROADBAND NETWORK INTERFACE [1.1], the EDGE SWITCH supports internal service logic that determines if the projected composite IP packet flow that would be required to support the delivery of all requested voice, video, and data services would exceed the total bitrate transmission available from the network side.

The subscriber side of the EDGE SWITCH connects to TELEPHONE STATIONS [3], SET-TOP BOXES [4], and COMPUTER WORKSTATIONS [5] installed at the subscriber premise. It provides telephone services to the TELEPHONE STATIONS [3], video (multimedia) services to the SET-TOP BOXES [4], and data communication services to the COMPUTER WORKSTATIONS [5]. In the case of TELEPHONE STATIONS [3], the EDGE SWITCH converts analog electrical (and potentially digital) telephone device-level signaling and voice transmission conventions to and from IP packets containing SIP network signaling information and digitally-encoded voice. In the case of SET-TOP BOXES [4], it is assumed that device signaling information and media content are already digitally-encoded in IP packets and that SET-TOP BOXES [4] natively support SIP network signaling. The subscriber side supports admission control features that enable it to deny voice and/or video calling service delivery to TELEPHONE STATIONS [3] or SET-TOP BOXES, or attenuate data service delivery to COMPUTER WORKSTATIONS [5].

Support for voice-over-IP or video-over-IP call sessions on the subscriber side requires that the EDGE SWITCH perform a prioritized IP routing function to ensure the timely transport of IP packet flows bi-directionally between the TELEPHONE STATIONS [3] (and SET-TOP BOXES [4]) and the IP CARRIER NETWORK [6]. As TELEPHONE STATIONS [3] (and SET-TOP BOXES [4]) answer incoming SIP call sessions or originate outgoing SIP call sessions, the EDGE SWITCH dynamically reserves the requisite network side bandwidth on demand—effectively removing it from the pool of bandwidth available to COMPUTER WORKSTATIONS [5]—and discreetly reassigns it to media transmission. IP packets needed for real-time voice and streaming video transmission are isolated into labeled IP packet flows. The labeled voice and video packet flows are then routed by the IP ROUTING MODULE [1.2] through the BROADBAND ACCESS NETWORK [6.1] at a higher priority than common data packets, thus enabling them to be routed preferentially through other elements of the IP CARRIER NETWORK [6], according to a higher quality of service then necessary to support common data transmission.

TELEPHONE STATIONS [3] and SET-TOP BOXES [4] plugged into the subscriber side of the EDGE SWITCH may to a certain extent be vendor-specific in the way they communicate with it. For the purpose of normalizing the way that end-users may access network services using different brands of TELEPHONE STATIONS [3] and SET-TOP BOXES [4], the EDGE SWITCH supports terminal adaptation features, performing device signaling and media format conversion bi-directionally in real-time as required to interoperate with SIP endpoints residing within the IP CARRIER NETWORK [6].

TELEPHONE STATIONS [3] also tend to differ from vendor to vendor in their function key layouts. For example, a telephone key dedicated to deleting a voice message will generate a tone sequence or key code that may not match the tone sequence or key code utilized by a particular vendor's voice messaging system for the same function. Telephone function key layout profiles can be programmed into the EDGE SWITCH by the subscriber (mediated through a network-based web server) so that the EDGE SWITCH can convert a vendor-specific tone sequence or key code used by a particular TELEPHONE STATION [3] to a user interface convention that can be understood by NETWORK-BASED ENHANCED SERVICES [18].

Although the SET-TOP BOXES [4] natively support SIP network signaling and communicate through an IP connection, the EDGE SWITCH may still be required to convert vendor-specific device signaling information (e.g. protocols for channel selection) to be compatible with conventions used by NETWORK-BASED ENHANCED SERVICES [18] providing video streaming content.

The EDGE SWITCH has sufficient storage and processing capabilities to implement an optimized subset of subscriber telephone features and services that are today provided by the CENTRAL OFFICE SWITCH [7.1], including certain Customer Local Access Signaling Services (CLASS) and selected PBX/Centrex features usually provided to businesses. Telephone services and features are provided by each EDGE SWITCH to the TELEPHONE STATIONS [3] plugged into it without any requirement to interface a CENTRAL OFFICE SWITCH [7.1], and without any requirement to interface network elements such as "IP Centrex" feature servers. Inasmuch as telephone features are implemented internally by the EDGE SWITCH, so too is the ability to generate and internally store event histories for subscriber access to these services. The internally stored event histories are sorted by the EDGE SWITCH such that billable events may be periodically transmitted to a SYSTEM MANAGEMEMENT PLATFORM [2] for further processing. The SYSTEM MANAGEMEMENT PLATFORM [2] positively identifies the end user that generated the billable events by matching the physical device address of the EDGE SWITCH that generated the billable events with the physical device address of an EDGE SWITCH registered to an end user.

Private dialing plans may be cached in the EDGE SWITCH, as are subscriber preferences and related configuration data necessary to support telephone feature delivery. A single EDGE SWITCH can internally store over a year of call log data, and make that information available to a third-party application; thus the EDGE SWITCHES deployed in the network collectively function as a distributed subscriber call log data base that scales with the network and is capable of real-time access by network applications. An EDGE SWITCH can make its feature delivery and call control capabilities available to a third-party application; thus the EDGE SWITCHES deployed in the network collectively function as a distributed call control and feature delivery resource that scales with the network and is capable of (near) real-time access by network applications. The capability of EDGE SWITCHES to make subscriber-specific information (call log and Class of Service data) and calling feature delivery remotely accessible to third-party applications enables new types of interactive calling services in which subscribers may actively participate in network service delivery by the EDGE SWITCHES.

Making the most intelligent use of policy data and subscriber preferences cached within it, the EDGE SWITCH [1] attempts to connect telephone calls and deliver telephone features in the most localized manner possible with minimal assistance from carrier network elements. The EDGE SWITCH [1] supports SIP network signaling natively and incorporates its own internal call routing functionality, making it possible for telephone calls between TELEPHONE STATIONS [3] plugged into the same EDGE SWITCH to be routed internally through its IP ROUTING MODULE [1.2] or potentially through its MEDIA STREAM CONTROLLER [1.7]. As a result, these "on-switch" call sessions do not require network resources to support end-to-end signaling, media transmission, or telephone device control, and thus are not significant consumers of network transmission resources.

For telephone calls between TELEPHONE STATIONS [3] that are not plugged into the same EDGE SWITCH, the call paths are established as SIP call sessions through the IP CARRIER NETWORK [6], between EDGE SWITCHES [1]. This mode of communication is possible because each EDGE SWITCH [1] presents the TELEPHONE STATIONS [3] (and SET-TOP BOXES [4]) to the IP CARRIER NETWORK [6] as an array of intelligent SIP endpoints.

BROADBAND NETWORK INTERFACE [1.1]

Hardware subcomponent of the EDGE SWITCH [1] that physically connects it to the BROADBAND ACCESS NETWORK [6.1] using any one of number of OSI Layer 1 broadband technologies (e.g. coaxial cable, Ethernet cable, optical coupling, or copper wire) as required by the host carrier. This subcomponent provides IP connectivity from OSI Layer 3 (network layer) down, which includes OSI Layer 2 (data link layer) and OSI Layer 1 (physical layer). While the BROADBAND NETWORK INTERFACE may be implemented using any type of OSI Layer 2 and OSI Layer 1 technology, it is required to aggregate all available broadband network transmission capacity into to single IP data service in OSI Layer 3, and then to present an interface to that data service to the IP ROUTING MODULE [1.2]. It is anticipated that in some implementations, the BROADBAND NETWORK INTERFACE may be support programmable logic that would enable it to be customized or upgraded, potentially remotely by the SYSTEM MANAGEMENT PLATFORM [2].

IP ROUTING MODULE [1.2]

Hardware subcomponent of the EDGE SWITCH [1] that performs all IP (OSI Layer 3) packet routing functions. It communicates with the BROADBAND ACCESS NETWORK [6.1] through the BROADBAND NETWORK INTERFACE [1.1]. It provides IP-based video stream connectivity for SET-TOP BOXES 4 through the VIDEO STREAMING DEVICE INTERFACE [1.5] and provides IP data connectivity to COMPUTER WORKSTATIONS [5] through the COMPUTER DATA INTERFACE [1.4]. It provides voice stream connectivity for TELEPHONE STATIONS [3] through its integration with the MEDIA STREAM CONTROLLER [1.7] and PACKETIZATION COPROCESSOR [1.6].

This subcomponent enforces preferential routing policies to ensure higher priority voice and video packets are routed in a timely fashion. The IP ROUTING MODULE prioritizes packets for routing based upon a labeling mechanism that assigns them to predefined QoS standards. Higher priority packets are classified and scheduled for processing ahead of lower priority packets. The IP ROUTING MODULE supports transmission pathways in which both connection endpoints correspond to voice or video terminals plugged into the same EDGE SWITCH [1], and supports a programmatic interface such that it may be directly controlled by software in the IP ROUTING SYSTEM [1.4].

POWER SUPPLY [1.3]

Hardware subcomponent of the EDGE SWITCH [1] that conditions power from a DC POWER SOURCE [6.2] prior to making it available to the electronic components of the EDGE SWITCH [1]. This subcomponent provides for surge protection and may be implemented with battery functionality so that it is able to continue powering the EDGE SWITCH [1] for a period of time after the DC POWER SOURCE [6.2] has failed. The POWER SUPPLY [1.3] may be implemented with a switch that enables it to be switched between line power (from the BROADBAND ACCESS NETWORK [6.1] physical connection) or from a premise-based power source.

COMPUTER DATA INTERFACE [1.4]

Hardware subcomponent of the EDGE SWITCH [1] integrated with external cabling interface used to plug in one or more COMPUTER WORKSTATIONS [5] to the EDGE SWITCH [1]. The COMPUTER DATA INTERFACE supports bidirectional IP data paths used for common data transport between the IP ROUTING MODULE [1.2] and the COMPUTER WORKSTATIONS [5]. If more than one COMPUTER WORKSTATION [5] is used, an ETHERNET HUB [9] or ETHERNET SWITCH [20] may be used for the purpose of distributing data streams to more than one COMPUTER WORKSTATION [5] at the same time.

VIDEO STREAMING DEVICE INTERFACE [1.5]

Hardware subcomponent of the EDGE SWITCH [1] integrated with external cabling interface that is used to connect SIP video streaming devices such as SET-TOP BOXES [4]. SIP media streaming devices natively support SIP network signaling. The VIDEO STREAMING DEVICE INTERFACE supports bidirectional IP data paths used for SIP network signaling and real-time media streaming between the IP ROUTING MODULE [1.2] and one or more SET-TOP BOXES [4]. If more than one SET-TOP BOX [4] is plugged into the EDGE SWITCH [1], an ETHERNET SWITCH [20] should be used so as to ensure sufficient bandwidth necessary to maintain network quality of service for all video call sessions.

PACKETIZATION COPROCESSOR [1.6]

Hardware subcomponent of the EDGE SWITCH [1] that is used by the MEDIA STREAM CONTROLLER [1.7] to assist in real-time processing of voice media and voice-related IP data packets transmitted through the IP ROUTING MODULE [1.2]. Most packet processing carried out by the PACKETIZATION COPROCESSOR [1.6] is in support of IETF RFC 1889 on *RTP: A Transport Protocol for Real-Time Applications*, and IEFT RFC 2833 on *RTP Payload for DTMF Digits, Telephony Tones and Telephony Signals*. The PACKETIZATION COPROCESSOR may also be used for packet labeling to mark voice-related IP data packets originating at the TELEPHONE LINE INTERFACE [1.9] with the appropriate quality of service marker prior to their introduction to the IP ROUTING MODULE [1.2]. While some implementations may choose to implement voice encoding and decoding algorithms on the DIGITAL SIGNAL PROCESSOR [1.8], it is also possible that the PACKETIZATION COPROCESSOR [1.6] could be used for this purpose.

MEDIA STREAM CONTROLLER [1.7]

Hardware subcomponent of the EDGE SWITCH [1] used to interconnect, mix, and process full and half-duplex media streams. For a media stream to be interconnected, mixed, or processed by the MEDIA STREAM CONTROLLER, at least one of its endpoints must terminate on it, whereas the other endpoint of that media stream may terminate either on the TELEPHONE LINE INTERFACE [1.9] or within the IP CARRIER NETWORK [6] (transmitted through the BROADBAND NETWORK INTERFACE [1.1]).

The MEDIA STREAM CONTROLLER can be used to interconnect two media streams to create a full or half-duplex media session. It can interconnect three or more media streams to create a fully meshed conference. The MEDIA STREAM CONTROLLER enables multi-party conference calls of this type through the use of conferencing resources. All media streams that are interconnected through a conferencing resource will receive the media contents of all other media streams connected to that conferencing resource. Media transmission to or from any media stream endpoint can be enabled or disabled, and signal processing algorithms may be applied to any stream.

The MEDIA STREAM CONTROLLER physically interfaces the IP ROUTING MODULE [1.2] on the network side of the EDGE SWITCH [1] and the TELEPHONE LINE INTERFACE [1.9] on the subscriber side. In order to more efficiently transmit voice in real-time through the BROADBAND ACCESS NETWORK [6.1] (according to IETF RTP protocol standards), the MEDIA STREAM CONTROLLER [1.7] uses the PACKETIZATION COPROCESSOR [1.6] as a dedicated peripheral computing resource for packet processing. In like fashion, the MEDIA STREAM CONTROLLER [1.7] uses the DIGITAL SIGNAL PROCESSOR [1.8] as a dedicated peripheral computing resource to run digital signal processing algorithms that may be applied dynamically to media streams as needed.

DIGITAL SIGNAL PROCESSOR [1.8]

Hardware subcomponent of the EDGE SWITCH [1] that is a dedicated peripheral computing resource used to provide signal processing functions to the MEDIA STREAM CONTROLLER [1]. It may be implemented as an independent device or its capabilities may be integrated directly into the MEDIA STREAM CONTROLLER [1.7]. This subcomponent supports running various digital signal processing algorithms that may include DTMF digit detection, DTMF digit generation, network tone detection, network tone generation, noise cancellation, comfort noise generation, echo cancellation, voice onset detection, voice offset detection, modem (fax) tone detection, and media stream encoding/decoding/transcoding.

TELEPHONE LINE INTERFACE [1.9]

Hardware subcomponent of the EDGE SWITCH [1] integrated with external cabling interface that is used to connect TELEPHONE STATIONS [3]. TELEPHONE STATIONS [3] do not natively support SIP network signaling and as a result cannot present themselves to an IP network as SIP network signaling endpoints without assistance from the EDGE SWITCH [1].

The TELEPHONE LINE INTERFACE may also be adapted to support a variety of proprietary telephones, such analog POTS telephones, digital PBX telephones and various Centrex telephones.

If used to connect POTS telephones, the TELEPHONE LINE INTERFACE supports many of the BORSCHT functions, including: (B) Battery feed to power the subscriber's telephone, (R) Ringing signal to the subscribers telephone, (S) Supervision to detect caller off-hook, calls in progress, calls terminated, (C) Coding of analog voice signals into PCM digital format, (H) Hybrid transformer for conversion from two-wire to four-wire, and filtering to provide impedance match to remove or minimize echoes, and (T) Testing of the local loop and circuits of the switching equipment to detect faults and provide maintenance. Each POTS service interface provided by the TELEPHONE LINE INTERFACE [1.9] is a basic two-wire "Tip and Ring" interface that is translated into the four-wire (balanced pair) at the point where it interfaces the MEDIA STREAM CONTROLLER [1.7].

CENTRAL PROCESSING UNIT [1.10]

Hardware subsystem of the EDGE SWITCH [1] consisting of various subcomponents that include a main processor, peripheral controllers and memory cache devices necessary for it to function as a stand-alone computer running a real-time, preemptive, multi-tasking operating system. The CENTRAL PROCESSING UNIT provides supervisory control, directly or indirectly, for all EDGE SWITCH [1] features and functions. It interfaces RANDOM ACCESS MEMORY [1.11], utilizing it to provide memory needed to run the operating system and various application programs; it interfaces NON-VOLATILE MEMORY [1.11], utilizing it to store vital system configuration parameters and as a FILE SYSTEM [1.23]; it interfaces both the MEDIA STREAM CONTROLLER [1.7] and the IP ROUTING MODULE [1.2] through a system bus or similar means, utilizing each as a dedicated peripheral computing resource (under software control) to implement media connectivity and IP routing operations respectively.

RANDOM ACCESS MEMORY [1.11]

Hardware subsystem of the EDGE SWITCH [1] consisting of any array of solid-state storage devices configured to provide randomly addressable memory directly accessible to the CENTRAL PROCESSING UNIT [1.10]. The storage devices that comprise this subsystem provide volatile memory whose contents are considered to be undefined after a system reset cycle and must be initialized prior to use.

NON-VOLATILE MEMORY [1.12]

Hardware subsystem of the EDGE SWITCH [1] consisting of any array of solid-state storage devices configured to provide block addressable memory accessible to the CENTRAL PROCESSING UNIT [1.10] using direct memory access (DMA) or equivalent means. The storage devices that comprise this subsystem user non-volatile memory whose contents are retained between system reset cycles.

NETWORK ADAPTATION LAYER [1.13]

EDGE SWITCH [1] subsystem comprised of software, firmware, or other programmable logic (or combination thereof) that is used to control or impart functionality into the BROADBAND NETWORK INTERFACE [1.1]. This programmable subsystem makes it possible for the EDGE SWITCH [1] to adapt to a variety of OSI Layer 1 and 2 technologies supported by the BROADBAND ACCESS NETWORK [6.1]. The NETWORK ADAPTATION LAYER provides all of the control logic necessary to enable the BROADBAND NETWORK INTERFACE [1.1] to aggregate all available broadband network transmission capacity into to single IP data service in OSI Layer 3, and then to present an interface to that data service to the IP ROUTING MODULE [1.2].

Software subsystem of the EDGE SWITCH [1] consisting of software components and related applications necessary to control the IP ROUTING MODULE [1.2]; this software subsystem incorporates an IP protocol stack and implements IP routing services necessary to support voice, video, and data communications through the IP CARRIER NETWORK [6]. Software modules within the IP ROUTING SYSTEM support a programmable firewall, Network Address Translation (NAT), Dynamic Host Configuration Protocol (DHCP), and Virtual Private (data) Networking (VPN).

The IP ROUTING SYSTEM may utilize the FILE SYSTEM [1.23] to store routing tables. It will support IPv6 (the current build to standard). IPv6 provides both enhanced addressing capabilities as well as support for the quality of service capabilities previously only found in ATM implementations. Thus, by supporting IPv6, the IP ROUTING SYSTEM may employ open shortest path first (OSPF) routing to request a path to the desired endpoint for voice, video, and data packet transmission.

RTP PROTOCOL STACK [1.15]

Software subcomponent in the EDGE SWITCH [1] that implements support for IETF *RFC* 1889 on *RTP: A Transport Protocol for Real-Time Applications* (RTP), and its adjunct protocol IETF RFC 2833 on *RTP Payload for DTMF Digits, Telephony Tones and Telephony Signals*. Most or all of the RTP PROTOCOL STACK software may run on the PACKETIZATION COPROCESSOR [1.6]. RTP is the media transmission protocol used by the DES to transmit all real-time voice and video media streams through the IP CARRIER NETWORK [6].

RFC 2833 describes a means by which DTMF digits, telephone tones, and telephony signals are transmitted "out of band" by encoding them as numerical codes that are inserted into special-purpose RTP packets. RFC 2833 is used when a selected voice media stream encoding format is likely to render these DTMF digits, telephone tones, and telephony signals unintelligible to digital signal processors when the media stream is decoded at the receiving end of the session.

The RTP PROTOCOL STACK is utilized by the ABSTRACT TELEPHONE CONTROLLER [1.19] as a means to establish real-time media stream sessions (i.e. bearer channel connections) between SIP network signaling endpoints within the IP CARRIER NETWORK [6]. RTP sessions maintained by the RTP PROTOCOL STACK are physically associated with media stream endpoints on the MEDIA STREAM CONTROLLER [1.7] under the control of the ABSTRACT TELEPHONE CONTROLLER [1.19]. The RTP PROTOCOL STACK uses the data communication services of the IP ROUTING SYSTEM [1.14] to support IP-based media transmission between a media stream endpoint (i.e. port) on the MEDIA STREAM CONTROLLER [1.7] and a media stream endpoint in the IP CARRIER NETWORK [6] (or potentially with another media stream endpoint also on the MEDIA STREAM CONTROLLER [1.7] in the case of a call session that is internal to the EDGE SWITCH [1]).

SIP PROTOCOL STACK [1.16]

Software subcomponent in the EDGE SWITCH [1] that implements support for the "SIP Proxy Server" functionality described further in this disclosure (see SIP PROXY SERVER [12]) and in IETF *RFC* 2543 on *SIP: Session Initiation Protocol* (SIP). The SIP PROTOCOL STACK also implements support for IETF *RFC* 2327 on *SDP: Session Description Protocol* (SDP). SDP is an adjunct protocol to SIP and is used by SIP network signaling endpoints participating in a call session to describe to each other the detailed characteristics of the voice or video media streams (i.e. bearer channels) that they are capable of receiving from each other.

The EDGE SWITCH [1] represents each TELEPHONE STATION [3] internally as a SIP network signaling endpoint to the IP CARRIER NETWORK [6] by associating it with particular E.164 dialing number that is recognized by the SIP PROTOCOL STACK. The ABSTRACT CALL MODEL [1.20] supports a telephone gateway function in which a SIP User Agent is used to perform SIP network signaling endpoint functions on behalf of each TELEPHONE STATION [3] plugged into the TELEPHONE LINE INTERFACE

[1.9]. This SIP User Agent directs its SIP network signaling operations to the SIP PROTOCOL STACK, using it as its default SIP Proxy Server.

Although a SET-TOP BOX [4] natively supports SIP network signaling and is an actual SIP network signaling endpoint (i.e. contains a SIP User Agent), it exchanges SIP messages through the SIP PROTOCOL STACK on the EDGE SWITCH [1]. The SIP User Agent in the SET-TOP BOX [4] directs its SIP network signaling operations to the SIP PROTOCOL STACK, using it as its default SIP Proxy Server.

The SIP PROTOOL STACK uses the data communication services of the IP ROUTING SYSTEM [1.14] to support IP-based SIP network signaling operations between itself and the IP CARRIER NETWORK [6].

HTTP PROTOCOL STACK [1.17]

Software subcomponent in the EDGE SWITCH [1] that implements support for IETF RFC 2068 on *Hypertext Transfer Protocol—HTTP Version* 1.1 (HTTP). HTTP provides a generalized means for two programs to exchange text and data files over an IP network. The operational semantics of HTTP are based on the notion of a "HTTP client" (web browser) that makes requests for information and an "HTTP server" (web server) that responds to those requests. The HTTP PROTOCOL STACK implements support for both the "HTTP client" and the "HTTP server" elements of HTTP.

Support for the "HTTP client" element provides a means by which the XML MGMT INTERFACE [1.21] may communicate with the SYSTEM MANAGEMENT PLATFORM [2] (e.g. to report updated subscriber preferences or to upload billing records). Support for the "HTTP server" element makes it possible for any computer implementing the "HTTP client," such as the SYSTEM MANAGEMENT PLATFORM [3] or the WEB SERVER [11], to communicate with the XML MGMT INTERFACE [1.21] for the purposes of system management, service provisioning or subscriber interaction (e.g. to access its features and call log data).

A computer attempting to communicate with the EDGE SWITCH [1] using HTTP must log-in to the XML MGMT INTERFACE [1.21] and authenticate itself as a valid user. Information exchange and remote activation of EDGE SWITCH [1] features by an external computer is based on XML-encoding (via XML MGMT INTERFACE [1.21]) for both the requests and the responses thereto. The HTTP PROTOOL STACK uses the data communication services of the IP ROUTING SYSTEM [1.14] to support IP-based HTTP sessions between the "HTTP client" and "HTTP server" instances that it maintains internally, and other "HTTP client" and "HTTP server" instances in the IP CARRIER NETWORK [6].

SNMP PROTOCOL STACK [1.18]

Software subcomponent in the EDGE SWITCH [1] that implements support for IETF RFC 1157 on SNMP: A Simple Network Management Protocol (SNMP). SNMP is a protocol by which management information for a network element may be inspected or altered by remote users. It is used to communicate management information between network management stations and "SNMP agents" (specialized software processes) running on the managed network elements. The SNMP functional paradigm for monitoring and control is designed to be extensible to accommodate additional, possibly unanticipated aspects of network operation and management; thus, the SNMP architecture is adaptable to accommodate the management of EDGE SWITCHES [1] by the SYSTEM MANAGEMENT PLATFORM [2].

In the DES management paradigm, the SYSTEM MANAGEMENT PLATFORM [2] functions as the primary management station for a select population of EDGE SWITCHES [1]. The SNMP PROTOCOL STACK uses the data communication services of the IP ROUTING SYSTEM [1.14] to support SNMP sessions between the SYSTEM MANAGEMENT PLATFORM [2] and the DEVICE MGMT AGENTS [1.22].

ABSTRACT TELEPHONE CONTROLLER [1.19]

Software subcomponent of the EDGE SWITCH 1 that logically defines a full-featured, abstract telephone device control model that enables a higher-level application program to programmatically control the operation of TELEPHONE STATIONS [3] plugged into the TELEPHONE LINE INTERFACE [1.9], including the ability to interconnect, mix, and process full and half-duplex media streams associated with them. It implements features of this abstract telephone device control model to the fullest extent possible by invoking the MEDIA STREAM CONTROLLER [1.7] as a media control resource and the TELEPHONE LINE INTERFACE [1.9] as a telephone control resource. Certain features such as tone detection, tone generation and media transcoding are supported by the MEDIA STREAM CONTROLLER [1.7] working in conjunction with the DIGITAL SIGNAL PROCESSOR [1.8].

There is no concept of a "call session" in this telephone control model since only telephone features and media streams are managed. The "call session" concept is maintained in the ABSTRACT CALL MODEL [1.20], which functions as the "higher-level application program"—an application with knowledge of all SIP network signaling endpoints involved in a given call session.

The telephone control features support enabling or disabling detection of telephone events originating from the TELEPHONE LINE INTERFACE [1.9] (e.g. detection of on-hook, off-hook, hook flash, feature keys, and calls in progress, etc.). Telephone control features also support various device-level telephone features such as activating standard ring signaling, enabling distinctive ringing, enabling or disabling stutter dial-tone, activating or deactivating the message-waiting indicator lamp or to display text on a telephone LCD screen.

The media stream control features of the ABSTRACT TELEPHONE CONTROLLER support programmatically enabling or disabling media transmission to or from any media stream endpoint, particularly with respect to media stream endpoints associated with TELEPHONE STATIONS [3] plugged into the TELEPHONE LINE INTERFACE [1.9]. Conferencing features enable multi-party calls (e.g. 3-way calling, n-way calling) through the use of conferencing resources that can be applied programmatically. Digital signal processing algorithms may be applied programmatically to any stream to support tone detection, tone generation, echo cancellation and media transcoding, for example.

The media stream control model used by the ABSTRACT TELEPHONE CONTROLLER reflects that of the underlying MEDIA STREAM CONTROLLER [1.7] used to realize its features. In some respects, the control model is similar to that used by time division multiplex (TDM) telephony devices that support multi-line call and media control interfaces. It assumes that at least one endpoint of a media stream terminates on a MEDIA STREAM CONTROLLER [1.7] port and that the other endpoint of that same media stream terminates either on the TELEPHONE LINE INTERFACE

[1.9] or on an endpoint within the IP CARRIER NETWORK [6] (transmitted through the BROADBAND NETWORK INTERFACE [1.1] by the PACKETIZATION COPROCESSOR [1.6] using RTP). This control model also assumes that any two media stream endpoints terminating on MEDIA STREAM CONTROLLER [1.7] ports (regardless of where their other endpoints terminate) may be interconnected through the MEDIA STREAM CONTROLLER [1.7] to create a full or half-duplex media session between the two far-end endpoints.

ABSTRACT CALL MODEL [1.20]

Software subcomponent of the EDGE SWITCH [1] that logically defines an abstract call control model and adjunct telephone feature set that enables event-driven CALL PROCESSING APPLICATIONS [1.23.2] to deliver network service to subscribers through TELEPHONE STATIONS [3] and SET-TOP BOXES [4] plugged into the EDGE SWITCH [1]. The ABSTRACT CALL MODEL implements its abstract call control model and telephone feature set to the fullest extent possible by (a) invoking network signaling operations available through the SIP PROTOCOL STACK [1.16] and (b) invoking telephone features, media streaming capabilities, and related digital signal processing features available through the ABSTRACT TELEPHONE CONTROLLER [1.19]. By integrating with these software elements, the ABSTRACT CALL MODEL becomes the nexus between the IP CARRIER NETWORK [6] and service logic contained in CALL PROCESSING APPLICATIONS [1.23.2] that are stored within the FILE SYSTEM [1.23].

CALL PROCESSING APPLICATIONS [1.23.2] define how the EDGE SWITCH [1] responds to certain events—they define the EDGE SWITCH [1] workflow in response to network signaling events and device-level telephone events—and consequently they in effect define the network services that are provided to the subscriber through TELEPHONE STATIONS [3] and SET-TOP BOXES [4].

The ABSTRACT CALL MODEL supports five distinct functions that are implemented to the fullest extent possible in a device-independent fashion:

(1) Telephone Gateway Function
(2) Telephone Feature Delivery Function
(3) Terminal Adaptation Function
(4) Calling Service Delivery Function
(5) Admission Control Function The Telephone Gateway Function and the Telephone Feature Delivery Function are only applicable to call sessions involving TELEPHONE STATIONS [3]. Both TELEPHONE STATIONS and SET-TOP BOXES [4] make use of the other three functions. FIG. 7 depicts the EDGE SWITCH [1] call model in some detail, showing specifically how the five ABSTRACT CALL MODEL functions above are implemented within the EDGE SWITCH [1] software architecture.

For TELEPHONE STATIONS [3] to participate in call sessions using SIP network signaling, the ABSTRACT CALL MODEL [1.20] performs a Telephone Gateway Function in which it actively converts vendor-specific, device-level telephone signaling (through its interface to the ABSTRACT TELEPHONE CONTROLLER [1.19]) into SIP network signaling operations. As depicted in FIG. 7, the ABSTRACT CALL MODEL maintains an instance of a SIP User Agent for each TELEPHONE STATION [3] plugged into the EDGE SWITCH [1]. This SIP User Agent is registered with the SIP PROTOCOL STACK [1.16], using it as its default SIP Proxy Server. The SIP PROTOCOL STACK [1.16] knows which registered SIP User Agent instance corresponds to which dialing number, thus it can direct SIP network signaling to it based on dialing number addressing.

Certain "TELEPHONE EVENTS" received from the ABSTRACT TELEPHONE CONTROLLER [1.19], and/or SIP network signaling events from the SIP PROTOCOL STACK [1.16], trigger the ABSTRACT CALL MODEL to invoke a CALL PROCESSING APPLICATION [1.23.2] to apply service logic to the call session. This service logic will respond to the received event with some programmed action.

Since the ABSTRACT CALL MODEL retains device-level control over TELEPHONE STATIONS [3] plugged into the EDGE SWITCH [1] (through its software integration with the ABSTRACT TELEPHONE CONTROLLER [1.19]) it supports a Telephone Feature Delivery Function in which it may exert device-level control over TELEPHONE STATIONS [3] (see "TELEPHONE CONTROL" in FIG. 7). Commands sent to the ABSTRACT TELEPHONE CONTROLLER [1.19] are ultimately directed to the TELEPHONE LINE INTERFACE [1.9], and in some cases to the actual TELEPHONE STATION [3] itself (e.g. to display text on an LCD screen, activate a message-waiting indication lamp, or to initiate distinctive ring signaling).

The Terminal Adaptation Function may take place as an adjunct to the Telephone Gateway Function when the ABSTRACT CALL MODEL determines that a CONFIGURATION PROFILE [1.23.5] contains a telephone function key profile that has been programmed into the EDGE SWITCH [1] for a particular type of TELEPHONE STATION [3]. As a result, the ABSTRACT CALL MODEL converts vendor-specific tone sequences or key codes to comply with an appropriate user interface convention (in accordance with model set forth by the function key layout profile).

As an example of terminal adaptation, a speed-dial feature key on a POTS telephone may be programmed to generate a DTMF tone sequence such as "#45" when pressed. A CONFIGURATION PROFILE [1.23.5] on the EDGE SWITCH [1] contains a telephone function key profile specifying that any time the DTMF digit sequence "#45" is detected from that particular POTS telephone, a virtual function key code called "TRANSER" is generated and passed as a virtual function key event to the CALL PROCESSING APPLICATION [1.23.2] currently executing. Upon receiving the "TRANSFER" virtual function key event, the CALL PROCESSING APPLICATION [1.23.2] will interpret the next series of DTMF digits as the dialing number to which the current call session should be transferred. From the user's perspective, the programmed speed-dial key functions as a dedicated "TRANSFER" key.

In FIG. 7, two SIP call sessions are shown to illustrate potential SIP protocol message flow. One example shows a SET-TOP BOX [4] (shown as terminal "A") connected in a multimedia SIP call session to another SET-TOP BOX [4] (shown as terminal "C"). Presumably cameras are connected to the SET-TOP BOXES [4] to enable two-way video communications. In a second example, a TELEPHONE STATION [3] (shown as terminal "B") is connected in a voice SIP call session to another TELEPHONE STATION [3] (shown as terminal "D").

Thus, in summary: terminal A represents a near-end SIP User Agent communicating with terminal C, which represents a far-end SIP User Agent. Terminal B represents a near-end SIP User Agent communicating with terminal D, which represents a far-end SIP User Agent.

The SET-TOP BOX [4] plugged into the VIDEO STREAMING DEVICE INTERFACE [1.5] (terminal A) and the TELEPHONE STATION [3] plugged into TELEPHONE LINE INTERFACE [1.9] (terminal B)—the near-end SIP User Agents—are both registered with the SIP PROTOCOL STACK [1.16], using it as their default SIP Proxy Server. Thus, the client list for the SIP Proxy Server (i.e. SIP PROTOCOL STACK [1.16]) will treat them both in a consistent fashion as SIP network signaling endpoints representing near-end terminals plugged into the EDGE SWITCH [1].

The SIP PROTOCOL STACK [1.16], functioning the same as any SIP Proxy Server, will forward SIP protocol messages between the near-end SIP network signaling endpoints (terminals A & B) through the IP CARRIER NETWORK [6] to and from the far-end SIP network signaling endpoints (terminals C & D) to which they are respectively connected. It is the role of a SIP Proxy Server to make network signaling events (shown as "SIGNALING EVENTS") available to an application so that service logic can applied to the SIP call sessions. In the EDGE SWITCH [1] software architecture, the integration between the SIP PROTOCOL STACK [1.16] and the ABSTRACT CALL MODEL [1.20] serves this purpose.

The Calling Service Delivery Function occurs when the ABSTRACT CALL MODEL, triggered by SIP network signaling events (i.e. SIGNALING EVENTS) from the far-end terminals or near-end terminals, retrieves stored service logic and executes it as a means to participate in the associated SIP call sessions. Service logic for the EDGE SWITCH [1] is contained within CALL PROCESSING APPLICATIONS [1.23.2] stored in the FILE SYSTEM [1.23].

The ABSTRACT CALL MODEL will recognize certain signaling events (such as an incoming call from the network side) that will trigger it to respond by executing a CALL PROCESSING APPLICATION [1.23.2] that is currently loaded in memory. Or alternately, certain events might trigger the ABSTRACT CALL MODEL to retrieve a new CALL PROCESSING APPLICATION [1.23.2] and execute it anew. Certain CALL PROCESSING APPLICATIONS [1.23.2] will actively query SUBSCRIBER SERVICE PROFILES [1.23.4] to determine the Class of Service for the TELEPHONE STATION [3] involved in the call.

Ultimately, Calling Services take effect by active participation of CALL PROCESSING APPLICATION [1.23.2] in SIP call sessions; they perform telephone control operations, call control operations and make use of signaling information directly, such as the dialing numbers of the calling and called party.

The Admission Control Function occurs each time a SET-TOP BOX [4] or TELEPHONE STATION [3] attempts to originate or answer a call. The CALL PROCESSING APPLICATION [1.23.2] contains the service logic used to supervise the connection attempt. This service logic will consider two gating factors that could potentially cause it to deny admission to EDGE SWITCH [1] network services: (a) Class of Service and (b) physical resource availability. The Class of Service assigned to the TELEPHONE STATION [3] or SET-TOP BOX [4] will determine the exact service logic that should be applied to a connection attempt.

For example, if the Class of Service specifies that outgoing calls to a "900" number from a certain TELEPHONE STATION [3] are not permitted, and a connection attempt to a "900" number is the connection being attempted, then the CALL PROCESSING APPLICATION [1.23.2] will deny it.

If the service logic allows a connection attempt to proceed on the basis of it complying with the Class of Service, the CALL PROCESSING APPLICATION [1.23.2] must then determine if sufficient physical resources are available to complete the transaction. Among other considerations, the service logic supported by the CALL PROCESSING APPLICATION [1.23.2] will need to ensure that the new connection will not exceed the maximum number of call sessions supported by the EDGE SWITCH [1] configuration, and that there is adequate network bandwidth, internal routing capability, and digital signal processing resources to support the connection. If all these criteria are met, the connection attempt is allowed to proceed.

The Terminal Adaptation Function as applied to SET-TOP BOXES [4] may take place as an adjunct to the Calling Service Delivery Function. When the ABSTRACT CALL MODEL determines that one of the CONFIGURATION PROFILES [1.23.5] contains a SET-TOP BOX [4] interface profile that has been programmed into the EDGE SWITCH [1] for a particular type of SET-TOP BOX [4], it will use this profile to convert the vendor-specific command sequences supported by that SET-TOP BOX [4] to comply with an appropriate interface convention.

Since the SET-TOP BOX [4] interfaces the EDGE SWITCH [1] through an routed IP data path, the ABSTRACT CALL MODEL can only exert device-level control of SET-TOP BOX [4] features indirectly by communicating commands to it through the VIDEO STREAMING DEVICE INTERFACE [1.5]. Commands directed to the SET-TOP BOX [4] may support displaying text over the video image (text overlay) or muting of audio output, for example.

As a further example of the Terminal Adaptation Function, the SET-TOP BOX [4] at the near-end may use a channel selection protocol incompatible with NETWORK-BASED ENHANCED SERVICES [18] at the far-end used to provide selectable video content; thus the protocol used at the near-end must be converted to an appropriate interface convention used at the far-end.

XML MGMT INTERFACE [1.21]

XML (eXtensible Markup Language) is a set of conventions used to create text formats that enable data to be structured as lists of text expressions. The XML MGMT INTERFACE [1.21] is a software subcomponent in the EDGE SWITCH 1 that provides a secure, XML-based data exchange interface for the purposes of (a) enabling a remote user to access information stored in various EDGE SWITCH [1] databases and (b) enabling a remote user to access features and functions supported by the EDGE SWITCH [1], including call control operations and the ability to remotely activate certain DEVICE MGMT AGENTS [1.22].

Database information and feature-related parameters exchanged through this interface are structured according to these XML text format conventions, making it possible for them to be easily specified and/or interpreted by remote users. Remote users, which might include web applications and network management stations, access the XML MGMT INTERFACE through the HTTP PROTOCOL STACK [1.17].

DEVICE MGMT AGENTS [1.22]

Software applications integrated into the EDGE SWITCH [1] that may be activated to perform diagnostic functions, system software upgrades, feature testing, automated reporting, and other related device management tasks. The DEVICE MANAGEMENT AGENTS may be activated internally by EDGE SWITCH [1] software processes or remotely by various applications and network management stations through the XML MGMT INTERFACE [1.21] and/or the SNMP PROTOCOL STACK [1.18]. Certain DEVICE MANAGEMENT AGENTS may access databases on the FILE SYSTEM [1.23] for the purpose of accessing event records in the EVENT RECORD REPOSITORY [1.23.1] or to access CONFIGURATION PROFILES [1.23.5], for example.

FILE SYSTEM [1.23]

Software subcomponent in the EDGE SWITCH [1] that functions as directory-based file system; it supports standard file system operating semantics (open, close, read, write) and hierarchical directory structures, using the NON-VOLATILE MEMORY [1.12] as the physical storage device. The file system is implemented as a system resource, accessible through the operating system functions calls.

EVENT RECORD REPOSITORY [1.23.1]

Database stored on FILE SYSTEM [1.23] that contains event records generated by various software processes running on the EDGE SWITCH [1]. Event records stored in the EVENT RECORD REPOSITORY [1.23.1] are selectively generated by internal software processes according to the EDGE SWITCH [1] device configuration. Examples of the types of events that are stored include those that relate to basic system operations, detailed call session events for all incoming and outgoing calls, user access to calling features, detected error conditions, software component updates, and changes to subscriber preferences.

CALL PROCESSING APPLICATIONS [1.23.2]

Collection of software program files (applications) stored on the FILE SYSTEM [1.23] that are used by the EDGE SWITCH [1] to support network service delivery to users. CALL PROCESSING APPLICATIONS are invoked by the ABSTRACT CALL MODEL [1.20]. They define the service logic for all network services delivered to subscribers through TELEPHONE STATIONS [3] and SET-TOP BOXES [4]. They may function as call control agents that determine the progression of the call session, and/or they may function as device control agents that perform various telephone gateway and feature delivery functions.

They can reference other CALL PROCESSING APPLICATIONS [1.23.2], enabling the implementation of call control services (calling services) that impose no upper limit on the complexity of service logic that may be supported. The CALL PROCESSING APPLICATIONS are responsible for generating call-related event histories and storing them in the EVENT RECORD REPOSITORY [1.23.1] as the call session proceeds. In creating connections, the CALL PROCESSING APPLICATIONS rely upon call routing information stored in the LOCAL CALL ROUTING TABLES [1.23.3]. In rendering calling services, the CALL PROCESSING APPLICATIONS rely upon subscriber capabilities and personal preferences stored along with Class of Service information in the SUBSCRIBER SERVICE PROFILES [1.23.4]

LOCAL CALL ROUTING TABLES [1.23.3]

Database stored on FILE SYSTEM [1.23] that contains call routing information used by the EDGE SWITCH [1] for voice and video (multimedia) call set-up. Call routing tables include lists of dialing numbers and related address information used by CALL PROCESSING APPLICATIONS [1.23.2] to create connections between SIP network signaling endpoints. The LOCAL ROUTING TABLES store the dialing numbers of TELEPHONE STATIONS [1] physically plugged into the EDGE SWITCH [1], as well as dialing numbers needed to access PSTN GATEWAYS[8] installed within the IP CARRIER NETWORK [6] for the purpose of enabling voice call sessions to PSTN [7] endpoints.

Stored call routes provide default dialing numbers of Emergency 911 platforms to which TELEPHONE STATIONS [3] will automatically connected when 911 is dialed.

Tables of subscriber-programmed speed-dialing numbers may also be stored in call routing tables (managed by the subscriber or a remote user through an application running on a WEB SERVER [11]), making it possible for the TELEPHONE STATIONS [3] to support advanced speed-dialing functions without having to store the speed-dialing numbers within the TELEPHONE STATION [3].

LOCAL CALL ROUTING tables also store translation tables needed to support private telephone networking features, which include private dialing plans that use abbreviated dialing. Due to the substantial storage and processing capacity of the EDGE SWITCH [1], large dialing plans containing potentially tens of thousands of entries could be accommodated.

SUBSCRIBER SERVICE PROFILES [1.23.4]

Database stored on FILE SYSTEM [1.23] that contains subscriber-specific information used by the EDGE SWITCH [1] for all network service delivery to the subscriber. In the DES administrative model, each subscriber is associated with one more EDGE SWITCHES [1] that are installed at the subscriber premise for the purpose of network service delivery. A residence or single-location business entity may be viewed as a single subscriber, or in the case of a business with multiple locations (i.e. branch offices), a collection of subscribers.

Each subscriber enables a set of Class of Service "capabilities" (i.e. the subscriber purchases "capabilities" in the form of network services) that describes the collection of features, functions, and services that they would like to be able to access. These capabilities will determine which network services their particular EDGE SWITCH [1] will be capable of delivering.

The subscriber may then activate or deactivate selected Class of Service capabilities at their discretion. The collection of Class of Service capabilities that the subscriber has activated or deactivated is called their Class of Service "settings." A subscriber cannot activate any capability not previously enabled. The EDGE SWITCH [1] will not render any enabled capability that is not shown in the settings to be activated.

Once activated, a setting may require additional information from the subscriber in order for the corresponding feature, function, or service to operate correctly. For those settings, the subscriber configures "preferences" that further describe details as to exactly how the Class of Service settings should be interpreted. Preferences usually take the form of parameters that must be selected or typed in by the subscriber through a configuration application (e.g. telephone numbers, screen names, service options).

EDGE SWITCH [1] service delivery requires that subscriber Class of Service capabilities, settings, and preferences are stored locally in the FILE SYSTEM [1.23.4], each in the form of a machine-readable data object called a "service profile." Service profiles may be created to store subscriber-specific information required by a variety of applications. CALL PROCESSING APPLICATIONS [1.23.2] require service profiles as a means to store subscriber-specific parameters that effect their control flow. In some cases, service profiles may be created on the EDGE SWITCH [1] by certain network-based applications to function as "cookies," storing application-specific information required for service delivery.

CONFIGURATION PROFILES [1.23.5]

Database stored on FILE SYSTEM [1.23] that contains configuration information specific to a particular EDGE SWITCH [1] and used for its basic operation. In the DES administrative model, each subscriber is associated with one or more EDGE SWITCH [1], each of which may have a unique set of physical and network-related configuration parameters not directly related to Class of Service.

Virtually every software component of the EDGE SWITCH [1] requires a CONFIGURATION PROFILE that includes initialization and run-time parameters. As a few examples, CONFIGURATION PROFILES stored on the EDGE SWITCH [1] may include the number of terminals that it may have plugged into it, available bitrate of its connection to the BROADBAND ACCESS NETWORK [6.1], input/output buffer sizes, QoS parameters, IP routing parameters, IP address assignments, and function key layout profiles for TELEPHONE STATIONS [3].

EDGE SWITCH BASIC FEATURES [1.24]

The term EDGE SWITCH BASIC FEATURES refers to a specific collection of end-user features and functions that: (a) have become well-established in common use; (b) are likely to be highly-utilized on a day-to-day basis by the target subscriber group; and (c) are unlikely to change over time. The vast majority of voice, video, and data communications functions fall into this category, with features that include Customer Local Access Signaling Services (A.K.A. "CLASS features"), Centrex features, office telephone features, basic video channel selection, data firewall features, and Virtual Private (data) Networking, to name a few. EDGE SWITCH BASIC FEATURES are sorted into three broad categories according to the terminal type used to present them to the subscriber:

TELEPHONE STATION FEATURES
SET-TOP BOX FEATURES
COMPUTER WORKSTATION FEATURES

These feature categories define the core feature set of the EDGE SWITCH [1]. Network services are built up by enabling collections of these basic features, and adding to them access to network-based features and services. A network-based feature may be used in some cases to override a basic feature for the purpose of providing enhanced or alternative functionality that is logically equivalent to the basic feature. The three categories of basic features are discussed below in detail:

TELEPHONE STATION FEATURES

For the purposes of this disclosure, the respective types of TELEPHONE STATION FEATURES will be differentiated on the basis of whether they generally enhance usability in a wide variety of subscriber environments, or whether they are primarily applicable to an office environment. The following list summarizes common features that "generally enhance usability in a wide variety of subscriber environments:"

Basic dial-tone
Automatic callback
Last number redial
Repeat dialing
Audible message-waiting indication (stutter dial tone)
Visible message-waiting indication (indicator lamp)
Distinctive ringing
Call-waiting indication/call-waiting cancel
Caller-ID with name
Call-blocking
Call-forwarding
Direct-connect
Emergency 911

The EDGE SWITCH [1] supports basic dial-tone, enabling the subscriber to originate (or receive) both on-network calls and off-network calls. Call-blocking features (A.K.A. "call-diverting features") enable the EDGE SWITCH [1] to block the origination of a call (outbound voice call) by a particular TELEPHONE STATION [3] based on the called party dialing number, or to block answering of a call (inbound voice calls) by a particular TELEPHONE STATION [3] based on the calling party dialing number. The EDGE SWITCH [1] supports configurable call blocking of this type, wherein the subscriber may selectively block inbound and/or outbound calls by specifying area codes, exchanges, and line numbers (or various combinations of the three).

Call-forwarding features enable the EDGE SWITCH [1] to automatically transfer (redirect) an inbound call based on a number of considerations. Call-forwarding features are often activated to automatically or conditionally transfers inbound calls to application servers for further processing or to provide access to NETWORK-BASED ENHANCED SERVICES [18]. Examples of NETWORK-BASED ENHANCED SERVICES [18] that may be accessed via call-forwarding include an auto attendant (used to answer calls directed to a main office number), voice mail, automatic call distribution, group conferencing bridge, or a personal call screening service. The EDGE SWITCH [1] supports configurable call-forwarding, wherein the subscriber may program it to redirect inbound calls based on:

Point of origination (determined by calling party dialing number);
Determination of a busy or "ring-no-answer" condition existing for the called party dialing number;
Determination that the incoming call is a fax or modem call;
Date, day of week, or time of day.

Direct-connect features (A.K.A. "direct-connect originating") enable the EDGE SWITCH [1] to automatically originate a call to a pre-programmed dialing number when a TELEPHONE STATION [3] goes off-hook, or upon the detection of some other event, such as a particular TELEPHONE STATION [3] function key sequence. Direct-connect features are often used for security telephones outside of a building, or at kiosks to provide immediate access to a call center help desk; they may also be used by the EDGE SWITCH [1] to implement speed-dialing by associating certain TELEPHONE STATION [3] key sequences with subscriber-programmed speed-dialing numbers stored in LOCAL CALL ROUTING TABLES [1.23.3].

Support for Emergency 911 (E911) is implemented by configuring the dialing number "911" as a reserved dialing number. Any call to the dialing number 911 creates a connection to a SIP APPLICATION SERVER [13] or TDM APPLICATION SERVER [7.4] (through a PSTN GATEWAY [8]) that supports emergency services intervention. SIP network signaling passes the calling party dialing number to the APPLICATION SERVER, which then may determine the physical (geographical) location of the calling party as would be required to support emergency services intervention.

Customer Local Access Signaling Services (A.K.A. "CLASS features) comprise an additional layer of features that make TELEPHONE STATIONS [3] more generally useful in both residential and office settings. Depending upon one's point of reference, there is a significant overlap between what some may consider "CLASS features" and "office telephone features." Many of the features mentioned above, such as Distinctive Ringing and Audible message-waiting indication are considered by most local exchange carriers as CLASS features. For the purposes of this disclosure, CLASS features are not viewed as a distinct feature set and are instead subsumed by the broader category of TELEPHONE STATION FEATURES.

Office telephone features (A.K.A. "Centrex" or "PBX features") comprise an additional layer of specialized features that make TELEPHONE STATIONS [3] more useful in an office environment. Certain office telephone features make it possible for a user at a TELEPHONE STATION [3] to transfer calls between TELEPHONE STATIONS [3] that may not necessarily be plugged into the same EDGE SWITCH [1]. In the case where TELEPHONE STATIONS [3] are not plugged into the same EDGE SWITCH [1], implementation of certain features may require special communication between EDGE SWITCHES [1] in which a SIP call session is initiated from one to another, not to set-up a new call, but to request that a call in progress be managed in a particular way (e.g. transferred to a different SIP signaling endpoint residing on a different EDGE SWITCH [1]). The following list summarizes common office telephone features that are "primarily applicable to an office environment:"

Private telephone network (private dialing plan)
Speed dialing
Multiple line appearances
Three-way calling
Call-hold
Call-transfer
Call-pickup
Call-park
Call-waiting with display
Call log
Calling reason display
Do not disturb
Executive busy override
Feature button support
Make busy key The DES as a system supports the ability to create a virtually unlimited number of private telephone networks (A.K.A. "virtual private telephone network" or "virtual telephone network") that are implemented by programming private dialing plans into participating EDGE SWITCHES [1]. Generally speaking, a private telephone network is a collection of telephone endpoints that may address each other as specific community of users, thus enabling the carrier to offer special configuration options and rate plans to participating subscribers. Often, on-network calls made between participating subscribers are billed at a flat rate. The private dialing plan is managed by the subscriber and supports abbreviated dialing number formats that seamlessly integrate with existing dialing plans (e.g. the North American Dialing Plan).

Private telephone networks may operate within a single IP CARRIER NETWORK [6] or within a wider area through a more expansive IP network infrastructure that consists of interconnected IP CARRIER NETWORKS [6]. Since EDGE SWITCH [1] support for private telephone networks is based on dialing numbers, a private telephone network can include both SIP network signaling endpoints within the IP CARRIER NEWORKS [6] and PSTN [7] endpoints accessible through a PSTN GATEWAY [8].

SET-TOP BOX FEATURES

SET-TOP BOXES [4] are known to the EDGE SWITCH [1] as stand-alone SIP network signaling endpoints. The EDGE SWITCH [1] assumes that they will originate and answer multimedia call sessions independently and will support only limited remote (indirect) control of their feature sets by CALL PROCESSING APPLICATIONS [1.23.2] running on the EDGE SWITCH [1]. SET-TOP BOXES [4] originate multimedia call sessions to SIP APPLICATION SERVERS [13] that are capable of delivering streaming video content to the connecting SET-TOP BOX [4].

In support of this type of video (multimedia) call session, the SIP PROTOCOL STACK [1.15] residing on the EDGE SWITCH [1] functions as a SIP Proxy Server, mediating the multimedia call session. the CALL PROCESSING APPLICATION [1.23.2] managing the multimedia call session may at the same time communicate with the SET-TOP BOX [5] over the IP connection to the access its internal feature set. The following list summarizes common SET-TOP BOX [5] features that should be implemented as EDGE SWITCH BASIC FEATURES:

Detect, decode, and translate multimedia channel selection protocol
Detect, decode, and translate interactive services protocols (e.g. pay-per-view)
Display text overlay on top of video image
Control audio output gain
Detect, decode, and translate camera control protocol for two-multimedia applications
Download/upload device settings and preferences

COMPUTER WORKSTATION FEATURES

These features relate to the EDGE SWITCH'S [1] ability to provide data connectivity through the COMPUTER DATA INTERFACE [1.4]. Data feature examples include:

Network Address Translation (NAT) to provide IP address support for multiple COMPUTER WORKSTATIONS [5];
Programmable firewall features used to support file system protection and content filtering;
Dynamic Host Configuration Protocol (DHCP);
Virtual Private (data) Networking (VPN);
Packet metering for connects that use QoS transport services;
Admission control, dialing number assignment, and protocol message grooming for SIP call sessions.

EDGE SWITCH OVERRIDE FEATURES [1.25]

The term EDGE SWITCH OVERRIDE FEATURES refers to a specific collection of end-user features and functions that provide alternative versions of EDGE SWITCH BASIC FEATURES [1.24]; they in some way modify or enhance the behavior of EDGE SWITCH BASIC FEATURES [1.24], and may be implemented internally by the EDGE SWITCH [1] as alternative versions CALL PROCESSING APPLICATIONS [1.23.2] used to implement EDGE SWITCH BASIC FEATURES [1.24]. They may also be implemented external to the EDGE SWITCH [1] as NETWORK-BASED OVERRIDE FEATURES [19] that are transparently and dynamically accessed through the BROADBAND ACCESS NETWORK [6.1] when the feature is invoked. EDGE SWITCH OVERRIDE FEATURES implemented externally as NETWORK-BASED OVERRIDE FEATURES [19] are accessed by originating a SIP call session to a SIP APPLICATION SERVER [13].

SYSTEM MANAGEMENT PLATFORM [2]

All EDGE SWITCHES [1] are provisioned, configured, managed, and actively monitored by a SYSTEM MANAGEMENT PLATFORM deployed in a carrier central office, or central office equivalent. The SYSTEM MANAGEMENT PLATFORM is a scalable, fault-tolerant, high-availability network element that functions as the nexus between carrier operations support systems (A.K.A. "carrier OSS" or "back-office interfaces") and the EDGE SWITCHES [1] deployed at the subscriber premise; it does not directly participate in network service delivery at any time, but provides only a supporting, administrative role.

EDGE SWITCHES [1] do not interface the carrier OSS directly, but do so only through mediation by software applications running on the SYSTEM MANAGEMENT PLATFORM. The software applications running on the SYSTEM MANAGEMENT PLATFORM support the following DES system management functions:

Configure and upload software loads to the EDGE SWITCHES [1] as part of a provisioning or upgrade process;

Dynamically provision EDGE SWITCH [1] service capabilities (using default settings and preferences) according to a Class of Service provisioning model;

Actively monitor EDGE SWITCH [1] service delivery and report status through carrier OSS;

Remotely retrieve, view, and modify EDGE SWITCH [1] base configuration and subscriber Class of Service parameters through carrier OSS;

Remotely initiate EDGE SWITCH [1] diagnostics and system test procedures, and provide capability to report results through carrier OSS;

Synchronize EDGE SWITCH [1] information with same information stored in SYSTEM MANAGEMENT PLATFORM databases and information respositories, including Class of Service capabilities, Class of Service settings, subscriber preferences, local call routing tables, subscriber service profiles, and configuration profiles;

Collect event logs from EDGE SWITCHES [1], then store in databases and information respositories according to programmed policies;

Sort and re-format billable events, then forward to carrier OSS;

Provide for and adapt to all standardized carrier OSS requirements related to telecommunications service delivery (operations, administration, management and provisioning).

The software applications supporting these DES system management functions operate in conjunction with scalable databases and information repositories (for bulk storage) that are integral components within the SYSTEM MANAGEMENT PLATFORM. In some cases, SYSTEM MANAGEMENT PLATFORM databases store and manage information that duplicates specific subsets of information stored on the carrier's POLICY SERVER [14]. As a result, operations support system workflow models provide for some level of synchronization to ensure consistency between the DES and the carrier OSS.

SYSTEM MANAGEMENT PLATFORM databases and information respositories provide reliable, redundant storage for the following:

Administrative information needed to track and manage EDGE SWITCH [1] deployments at the subscriber premise, including a subscriber database that details the physical addresses, hardware revisions, software revisions, and physical locations of all EDGE SWITCHES [1] assigned to each subscriber;

Synchronized backup copy of all subscriber-specific information stored on every EDGE SWITCH [1], including Class of Service capabilities, Class of Service settings, subscriber preferences, local call routing tables, subscriber service profiles, and EDGE SWITCH [1] configuration profiles;

Software loads, event logs, service records, billing records, provisioning templates, diagnostic reports, and other operational information referenced by administrative information or received as output from the EDGE SWITCHES [1] in the course of network service delivery.

TELEPHONE STATION [3]

Terminal device that is plugged into the TELEPHONE LINE INTERFACE [1.9] and used for voice communications. The term "voice communications" refers to the ability of a terminal device to participate directly or indirectly as an endpoint in a "voice call session." A voice call session is defined as a SIP call session in which at least one bearer connection is transporting voice media content. A TELEPHONE STATION does not support SIP network signaling and cannot present itself to the IP CARRIER NETWORK [6] as a SIP network signaling endpoint; therefore it cannot participate directly in a voice call session and relies upon the EDGE SWITCH [1] to perform the necessary conversions.

A TELEPHONE STATION communicates with the EDGE SWITCH [1] directly through the TELEPHONE LINE INTERFACE [1.9] using analog electrical (or potentially digital) device-level telephone signaling (i.e. not network signaling). Beyond support for basic telephone line signaling (e.g. on-hook, off-hook, DTMF tone generation), device-level telephone signaling is used by the TELEPHONE LINE INTERFACE [1.9] to activate and control special features supported by the TELEPHONE STATION, such as illuminating message-waiting indication lamps or to detect feature key presses by the user. Ultimately, it becomes the task of the EDGE SWITCH [1] (through the TELEPHONE LINE INTERFACE [1.9] and other internal components) to convert the TELEPHONE STATION'S analog or digital device-level telephone signaling and voice transmission conventions to and from IP packets containing SIP network signaling information and digitally-encoded voice, respectively.

TELEPHONE STATIONS [3] work best with EDGE SWITCH [1] features when they support function keys that the EDGE SWITCH [1] can convert to an appropriate user interface convention. EDGE SWITCH [1] CALL PROCESSING APPLICATIONS [1.23.2] and NETWORK-BASED ENHANCED SERVICES [18] are implemented with the highest possible degree of device-independence, and therefore rely upon user input (feature key presses) that comply to a known user interface convention.

A POTS telephone with programmable speed-dial keys or a PBX telephone with dedicated functions keys can both be used as TELEPHONE STATIONS [3]. In the case of supporting a POTS telephone, the TELEPHONE LINE INTERFACE [1.9] must embody "SLIC" (Subscriber Line Interface Circuit) functionality whereas in the case of supporting a digital PBX telephone, the TELEPHONE LINE INTERFACE [1.9] must support a particular, vendor-specific line-level interface for that device.

SET-TOP BOX [4]

Terminal device that is plugged into the VIDEO STREAMING DEVICE INTERFACE [1.5] and used for multimedia communications. The term "multimedia communications" refers to the ability of a terminal device to participate directly or indirectly as an endpoint in a "multimedia call session." A multimedia call session is defined as a SIP call session in which at least one bearer connection is transporting video media content. In this disclosure, the term "video call session" should be understood as synonymous with "multimedia call session." The use of the term "video" remains to preserve the general concept of the EDGE SWITCH [1] providing support for all three media types: voice, video, and data.

Depending on terminal device capabilities and network capabilities, a single multimedia call session may encapsulate any number of concurrent voice, video, and data bearer connections simultaneously, and any one of them may be operating in a half-duplex or full-duplex mode. By plugging and ETHERNET SWITCH [20] into the VIDEO STREAMING DEVICE INTERFACE [1.5], more than one SET-TOP BOX can be connected to the EDGE SWITCH [1].

To participate in multimedia call sessions, the SET-TOP BOX interfaces with a television set, using it as an audio-visual output device. A camera apparatus may be connected to and controlled by the SET-TOP BOX for two-way multimedia communications. As required for direct participation in a multimedia call session, the SET-TOP BOX supports SIP network signaling and presents itself to the IP CARRIER NETWORK [6] as a SIP network signaling endpoint. It communicates with the EDGE SWITCH [1] through the VIDEO STREAMING DEVICE INTERFACE [1.5] using: (a) a QoS IP connection; (b) SIP network signaling; and (c) a number of adjunct, vendor-specific device control protocols as required to implement EDGE SWITCH BASIC FEATURES [1.24] described for the SET-TOP BOX.

Since the EDGE SWITCH [1] is functioning as a SIP Proxy Server, mediating the multimedia call session originated by the SET-TOP BOX, it may directly communicate with the SET-TOP BOX over the same IP connection for the purpose of accessing its internal feature sets. Vendor-specific device control protocols may be implemented either as distinct protocols or as SIP extensions, depending on SET-TOP BOX requirements.

A telephone terminal that supports SIP network signaling and that can present itself to the IP CARRIER NETWORK [6] as a SIP network signaling endpoint is considered to be operationally identical to a SET-TOP BOX. A so-called "SIP phone" is an example of this type of terminal device. Accordingly, a SIP phone could be plugged into the VIDEO STREAMING DEVICE INTERFACE [1.5] and participate directly in a voice call session.

Whereas a SIP phone cannot be controlled directly by the TELEPHONE LINE INTERFACE [1.9] using device-level telephone signaling, access to its internal feature set must be accomplished by communicating with it through the IP connection to it, using SIP extensions and potentially other vendor-specific device control protocols as required to implement EDGE SWITCH BASIC FEATURES [1.24] described for the TELEPHONE STATION [3].

This disclosure has deliberately characterized SIP phones to be the functional equivalent of SET-TOP BOXES to avoid creating confusion between the direct control of telephone features through the TELEPHONE LINE INTERFACE [1.9] and the indirect control of telephone features through vendor-specific IP protocols.

COMPUTER WORKSTATION [5]

Terminal device that is plugged into the COMPUTER DATA INTERFACE [1.4] and used for data communications. In most cases, this terminal device will be a desktop PC with an Ethernet LAN adapter running an IP protocol stack. By plugging an ETHERNET HUB [9] into the COMPUTER DATA INTERFACE [1.4], more than one COMPUTER WORKSTATION can be connected to the EDGE SWITCH [1].

IP CARRIER NETWORK [6]

Large-scale, routed internet protocol (IP) network designed to support the delivery of voice, video, and data communications services to a subscriber base made up of potentially millions of subscribers. The IP CARRIER NETWORK is a private network offering controlled access to a public subscriber base. It is owned and operated by a telecommunications carrier (A.K.A. "facilities-based network service provider"). It consists of a backbone network that is used to interconnect a number of access networks, and all transmission paths through both the backbone network and the access network are engineered to ensure that both signaling and bearer channel connections can be maintained with a Quality of Service (QoS).

QoS generally refers to the ability of the network to honor certain quality guarantees (i.e. minimum bit transfer rates, maximum allowable latentcy, maximum allowable jitter, maximum rate of packet loss, etc.) as necessary to support real-time, full-duplex voice and video calls in addition to providing "best effort" data communications at specified minimum bitrates.

An IP CARRIER NETWORK is fully managed such that its performance (QoS transmission and service delivery) is monitored at all times. In addition, such a network supports the capability to be securely partitioned so as to logically or physically segregate subscriber data, and subscriber data types, from each other into Virtual Private (data) Networks. The IP CARRIER NETWORK in most cases is implemented as a hybrid network in that IP connectivity in the network layer (OSI Layer 3) may be transported over an ATM packet-switched infrastructure in the data link layer (OSI Layer 2).

BROADBAND ACCESS NETWORK [6.1]

Specific type of access network that is designed to provide a relatively high-bitrate IP data path to the subscriber premise. For the purposes of this disclosure, the term "high-bitrate" is used loosely here to characterize a minimum bit transfer rate of 128 Kbit/second for both the downstream (toward the premise) or upstream (away from the premise) direction. For most implementations without video support, it is recommended that BROADBAND ACCESS NETWORK support a nominal bit transfer rate of at least 500 kilobit/second for both the downstream or upstream direction. Support for video services would require a 20 megabit/second downstream bitrate capacity.

In addition to minimum bitrate requirements, the BROADBAND ACCESS NETWORK must support QoS for its connections. The BROADBAND ACCESS NETWORK is often described as the segment of the IP CARRIER NETWORK [6.1] that bridges the "last mile" between the central office and the subscriber premise. Examples of "last mile" technologies that are suitable for integration into the BROADBAND NETWORK INTERFACE [1.1] include Digital Subscriber Line (DSL), coaxial cable, T1 in unchannelled mode, and Passive Optical Network (PON).

DC POWER SOURCE [6.2]

The EDGE SWITCH [1] is a computing device that requires a DC POWER SOURCE to operate. BROADBAND ACCESS NETWORKS [6.1] based on DSL or coaxial cable usually provide power through the copper wire or cable, respectively. In some cases, this source is sufficient to power the EDGE SWITCH [1]. Otherwise, power must be provided at the premise.

PSTN [7]

Public Switched Telephone Network. The network depicted in FIG. 1 consisting of CENTRAL OFFICE SWITCHES and a TDM TRANSPORT NETWORK.

CENTRAL OFFICE SWITCH [7.1]

End-office switch deployed in a central office as the PSTN [7] network element used to provide telephone service to network subscribers. It is the same as the CENTRAL OFFICE SWITCH depicted in FIG. 1. The telephone features provided by the CENTRAL OFFICE SWITCH are virtually identical to the TELEPHONE STATION FEATURES described as a subset of the EDGE SWITCH BASIC FEATURES [1.24].

T1/E1/PRI [7.2]

T1, E1 or ISDN Primary Rate Interface digital trunk interfaces used in the PSTN [7]. T1, E1, and PRI are based upon circuit-switched time division multiplex (TDM) technology; they enable the transmission of voice or bearer channel content along with varying degrees of network signaling information.

SS#7 [7.3]

Signaling System #7; the out-band signaling network used in the PSTN [7].

TDM APPLICATION SERVER [7.4]

Application server deployed in a central office as a PSTN [7] network element used to provide NETWORK-BASED ENHANCED SERVICES [18] to network subscribers. The TDM APPLICATION SERVER contains hardware and software components required to support the operation of one or more NETWORK-BASED ENHANCED SERVICES [18]. It typically presents access to these services through a digital trunk interface (see T1/E1/PRI [7.2]).

The TDM APPLICATION SERVER operates conceptually as an array of "computer-controlled" telephones in which the service logic contained in a software application program replaces a human operator as the controlling entity. According to this model, the software application program is able to use a variety of system resources (databases, speech recognition systems, media storage systems) to provide computer-controlled, personalized network services to connecting voice telephones.

PSTN GATEWAY [8]

ESN connectivity element that translates network signaling and bearer channel encoding formats so as to enable a call session in which one end of the call is a SIP network signaling endpoint in the IP CARRIER NETWORK [6] and the other end is a legacy TDM endpoint in the PSTN [7].

ETHERNET HUB [9]

Simple, low-cost, multi-port data distribution device that enables data communications to occur between all network devices plugged into it using Ethernet technology or the equivalent. This type of device has only modest transmission capacity and therefore cannot guarantee that a certain minimal bandwidth is maintained for each data path passing through it. This device may operate in a wired or wireless capacity.

DNS SERVER [10]

Distributed database application (A.K.A. "Domain Naming Server") that works at the transport layer (OSI Layer 4—above the network layer) to provide name-to-address mapping for all client applications in an IP network. The client applications can include e-mail, web hosting, and SIP-based telecommunications. It is a component in the DES carrier reference network architecture and serves multiple purposes as it would in any IP-based network architecture.

Three principal DNS SERVER functions stand out as most significant to the operation of the DES:

Translate generic network element names into one or more IP addresses that correspond to actual physical instances of that network element type;

Convert E.164 dialing numbers into IP addresses as required for call routing with the IP network;

Enable load balancing by providing IP addresses for multiple instances of a certain type of network element or other network resource.

WEB SERVER [11]

Software application program that implements support for the "web server" functionality described by IETF RFC 2068 on Hypertext Transfer Protocol—HTTP Version 1.1 (HTTP). The WEB SERVER is a component in the DES carrier reference network architecture and primarily used as a means to enable subscribers to communicate indirectly with EDGE SWITCHES [1] for the purposes of interactive configuration and interactive network service delivery.

With respect to interactive configuration, the WEB SERVER presents a web browser-based graphical user interface that enables subscribers to selectively enable or disable Class of Service settings and then to control or input preferences that relate to the delivery of activated network services. The WEB SERVER performs an authenticated log-in to the subscriber's EDGE SWITCH [1], and thus functions as an intermediary agent to ensure that the subscriber's settings and preferences are written to the target EDGE SWITCH [1] in a secure and syntactically correct manner.

To support interactive network service delivery to the subscriber, the WEB SERVER once again functions as an intermediary agent, hosting service-related applications that enable browser-based interactions between the subscriber and the EDGE SWITCH [1]. The WEB SERVER again performs an authenticated log-in to the subscriber's EDGE SWITCH [1], but this time for the purposes of (a) accessing call log data stored within it so that it may be used as application data, and (b) exerting control over internal EDGE SWITCH [1] features, such as originating or answering a call.

SIP PROXY SERVER [12]

This term refers specifically to a network-based implementation of a stand-alone SIP Proxy Server (or SIP Proxy Server cluster) and not to the SIP Proxy Server functionality supported by the SIP PROTOCOL STACK [1.16]. While the SIP Proxy Server functionality supported by both is essentially identical, they operate independently in support of different roles.

According to IETF *RFC* 2543 on *SIP: Session Initiation Protocol* a SIP PROXY SERVER is defined as follows:

"An intermediary program that acts as both a server and a client for the purpose of making requests on behalf of other clients. Requests are serviced internally or by passing them on, possibly after translation, to other servers. A proxy interprets, and, if necessary, rewrites a request message before forwarding it."

The SIP PROXY SERVER is a component in the DES reference carrier network architecture and is required to support many SIP network signaling operations within it by shuttling SIP messages back and forth between two or more SIP User Agents participating in a SIP call session.

Specifically, the SIP PROXY SERVER functions much like an intermediary SIP message router to ensure that the SIP network signaling messages to/from the SIP endpoints in the network are ultimately channeled to the correct destination. In this message-routing capacity, several SIP PROXY SERVERS can cooperate to pass SIP network signaling messages bi-directionally through a hierarchy of SIP PROXY SERVERS, each of which gets it closer to the target endpoint. SIP PROXY SERVERS access both the DNS SERVER [10] and the POLICY SERVER [14] to determine how to route SIP call sessions within the IP CARRIER NETWORK [6].

SIP APPLICATION SERVER [13]

ESN connectivity element deployed in an IP CARRIER NETWORK [6] to provide NETWORK-BASED ENHANCED SERVICES [18] to network subscribers. The SIP APPLICATION SERVER contains hardware and software components required for the operation of one or more NETWORK-BASED ENHANCED SERVICES [18]. It presents itself as a SIP network signaling endpoint that may communicate with any other SIP network signaling endpoint in a SIP call session.

It is assumed that the SIP APPLICATION SERVER will provide a means, directly or indirectly, to support one or more RTP bearer channel connections that are likely to be required for voice or multimedia call sessions. Because bearer channel capabilities for these SIP-based call sessions are assumed, the SIP APPLICATION SERVER may viewed conceptually to operate as an array of "computer-controlled" voice or multimedia terminals in which the service logic contained in a software application program replaces a human operator as the controlling entity.

According to this model, the software application program is able to use a variety of system resources (databases, speech recognition systems, media storage systems) to provide computer-controlled, personalized network services to connecting voice or multimedia terminals.

As a consequence of the fact that most call sessions in which the SIP APPLICATION SERVER participates are mediated through a SIP PROXY SERVER [12], each SIP signaling path created to support these call sessions may be used as a context to invoke additional capabilities of the SIP PROXY SERVER [12].

By exchanging SIP messages with the SIP PROXY SERVER [12] (through the SIP signaling path created to support a call session), the application program responsible for controlling a call session may perform complex call control operations, such as to transfer calls, add/drop call participants, or connect to a specialized type of SIP APPLICATION SERVER [13] called a "media server" for the purpose of invoking media services. A media server is capable of supporting media-intensive application services such as speech recognition, interactive voice response, or music-on-hold. Media servers are called "dialog servers" when they interpret and execute interactive voice response commands written in Voice XML.

POLICY SERVER [14]

Collection of database applications owned, operated, and maintained by the carrier for the purpose of managing network service delivery to network subscribers. These database applications are referred to collectively as a POLICY SERVER for two reasons:

(a) It is a practical impossibility to accurately characterize a "generic" carrier policy database server configuration; carrier network elements of this type will vary according to their unique network infrastructure requirements;

(b) It is a practical impossibility to accurately characterize how a particular carrier logically organizes its information; each may conceive schema and/or combine data objects in very different ways that will vary according to their unique network infrastructure requirements;

The POLICY SERVER thus represents a logical entity that stores essential network operational support information and enable DES system elements to access that information. Information stored on the POLICY SERVER includes:

Subscriber-specific information (Class of Service, account status, service profiles, preferences);

Connection policies and related call routing information; dialing plans;

Billing policies and rate plans for service delivery; General network authentication services for all human and machine users.

The connection policies are abstract data representations of the control logic necessary to route calls, invoke services, and perform other interconnection operations that define the behavior of the SIP PROXY SERVER [12] as it establishes specific call paths through the IP CARRIER NETWORK [6].

NETWORK PROVISIONING SYSTEM [15]

Network operations support system used by carrier to enable, disable, or modify network service delivery for network subscribers.

NETWORK OPERATIONS CENTER [16]

Network operations support system used by carrier to configure, monitor, troubleshoot, and manage network elements involved in delivering network services to network subscribers.

NETWORK BILLING SYSTEM [17]

Network operations support system used by carrier to collect billing records from network elements involved in delivering network services to network subscribers, and then to convert them to customer invoices based on billing policies and rate plans.

NETWORK-BASED ENHANCED SERVICES [18]

In contrast to NETWORK-BASED OVERRIDE FEATURES [19], NETWORK-BASED ENHANCED SERVICES are typically stand-alone network services that perform complete, independent functions; they are not functionally bound to any EDGE SWITCH [1] feature, but are generally accessible through the IP CARRIER NETWORK [6] using TELEPHONE STATIONS [3] and/or SET-TOP BOXES [4] plugged into and EDGE SWITCH [1]. They are general-interest applications that appeal to a wide audience.

Examples of NETWORK-BASED ENHANCED SERVICES include voice call-answering, group audio conferencing, language translation services, or video content delivery. Most NETWORK-BASED ENHANCED SERVICES are suitable to be offered as either stand-alone applications or as part of an overall services package that incorporates other features and services. An important distinction between EDGE SWITCH BASIC FEATURES [1.24] and NETWORK-BASED ENHANCED SERVICES is that the latter are not substitutes for, or alternative versions of, EDGE SWITCH BASIC FEATURES [1.24], but are independent, companion network services with which EDGE SWITCH BASIC FEATURES [1.24] must interoperate.

NETWORK-BASED OVERRIDE FEATURES [19]

Special-purpose, network-based applications that work in conjunction with EDGE SWITCH OVERRIDE FEATURES [1.25] for the purpose of imparting the EDGE SWITCH [1] with more advanced feature delivery capabilities. Advanced features of this type are likely to appeal to only a select subset of subscribers and/or are potentially costly to implement; thus they do not meet the requirements necessary to be implemented as EDGE SWITCH BASIC FEATURES [1.24].

An simple example of a NETWORK-BASED OVERRIDE FEATURE is an "inbound call management" network-based application (implementing the feature) that enables the end-user to accept or deny an incoming call from the PC desktop. In this case, the EDGE SWITCH [1] would transfer the inbound call to a network-based application rather than simply ringing the TELEPHONE STATION [1]. The network-based application would support a NETWORK-BASED OVERRIDE FEATURE that would present the identity of the calling party on the PC desktop (through a web browser graphical user interface). If the end-user accepts the incoming call through the web browser graphical user interface, the NETWORK-BASED OVERRIDE FEATURE transfers the call back to the EDGE SWITCH [1] with a marker indicating that call-setup should be allow to proceed in the normal fashion.

ETHERNET SWITCH [20]

Multi-port data distribution device based on Ethernet technology. The ETHERNET SWITCH enables data communications to occur between all network devices plugged into it at the same time, and is able to guarantee a minimal amount of bandwidth for each data transmission path passing through it. This device may operate in a wired or wireless capacity.

SUBSCRIBER NETWORK INTERFACE (POTS) [22]

Demarcation point that defines the interface between the public carrier network (PSTN [7] or IP CARRIER NETWORK [6]) and the subscriber's inside wiring plant. The SUBSCRIBER NETWORK INTERFACE (A.K.A. "Telco Entrance Facility") is required to be physically located in a "publicly accessible place." Its physical manifestation is usually a modest wire interface device (channel bank) used to connect copper wires from the street to the copper wiring within the premise. From a regulatory perspective, everything on the network side of the SUBSCRIBER NETWORK INTERFACE is the responsibility of the carrier and everything on the premise side is the responsibility of the subscriber. For residential telephone service, the SUBSCRIBER NETWORK INTERFACE is usually located on the outside of the residence. Businesses often have more complex termination requirements and allocate a wiring closet to serve this purpose.

A number of embodiments of the invention have been described. Nevertheless, it will be understood that various modifications may be made without departing from the spirit and scope of the invention. Accordingly, other embodiments are within the scope of the following claims.

What is claimed is:

1. A network device comprising:
a plurality of communication interfaces, including a telephone line interface, a computer data interface, and a broadband network interface;
a processor;
a machine-readable storage medium which during use stores a call processing application and service profiles, and which stores executable instructions to mediate communications between the plurality of communication interfaces, the instructions causing the network device to
detect network signaling events or trigger points in a telephone call and
invoke the call processing application in response to the detected network signaling events or trigger points, the call processing application operating according to parameters defined in the service profiles.

2. The network device of claim 1, wherein the plurality of communication interfaces further includes a video streaming device interface.

3. The network device of claim 1, wherein the broadband network interface terminates a broadband network link that joins a customer premises to a packet carrier network.

4. The network device of claim 1, wherein the instructions further cause the network device to route IP data between the computer data interface and the broadband network interface.

5. The network device of claim 1, wherein the network device is contained in a single physical enclosure.

6. The network device of claim 1, wherein the instructions further cause the network device to provide a SIP user agent to represent a telephone that uses the telephone line interface.

7. The network device of claim 1, wherein the storage medium during use further stores call routing tables, and
the instructions further cause the network device to perform call routing for telephone calls that use the telephone line interface.

8. The network device of claim 1, wherein the storage medium during use further stores call routing tables, and
the instructions further cause the network device to perform call routing for telephone calls according to the call routing tables, the telephone calls using the telephone line interface.

9. A network device comprising;
a broadband network interface;
a plurality of interfaces, including a telephone line interface and a computer data interface;
a processor; and
a machine-readable storage medium that stores processor-executable instructions to provide SIP agents, the instructions causing the network device to
provide a SIP user agent to represent a non-SIP telephone that uses the telephone line interface, and
the instructions further causing the network device to implement a SIP proxy server that mediates all SIP communications over the broadband network interface involving the non-SIP telephone.

10. The network device of claim 9, wherein the computer data interface passes IP data.

11. The network device of claim 9, wherein the plurality of interfaces includes a video streaming device interface.

12. The network device of claim 9, wherein the network device is contained in a single physical enclosure.

13. A method for establishing a voice-over-packet network architecture, the method comprising:
locating a system management platform in a shared packet network, the system management platform collecting call log data front a plurality of network devices; and
distributing the plurality of network devices that each include
a telephone line interface,
a computer data interface,
a broadband network interface terminating a link from the shared packet network,
a processor, and
a machine-readable storage medium storing processor-executable instructions to control telephone calls, the instructions causing each network device to route telephone calls in a peer-to-peer fashion over the shared packet network and to send call log data to the system management platform.

14. The method of claim 13, wherein for each device the broadband network interface terminates a link from the shared packet network.

15. The method of claim 13, wherein the routing of telephone calls includes SIP signaling.

16. The method of claim 13, wherein the storage medium further stores processor-executable Instructions to act as an SIP proxy server for devices using the telephone line interface and for devices using the computer data interface.

17. The method of claim 13, wherein the shared packet network uses IP protocols.

18. The method of claim 13, wherein the shared packet network uses ATM protocols.

19. The method of claim 13, wherein the plurality of network devices each further include a video streaming device interface.

* * * * *

UNITED STATES PATENT AND TRADEMARK OFFICE
CERTIFICATE OF CORRECTION

PATENT NO. : 7,283,519 B2 Page 1 of 1
APPLICATION NO. : 10/122589
DATED : October 16, 2007
INVENTOR(S) : Gregory D. Girard It is certified that error appears in the above-identified patent and that said Letters Patent is hereby corrected as shown below:

Column 65, line 43, after "profiles," insert: --, wherein the network device consists of one or more customer premise equipment modules--

In claim 13, line 5, replace "front" with --from.--

Signed and Sealed this

Eighteenth Day of December, 2007

JON W. DUDAS
*Director of the United States Patent and Trademark Office*

US007283519C1

(12) INTER PARTES REEXAMINATION CERTIFICATE (0259th)

United States Patent
Girard

(10) Number: US 7,283,519 C1
(45) Certificate Issued: May 3, 2011

(54) DISTRIBUTED EDGE SWITCHING SYSTEM FOR VOICE-OVER PACKET MULTISERVICE NETWORK

(75) Inventor: Gregory D. Girard, Beverly, MA (US)

(73) Assignee: Cisco Systems, Inc., San Jose, CA (US)

Reexamination Request:
No. 95/000,344, Feb. 6, 2008

Reexamination Certificate for:
Patent No.: 7,283,519
Issued: Oct. 16, 2007
Appl. No.: 10/122,589
Filed: Apr. 15, 2002

Certificate of Correction issued Dec. 18, 2007.

Related U.S. Application Data

(60) Provisional application No. 60/283,888, filed on Apr. 13, 2001.

(51) Int. Cl.
*H04L 12/66* (2006.01)
*H04L 12/28* (2006.01)
*H04L 12/56* (2006.01)
*H04J 1/02* (2006.01)

(52) U.S. Cl. .................. 370/353; 370/356; 370/401; 370/493

(58) Field of Classification Search .................. 370/353
See application file for complete search history.

(56) References Cited

U.S. PATENT DOCUMENTS

| | | |
|---|---|---|
| 5,327,435 A | 7/1994 | Warchol |
| 5,420,985 A | 5/1995 | Cantrell et al. |
| 5,541,862 A | 7/1996 | Bright et al. |
| 5,574,730 A | 11/1996 | End, III et al. |
| 5,608,786 A | 3/1997 | Gordon |
| 5,627,842 A | 5/1997 | Brown et al. |
| 5,742,596 A | 4/1998 | Baratz et al. ................. 370/356 |
| 5,788,058 A | 8/1998 | Girard |
| 5,841,788 A | 11/1998 | Ke |
| 5,974,449 A | 10/1999 | Chang et al. |
| 6,005,865 A | 12/1999 | Lewis et al. |
| 6,028,845 A | 2/2000 | Serikawa et al. |
| 6,061,363 A | 5/2000 | Evans et al. |
| 6,122,756 A | 9/2000 | Baxter et al. |
| 6,195,364 B1 | 2/2001 | Brodigan |
| 6,229,883 B1 | 5/2001 | Kakazaki et al. |
| 6,233,073 B1 | 5/2001 | Bowers et al. |
| 6,275,574 B1 | 8/2001 | Oran ......................... 379/201 |
| 6,366,556 B1 | 4/2002 | Ballintine et al. |
| 6,408,061 B1 | 6/2002 | Donak et al. |
| 6,456,587 B2 | 9/2002 | Taniguchi |
| 6,510,152 B1 | 1/2003 | Gerszberg et al. |
| 6,526,058 B1 | 2/2003 | Czajkowski et al. ........ 370/395 |
| 6,563,816 B1 | 5/2003 | Nodoushani et al. ........ 370/352 |
| 6,567,399 B1 | 5/2003 | Schuster et al. |
| 6,584,108 B1 | 6/2003 | Chung et al. ................ 370/401 |
| 6,667,968 B1 | 12/2003 | Tran |

(Continued)

FOREIGN PATENT DOCUMENTS

WO    WO 01/77853 A1    10/2001

OTHER PUBLICATIONS

"SIP–Telephony Service Interface Overview" by Gregoy D. Girard, Iperia, Inc., Mar. 24, 2000.

(Continued)

*Primary Examiner*—Ovidio Escalante

(57) ABSTRACT

A network device including a plurality of communication interfaces, including a telephone line interface, a computer data interface, and a broadband network interface; a processor; a machine-readable storage medium which during use stores a call processing application and service profiles, and which stores executable instructions to mediate communications between the plurality of communication interfaces, the instructions causing the network device to detect network signaling events or trigger points in a telephone call and invoke the call processing application in response to the detected network signaling events or trigger points, the call processing application operating according to parameters defined in the service profiles.

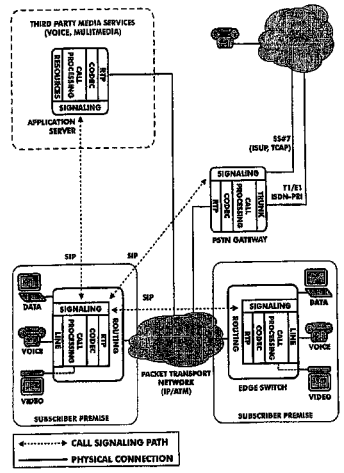

U.S. PATENT DOCUMENTS

| | | | |
|---|---|---|---|
| 6,678,246 B1 | 1/2004 | Smyth | 370/230 |
| 6,829,332 B2 | 12/2004 | Farris et al. | |
| 6,885,660 B2 | 4/2005 | Inbar et al. | 370/352 |
| 6,917,610 B1 | 7/2005 | Kung et al. | 370/352 |
| 6,938,080 B1 | 8/2005 | Kahveci et al. | |
| 7,012,888 B2 | 3/2006 | Schoeneberger et al. | |
| 7,024,461 B1 | 4/2006 | Janning et al. | 709/207 |
| 7,035,248 B2 | 4/2006 | Wengrovitz | 370/352 |
| 7,072,303 B2 | 7/2006 | MeLampy et al. | |
| 7,089,285 B1 | 8/2006 | Drell | |
| 7,120,139 B1 | 10/2006 | Kung et al. | |
| 7,123,700 B1 | 10/2006 | Weaver et al. | |
| 7,133,417 B1 | 11/2006 | Kao et al. | |
| 7,139,838 B1 | 11/2006 | Squire et al. | |
| 7,197,029 B1 | 3/2007 | Osterhout et al. | 370/353 |
| 7,283,519 B2 | 10/2007 | Girard | |
| 7,382,786 B2 | 6/2008 | Chen et al. | 370/401 |
| 2001/0036176 A1 | 11/2001 | Girard | |
| 2002/0033416 A1 | 3/2002 | Gerszberg et al. | 235/380 |
| 2002/0042832 A1 | 4/2002 | Fallentine et al. | |
| 2002/0044567 A1 | 4/2002 | Voit et al. | |
| 2002/0085549 A1 | 7/2002 | Reza et al. | |
| 2002/0087693 A1 | 7/2002 | Marshall | |
| 2002/0114274 A1 | 8/2002 | Sturges et al. | |
| 2002/0131427 A1 | 9/2002 | Niermann | |
| 2002/0169887 A1 | 11/2002 | MeLampy et al. | |
| 2002/0176404 A1 | 11/2002 | Girard | |
| 2003/0133558 A1 | 7/2003 | Kung et al. | |
| 2003/0185203 A1 | 10/2003 | Chow et al. | 370/352 |
| 2004/0028035 A1 | 2/2004 | Read | |
| 2004/0131060 A1 | 7/2004 | Newberg et al. | |
| 2005/0033985 A1 | 2/2005 | Xu et al. | |
| 2005/0193124 A1 | 9/2005 | Chou et al. | |
| 2006/0047742 A1 | 3/2006 | O'Neill et al. | |
| 2006/0067323 A1 | 3/2006 | Beck et al. | |
| 2006/0089991 A1 | 4/2006 | Sanders et al. | |
| 2007/0110043 A1 | 5/2007 | Girard | |
| 2007/0121602 A1 | 5/2007 | Sin et al. | |
| 2007/0202969 A1 | 8/2007 | Girard | |

OTHER PUBLICATIONS

3Com Corporation Demonstrates SIP–Based Open Settlement Protocol Solution At Fall 2000 Voice On the Net; CommWorks IP Technology Showcased in Open Test Network; Business Wire, http://findarticles.com/p/articles/mi_m0EIN/is_2000_Sept_12/ai_65161232/print, May 22, 2008, CISCO016300–CISCO016301.

8×8 Implements Session Initiation Protocol for Internet Telephony; IntraSwitch iPBX Becomes First Software PBX to Support SIP, Business Wire, http://findarticles.com/p/articles/mi_m0EIN/is_1999_Dec_23/ai_58356571/print, May 22, 2008, CISCO014708–CISCO014709.

APX 8000™, True Access™ Operating System (TAOS) Release Note, For software version 9.0, Lucent Technologies, Bell Labs Innovations, dated Oct. 2000, CISCO014711–CISCO014874.

APX™/MAX TNT® TAOS 9.2–165.0, Session Initiation Protocol (SIP) Release Note, For software version 9.2–165.0, Lucent Technologies, Bell Labs Innovations, dated Jul. 10, 2002, CISCO015993–CISCO016174.

Ascend MultiVoice Architecture Strategy From Dial–Tone to Data Tone, Ascend Communications, Inc., Copyright date 1998, CISCO014879–CISCO014896.

Carrier Class Gateways, Internet Telephony Round–Up, http://www.tmcnet.com/articles/itmag/0100/0100roundup.htm, May 22, 2008, CISCO016210–CISCO016227.

Cisco Announces New Voice Packet Gateway Solution, http://www.cisco.com/warp/public/146/pressroom/1997/oct97/1978.html, Nov. 14, 2007, CISCO010416–CISCO010418.

Cisco Delivers Third Phase of Data/Voice/Video Integration Strategy Multiservice Gateways Enable Seamless Connectivity, New Business Applications, http://newsroom.cisco.com/dlls/prod_032398c.html?print=true, Nov. 14, 2007, CISCO010419–CISCO010422.

Cisco Multiservice Access Products Expand Packet–Based Voice Networks and New World Services, http://newsroom.cisco.com/dlls/fspnisapifa26.html?print=true, Nov. 14, 2007, CISCO010429–CISCO010431.

Software Configuration Guide, For Cisco 3600 Series and Cisco 2600 Series Routers, Cisco Systems, Inc., Copyright date 1999, CISCO013141–CISCO013285.

Cisco 2600 Series Modular Access Routers, Cisco Systems, Inc., 2008, CISCO011537–CISCO011556.

Cisco 3600 Series Multifunction Platform (Cisco 3620, 3640, 3620–DC, 3640–DC, 36XX–RPS), Cisco Systems, Inc., Copyright date 2001, CISCO011557–CISCO011570.

Cisco MC3810 Multiservice Access Concentrator Hardware Installation Guide, OL–2619–01, Cover, Copyright date 2002, CISCO012903–CISCO012904.

CiscoWorks2000 Voice Manager 2.0, Release Notes 78–10705–01, Cisco Systems, Inc., dated Feb. 17, 2000, CISCO013410–CISCO013419.

Clarent Announces SIP–Based Integration of NetPerformer Product Line With Its Softswitch, TMCnet, Technology News, http://www.tmcnet.com/scripts/print-page.aspx?PagePrint=http%3a%2f%2fwww.tmcnet.c... , May 25, 2008 CISCO016509.

Dang et al., Practical VoIP Using VOCAL, O'Reilly Media, Inc., Copyright date 2002, cover and table of contents, pp. i–ix, CISCO016646–CISCO016654.

Grigonis, Computer Telephony Encyclopedia, title pages, CMP Books, Copyright date 2000, CISCO016730–CISCO016732.

Handley et al., SIP: Session Initiation Protocol, dated Mar. 1999, CISCO014269–CISCO014421.

Hastings, IP Communications Services Trial, Objectives and Strategies, MCI Worldcom, Slides 1–14, dated Sep. 1999, CISCO016329–CISCO016342.

Hoffpauir, Building Applications Using SIP, Broadsoft, dated Fall 1999 VON, Atlanta, CISCO016375–CISCO016386.

IP Pulse, IP xStream, http://www.iptelephony.org/cgi-bin/Site/Pages.pl?Selection=ViewNews&n1IDNum=1&isl..., May 22, 2008, CISCO016265–CISCO016274.

Komodo Fone 300, Internet Telephony Product Reviews, http://www.tmcnet.com/articles/itmag/0900/0900labs_komodo.htm, May 19, 2008, CISCO016175–CISCO016179.

Kulathumani, Voice Over IP: Products, Services and Issues, http://www.cs/wustl.edu/~jain/cis788–99/ftp/voip_products/index.html, May 22, 2008, CISCO16242–CISCO016263.

Lucent Technologies introduces end–to–end packet voice and data solution with new PathStar Business Service Exchange, Alcatel–Lucent, http://www.alcatel–lucent.com/wps/portal/NewsReleases/DetailLucent...LMSG_CONTENT_FILE=News_Releases_LU_1999/LU_News_Article_007248.xml, May 19, 2008, CISCO016343–CISCO016345.

MAX Reference, Lucent Technologies, Bell Labs Innovations, Part No. 7820–0647–003, For software version 8.0.1, dated Mar. 2000, CISCO014897–CISCO015288.

MAX™ 6000, Installation and Basic Configuration Guide, Lucent Technologies, Bell Labs Innovations, Part No. 7820–0677–002, For software version 9.0, dated Jan. 2001, CISCO015289–CISCO015471.

Mediatrix Telecom launches Third Generation Voice over IP Product Line with General Availability of its APA III–1 System—Product Announcement, http://findarticles.com/p/articles/mi_m0BFP/is_1999_Nov_29/ai_57838539/print, May 22, 2008, CISCO014710.

Michael, Bill, Soft–Switching and Public Network Integration, Think Services, Customer Management Insight, http://www.callcentermagazine.com/shared/article/showArticle.jhtml?articleId=8700774&..., May 22, 2008, CISCO016346–CISCO016349.

Michael, Bill, Soft–Switching and Public Network Integration, Think Services, Customer Management Insight, http://www.callcentermagazine.com/GLOBAL/stg/commweb_shared/article/show..., May 22, 2008, CISCO016350–CISCO016353.

Michael, Bill, Soft–Switching and Public Network Integration, Think Services, Customer Management Insight, http://www.callcentermagazine.com/GLOBAL/stg/commweb_shared/article/show..., May 22, 2008, CISCO016354–CISCO016357.

Motorola Vanguard Devices, Supports Management Module SM–MOT1000, Spectrum Enterprise Manager, Device Management, Cabletron Systems, Copyright date May 1999, CISCO016409–CISCO016503.

MultiVoice Access Manager Release 3.1.0 Release Notes, Lucent Tecnhologies, Bell Labs Innovations, For software version 3.1.0, pp. i–vii and 8–84, dated Jul. 2000, CISCO015472–CISCO015555.

MultiVoice for the MAX TAOS 7.0.0 Release Note, Ascend Communications, Inc., For software version 7.0.0, pp. i–vii, 9–47, 49–64, dated Nov. 16, 1998, CISCO015931–CISCO015992.

MultiVoice Access Manager User's Guide, Lucent Technologies, Bell Labs Innovations, Part No. 7820–0584–004, For software version 3.0.0, pp. i–v, vii–xix, xxi, xxiii–xxviii, 1–1 to Index–12, dated Mar. 2000, CISCO015556–CISCO015930.

Piven, Softswitching Seeks Seeks IP, PSTN Fusion, The Free Library by Farlex, http://www.thefreelibrary.com/Softwitching+Seeks+Seeks+IP,+PSTN+Fusion=a059628912, May 22, 2008, CISCO016275–CISCO016283.

Rendezvous, http://developer.apple.com/macosx/rendezvous, 4 pages, dated Oct. 2004, downloaded and printed from Internet Archive Way Back Machine (http://web.archive.org/web/20041010093704/developer.apple.com/macosx/rendezvous) on Jun. 7, 2007.

SIP: The Promise Becomes Reality, Cisco Systems, Copyright 2001.

SS7/IP Interoperability Testing Exhibited at Fall Voice On the Net Conference, Business Wire, http://findarticles.com/p/articles/mi_m0EIN/is_1999_Sept_27/ai_55863401/print.05/24/08, CISCO016406–CISCO016408.

Sylantro Announces Sophisticated Routing and Network Configuration Capabilities for Service Providers, Business Wire, Campbell, Calif., http://findarticles.com/p/articles/mi_m0EIN/is_2001_August_20/ai77309870/print, May 22, 2008, CISCO016325–CISCO016326.

Sylantro Softswitch to Incorporate SIP Protocol from Hughes Software Systems, Business Wire, http://findarticles.com/p/articles/mi_m0EIN/is_2000_Sept_11/ai_65127143/print, May 22, 2008, CISCO016327–CISCO016328.

Total Control® 1000 Media Gateway, 3Com Corporation, Copyright date 2001, CISCO016296–CISCO016299.

Vanguard® 6520/60 Overview, Motorola, Copyright date 1998, CISCO014704–CISCO014707.

Verso® NetPerformer® SDM–9230, Integrated Access Router for Branch Offices, Verso Technologies, Inc., Copyright date 2005, CISCO016510–CISCO016511.

Voice Over DSL Reporting, DSL Prime, http://www.dsl-prime.com/News_Articles/a/Voice_over_DSL/voice_over_dsl.html, May 22, 2008, CISCO016228–CISCO016241.

Zero Configuration Networking (Zeroconf), http://www.zeroconf.org, 3 pages, dated Oct. 2004, downloaded and printed from Internet Archive Way Back Machine (http://web.archie.org/web/20041027081600/http://www.zeroconf.org) on Jun. 7, 2007.

Zmora, Amir, B2BUA, "Enabling Class 5 Capabilities in SIP Designs", CommsDesign, Copyright date 2003.

116—The American Heritage Dictionary, Fourth Edition, Jul. 2001, pp. 183, 525.

117—Newton'sTelecom Dictionary, 24th Edition, Harry Newton, 2008, pp. 511, 996.

118—The IEEE Standard Dictionary of Electrical and Electronics Terms, Sixth Edition, IEEE Std 100–1996, pp. iv–viii, 279, 741.

"Technology overview," Infoworld, pp. 97, 100, 102 (Apr. 29, 1996).

Request for Comments 2543, "SIP: Session Initiation Protocol" (Mar. 1999).

Folsom, David, Claim Construction Order, *ESN, LLC* v. *Cisco Systems, Inc. et al*, Civ. Action No. 5:08–CV–20 DF, U.S. District Court, Eastern District of Texas, Texarkana Div., pp. 1–41 (Jul. 13, 2009).

Rosenberg, Jonathan, Selecting the Right SIP Proxy Server, Communications Solutions, 2 pages (Jun. 2001).

Rosenberg, Jonathan, SIP Proxies, Winter 2001 VoN Developers Conference, 37 pages (Jan. 24, 2001).

Case, J., et al., RFC1157—Simple Network Mangement Protocol (SNMP), Jul. 31, 2008, pp. 1–27, RFC Editor, Reston, VA, USA.

Schulzrinne, H., et al., RFC1889–RTP: A Transport Protocol for Real–Time Applications, Jul. 31, 2008, pp. 1–60, RFC Editor, Reston, VA, USA.

Fielding, R. et al., RFC2068—Hypertext Transfer Protocol, HTTP/1.1, Jul. 31, 2008, pp. 1–127, RFC Editor, Reston, VA, USA.

Handley, M., et al., RFC2327—SDP: Session Description Protocol, Jul. 31, 2008, pp. 1–32, RFC Editor, Reston, VA, USA.

Handley, M., et al., RFC2543—SIP: Session Initiation Protocol, Jul. 31, 2008, pp. 1–113, RFC Editor, Reston, VA, USA.

Schulzrinne, H., et al., RFC2833—RTP Payload for DTMF Digits, Telephony Tones and Tele, Jul. 31, 2008, pp. 1–24, RFC Editor, Reston, VA, USA.

Cuervo, F., et al., RFC3015—Megaco Protocol Version 1.0, Jul. 31, 2008, pp. 1–139, RFC Editor, Reston, VA, USA.

Rosenberg, J., et al., http://www.faqs.org/rfcs/rfc3261.html, SIP: Session Initiation Protocol, Jul. 1, 2009, pp. 1–269, Internet Society, Reston, VA, USA.

Kelly, David, et al., Chapter 1:VOCAL: Say, What?, Practical VoIP Using VOCAL, Jul. 2002 (see http://oreilly.com/catalog/9780596000783/), pp. 1 to 14, O'Reilly Media, Inc.

Kelly, David, et al., Chapter 7: Session Initiation Protocol and Related Protocols, Practical VoIP Using VOCAL, Jul. 2002 (see http://oreilly.com/catalog/9780596000783/), pp. 125 to 166, O'Reilly Media, Inc.

Kelly, David, et al., Chapter 8: Vovida SIP Stack, Practical VoIP Using VOCAL, Jul. 2002 (see http://oreilly.com/catalog/9780596000783/), pp. 167 to 192, O'Reilly Media, Inc.

Kelly, David, et al., Chapter 9: Base Code, Practical VoIP Using VOCAL, Jul. 2002 (see http://oreilly.com/catalog/9780596000783/), pp. 193 to 200, O'Reilly Media, Inc.

Kelly, David, et al., Chapter 10: VOCAL User Agent, Practical VoIP Using VOCAL, Jul. 2002 (see http://oreilly.com/catalog/9780596000783/), pp. 201 to 218, O'Reilly Media, Inc.

Kelly, David, et al., Chapter 11: SIP Proxy: Marshall Server, Practical VoIP Using VOCAL, Jul. 2002 (see http://oreilly.com/catalog/9780596000783/), pp. 219 to 244, O'Reilly Media, Inc.

Grigonis, Richard, Computer Telephony Encyclopedia, 2000 (see http://www.worldcat.org/oclc/44804630), Cover, Title Page, pp. 83 to 110, CMP Books.

Grigonis, Richard, Computer Telephony Encyclopedia, 2000 (see http://www.worldcat.org/oclc/44804630), pp. 267–278, CMP Books.

Grigonis, Richard, Computer Telephony Encyclopedia, 2000 (see http://www.worldcat.org/oclc/44804630), pp. 292–297, CMP Books.

Grigonis, Richard, Computer Telephony Encyclopedia, 2000 (see http://www.worldcat.org/oclc/44804630), pp. 366–376, CMP Books.

Grigonis, Richard, Computer Telephony Encyclopedia, 2000 (see http://www.worldcat.org/oclc/44804630), pp. 446–459, CMP Books.

Radatz, Jane, The IEEE Standard Dictionary of Electrical and Electronics Terms, 6th Ed., Apr. 1, 1997 (per http://www.amazon.com/Standard–Dictionary–Electrical–Electronics–Terms/dp/1559378336), Title Page, Introduction, iv to viii, 279, and 741, IEEE.

Newton, Harry, Newton's Telecom Dictionary. 24th Ed., 2008, pp. 511 and 996, Flatiron Publishing, New York City, NY, USA.

Houghton Mifflin Co., The American Heritage Dictionary, Fourth Edition, 2001, pp. 183, 525, Dell Publishing Div. of Random House, Inc., New York City, NY, USA.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-19 are cancelled.

* * * * *